US 6,647,146 B1

(12) United States Patent
Davison et al.

(10) Patent No.: US 6,647,146 B1
(45) Date of Patent: Nov. 11, 2003

(54) IMAGE PROCESSING APPARATUS

(75) Inventors: Allan Joseph Davison, Guildford (GB); Jane Haslam, Guildford (GB); Alexander Ralph Lyons, Guildford (GB); Simon Michael Rowe, Guildford (GB); Richard Ian Taylor, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/129,080

(22) Filed: Aug. 5, 1998

(51) Int. Cl.[7] .............................. G06K 9/48; G06K 9/46
(52) U.S. Cl. ..................... 382/199; 382/202; 358/1.9
(58) Field of Search ........................ 382/48, 30, 294, 382/190, 192, 193, 202, 199, 266

(56) References Cited

U.S. PATENT DOCUMENTS

| 3,901,595 A | 8/1975 | Helava et al. ................ 356/2 |
| 4,175,862 A | 11/1979 | DiMatteo et al. ........... 356/375 |
| 4,654,872 A | 3/1987 | Hisano et al. ................. 382/1 |
| 4,695,156 A | 9/1987 | Taft .............................. 356/1 |
| 4,803,645 A | 2/1989 | Ohtomo et al. ............. 364/560 |

(List continued on next page.)

FOREIGN PATENT DOCUMENTS

| EP | 0141706 | 4/1990 | |
| EP | 0537021 | 4/1993 | ........... G06F/15/64 |
| EP | 0633550 | 1/1995 | ........... G06T/17/20 |
| EP | 0 733 996 A2 | 9/1996 | ............ G06T/7/10 |
| EP | 0898245 A1 * | 2/1999 | ............ G06T/7/00 |
| EP | 901105 * | 10/1999 | ............ G06T/7/00 |
| EP | 2328127 B * | 10/1999 | ............ G06T/9/20 |
| GB | 2244621 | 4/1991 | ........... G01C/11/00 |
| GB | 2253052 | 8/1992 | ........... G01B/11/03 |
| GB | 2257250 | 1/1993 | ........... G01C/11/02 |
| GB | 2270435 | 3/1994 | ............ G01C/3/16 |

(List continued on next page.)

OTHER PUBLICATIONS

"A Multistage Stereo Method Giving Priority to Reliable Matching" Nakayama et al., Proceedings of the International conference on Robotics and Automation, Nice, May 12–14, 1992, vol. 2, No. Conf. 8, May 12, 1992, Institute of Electrical and Electronics Engineers, pp. 1753–1758.

"Feature Matching for Building Extraction from Multiple Views" Roux et al., Proceedings of the Computer Society Conference on Computer Vision and Pattern Recognition, Seattle, Jun. 21–23, 1994, Institute of Electrical and Electronics Engineers, p. 46–53.

(List continued on next page.)

Primary Examiner—Jerome Grant, II
(74) Attorney, Agent, or Firm—Fitzpatrick, Cella, Harper & Scinto

(57) ABSTRACT

In an apparatus and method for creating a three-dimensional model of an object, images of the object taken from different, unknown positions are processed to identify the points in the images which correspond to the same point on the actual object (that is "matching" points), the matching points are used to determine the relative positions from which the images were taken, and the matching points and calculated positions are used to calculate points in a three-dimensional space representing points on the object. A number of different techniques are used to identify the matching points, and a number of solutions are calculated and tested for the relative positions. Edges in an image are identified by first identifying corner points in the image and then identifying edges between the corner points on the basis of edge orientation values of pixels, the edges are processed in strength order to remove cross-overs, the images subdivided into regions by connecting points at the ends of the edges on the basis of the edge strengths, and matching points within corresponding regions in two or more images are identified.

27 Claims, 46 Drawing Sheets

U.S. PATENT DOCUMENTS

| | | | |
|---|---|---|---|
| 4,825,393 A | | 4/1989 | Nishiya ..................... 364/560 |
| 4,935,810 A | | 6/1990 | Nonami et al. ............... 358/98 |
| 5,052,045 A | * | 9/1991 | Peregrim ..................... 382/30 |
| 5,144,373 A | | 9/1992 | Moler .......................... 356/2 |
| 5,166,878 A | | 11/1992 | Poelstra ..................... 364/424 |
| 5,173,949 A | * | 12/1992 | Peregrim ..................... 382/48 |
| 5,202,928 A | | 4/1993 | Tomita et al. ................ 382/1 |
| 5,307,136 A | | 4/1994 | Saneyoshi ..................... 356/1 |
| 5,381,526 A | | 1/1995 | Ellson ........................ 395/164 |
| 5,390,291 A | | 2/1995 | Ohashi ........................ 395/119 |
| 5,398,292 A | | 3/1995 | Aoyama ....................... 382/22 |
| 5,420,971 A | * | 5/1995 | Westerink ................... 395/133 |
| 5,454,069 A | | 9/1995 | Knapp et al. ................ 395/120 |
| 5,519,485 A | | 5/1996 | Ohtani et al. .................. 356/2 |
| 5,559,334 A | | 9/1996 | Gupta et al. ............. 250/360.1 |
| 5,604,529 A | | 2/1997 | Kuga et al. ................... 348/46 |
| 5,727,093 A | * | 3/1998 | Uchiyama ................... 382/294 |
| 5,734,743 A | | 3/1998 | Matsugu et al. ............ 382/154 |

FOREIGN PATENT DOCUMENTS

| | | | | |
|---|---|---|---|---|
| JP | 63-129478 | * | 6/1988 | ........... G06T/15/70 |
| JP | 8-029126 | | 2/1996 | .......... H04N/5/208 |
| JP | 08147469 | | 7/1996 | ............. G06T/7/00 |
| JP | 8-329252 | | 12/1996 | .......... H04N/1/409 |
| JP | 8-329253 | | 12/1996 | .......... H04N/5/262 |
| JP | 09245166 | | 9/1997 | ............. G06T/7/00 |
| WO | 88/02518 | | 4/1988 | ............ G01C/3/00 |
| WO | 88/04804 | | 6/1988 | ............ G06F/3/14 |
| WO | 90/10194 | | 9/1990 | ........... G01B/11/16 |
| WO | 91/15732 | | 10/1991 | ........... G01B/11/24 |
| WO | 91/19265 | | 12/1991 | ........... G06T/15/70 |
| WO | 92/06444 | | 4/1992 | ........... G06F/15/70 |

OTHER PUBLICATIONS

"Hierarchical Stereo and Motion Correspondence using Feature Groupings" Venkateswar et al., International Journal of Computer Vision, vol. 15, No. 3, 1989, Jul. 15, 1995, pp. 245–269.

"Polyhedron Reconstruction using Three–View Analysis" Hung et al., Pattern Recognition, vol. 22, No. 3, 1989, pp. 231–246.

"A Pyramidal Data Structure for Triangle–Based Surface Description" L. De. Floriani, IEEE Comput. Graphics Appl. Mar. 1989.

"Adaptive Least Squares Correlation: A Powerful Image Matching Technique" A.W. Gruen, Photogrammetry Remote Sensing and Cartography 1985, pp. 175–187.

"Affine Analysis of Image Sequences" L.S. Shapiro, Cambridge University Press 1995, ISBN 0–521–55063–7, Sections 5, 7 and Appendix D.

"Closed–Form Solution of Absolute Orientation using Unit Quaternions" B.K.P. Horn, Journal of the Optical Society of America, 4(4): 629–649, Apr. 1987.

"Computer and Robot Vision vol. 1", R.M. Haralick and L.G. Shapiro, Addison–Wesley Publishing Company, 1992, ISBN 0–201–10877–1 (V.1), pp. 337–346 & Section 8.

"Computer Graphics Principle and Practice", Foley, van Dam, Feiner & Hughes, Second Edition, Addison–Wesley Publishing Company, Inc., ISBN 0–201–12110–7.

"Graphics Gems" A. Glassner, Academic Press Professional, 1990, ISBN 0–12–286166–3, Chapter 7.

"Motion and Structure from Two Perspective Views: Algorithms, Error Analysis and Error Estimation" J. Weng, T.S. Huang and N. Ahuja, IEEE Transactions on Pattern Analysis and Machine Intelligence, vol. 11, No. 5, May 1989, pp. 451–476.

"Numerical Recipes in "C"" W.H. Press, S.A. Teukolsky, W.T. Vetterling and B.P. Flannery, 1992, ISBN 0–521–43108–5, PP. 412–420.

"Robust Detection of Degenerate Configurations whilst Estimating the Fundamental Matrix" P.H.S. Torr, A. Zisserman and S. Maybank, Oxford University Technical Report 2090/96.

"Scale–Space Theory in Computer Vision" Tony Lindeberg, Kluwer Academic Publisher, IBSN 0–7923–9418–6, pp. 158–160 & Chapter 4.

"Three–Dimensional Computer Vision" Faugeras, MIT Press, ISBN 0–262–06158–9, Chapter 10.

"Generalizing Epipolar–Plane Image Analysis for Non–Orthogonal and Varying View Directions" Baker et al., Image Understanding Workshop, Proceedings of a Workshop Held at Los Angeles, California, Feb. 23–25, 1987, vol. II, pp. 843–848.

* cited by examiner

IMAGE PROCESSING APPARATUS

The present invention relates to an image processing apparatus and method.

In many image processing applications, it is necessary to identify edges in an image, for example to enhance the edges to give them a better visual appearance, to segment an image, or to identify corner points which lie at the intersection of edges in the image.

Known edge detection techniques, for example as described in "Computer Graphics Principles and Practice" by Foley, van Dam, Feiner and Hughes, Second Edition, Addison-Wesley Publishing Company ISBN 0-201-12110-7, detect edges by identifying sharp changes in intensity in the image. Such techniques do not provide reliable results in many circumstances, however, particularly when used on images in which an edge has become broken, for example due to lighting, shadows or poor image quality.

One particular application in which edge detection may be used is the creation of three-dimensional computer models of a real-life object using at least two images of the object taken from different positions to determine the relative position of points on the object in two-dimensions and the relative "depth" of the points. To create such models, it is necessary to know the location in each image of points which represent the same actual point on the object. Such points can be determined by identifying corner points in each image and matching corner points from one image with the corner points in another image.

To enable matching points to be easily identified in the images, a number of known systems apply a grid pattern to the object before the images are taken so that the grid lines can be identified in the images and their points of intersection determined. Such a system is disclosed in WO-A-90/10194. Before grid lines can be automatically identified by the image processing system, however, WO-A-90/10194 discloses that it is necessary for a user to "patch" the lines to ensure that they are unbroken. This is particularly time consuming.

The present invention has been made with the above problems in mind, and aims to provide an apparatus and method for detecting edges in an image.

The present invention provides an image processing apparatus or method in which edges in an image are detected on the basis of edge orientation. Edge intensity may optionally be used, as well.

Of course, use of edge detection is not limited to the above applications and many other image processing applications exist where edge detection is used.

In many image processing applications, it is necessary to sub-divide or segment an image. Such applications include object recognition and image compression.

The present invention provides an image processing apparatus or method in which an image is segmented in dependence upon edge strengths in the image.

The present invention provides an image processing apparatus or method in which an image is divided into pieces by connecting points in dependence upon the strength of edges therebetween. The pieces may be non-overlapping.

In many image processing applications, it is necessary to process edges identified in an image to determine whether any of the edges cross, and to remove the cross-overs. Such applications include image segmentation, object recognition and image data compression.

The present invention provides an image processing apparatus or method in which signals defining edges and the strengths thereof are processed to remove crossovers between the edges by considering pairs of edges in decreasing strength order. If two edges are thought to cross, the edge with the lower strength is deleted.

Embodiments of the invention will now be described by way of example only with reference to the accompanying drawings, in which:

FIG. 1 schematically shows the components of an image processing apparatus in an embodiment of the invention.

Figure 10A:
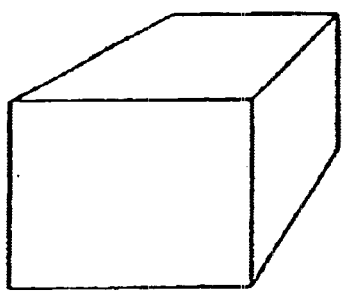
Figure 10B:
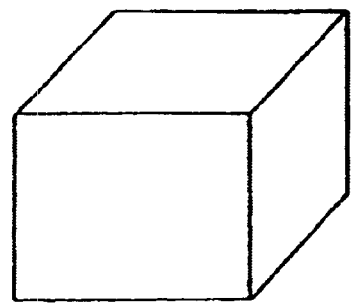

FIG. 10a and FIG. 10b schematically illustrate a "perspective" image and an "affine" image, respectively.

Figure 7:
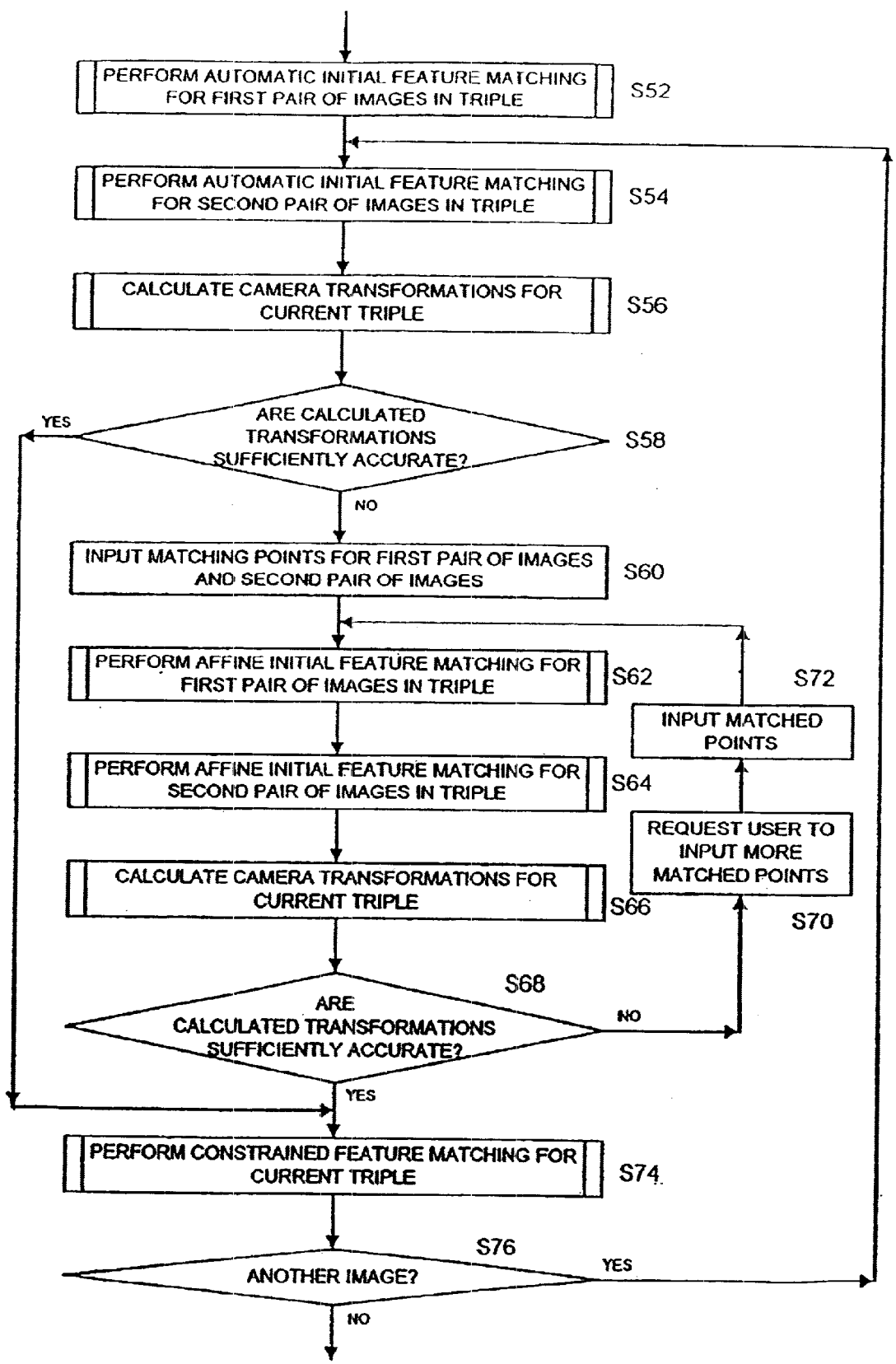
FIG. 7 shows in greater detail the relationship between the operations shown in FIG. 6.
Figure 11:
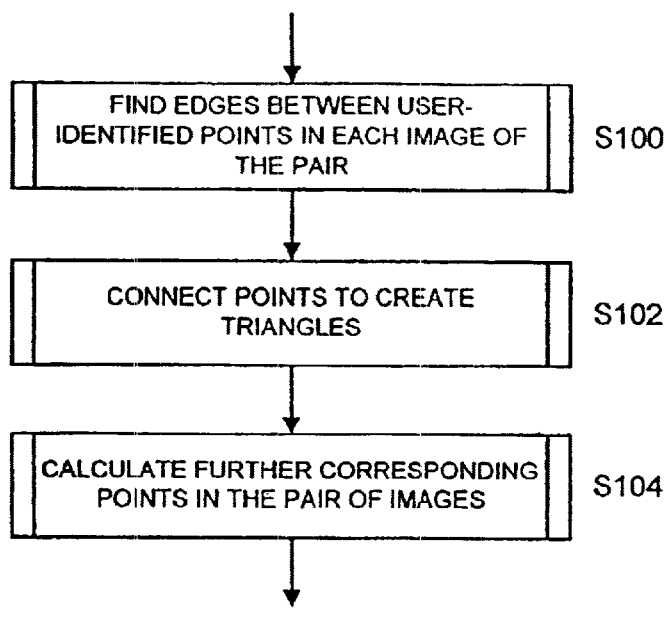

FIG. 11 shows, at a top level, the operations performed during affine initial feature matching for the first (or second) pair of images in a triple of images at step S62 or step S64 in FIG. 7.

Figure 12:
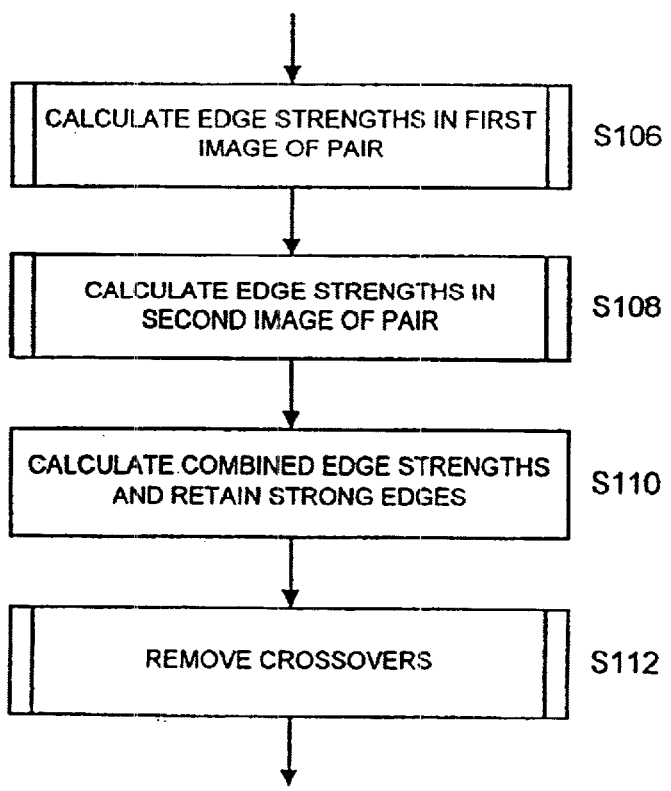

FIG. 12 shows the operations performed in finding the edges in each image of a pair of images at step S100 in FIG. 11.

Figure 13:
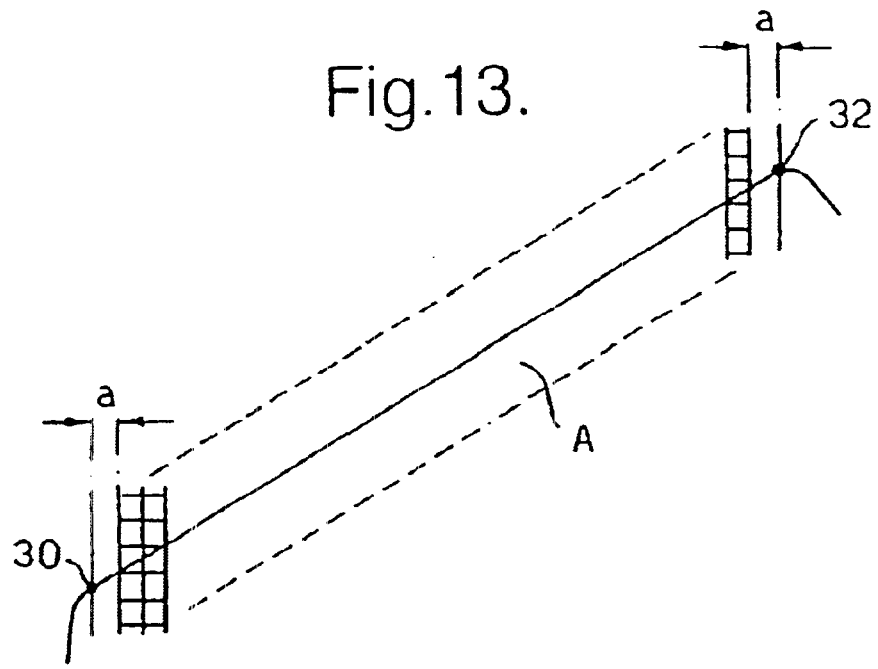

FIG. 13 illustrates the pixels which are considered when calculating edge strengths at step S106 or step S108 in FIG. 12.

Figure 14:
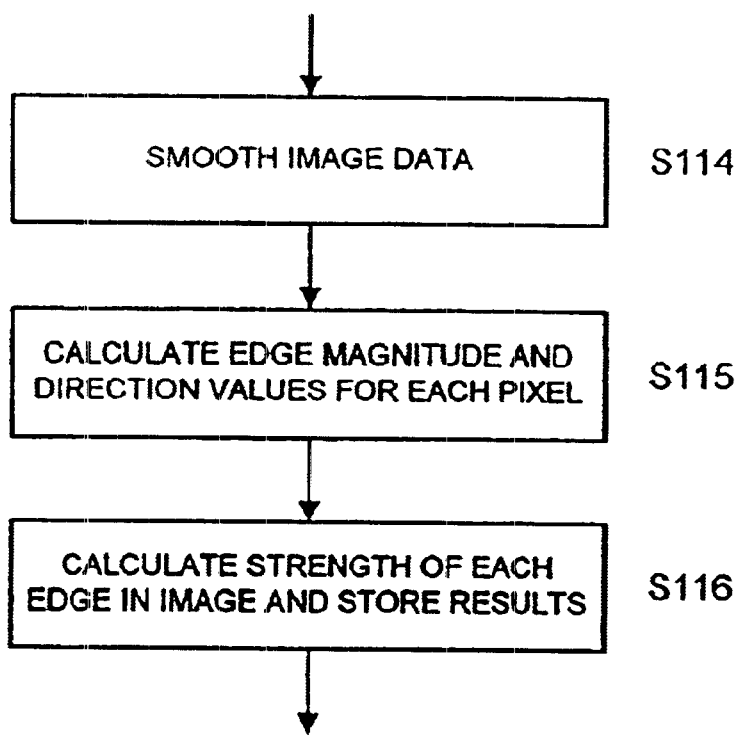

FIG. 14 shows the operations performed when calculating edge strengths at step S106 and step S108 in FIG. 12.

Figure 15:
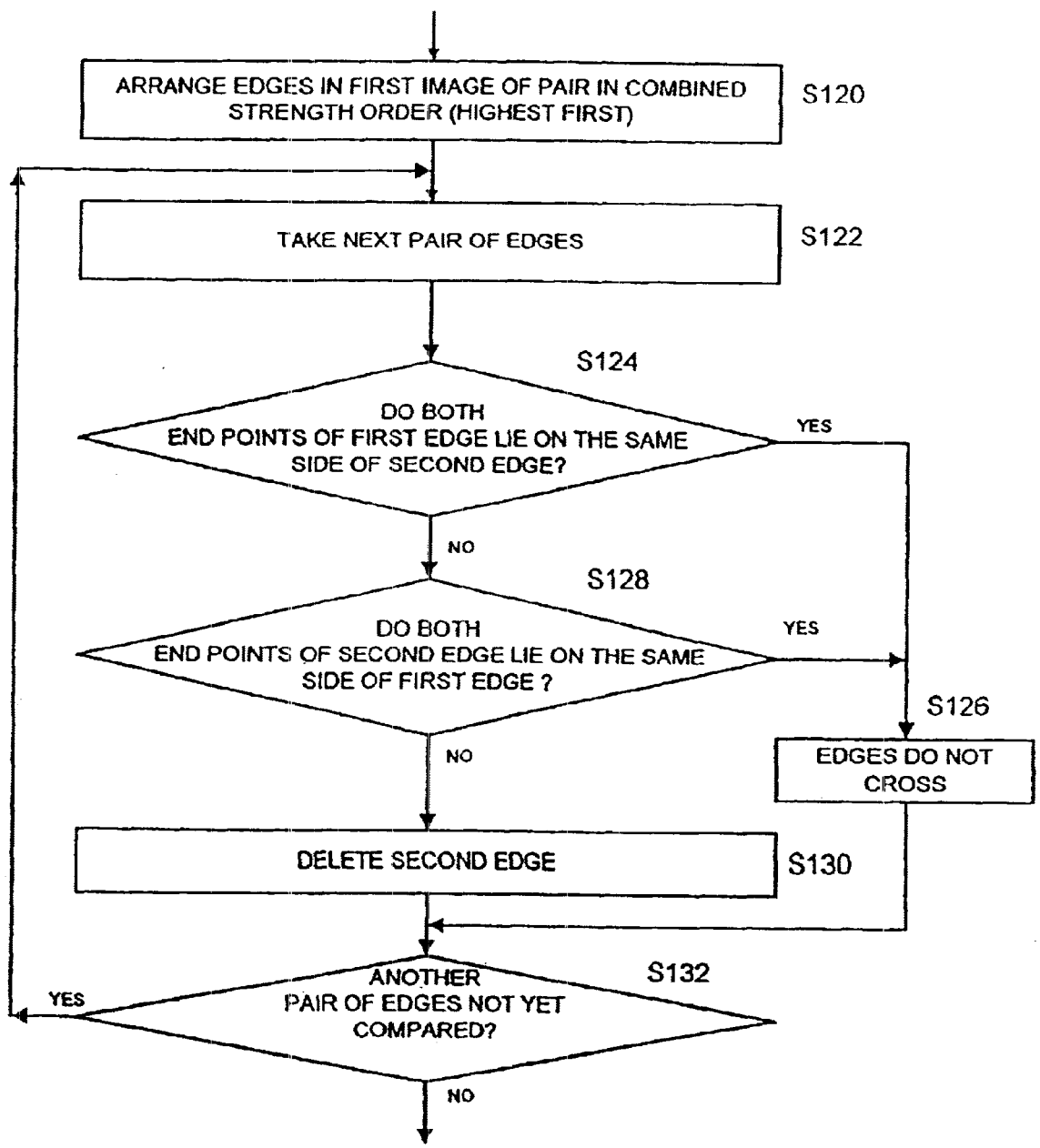

FIG. 15 shows the operations performed when removing edges which cross over other edges at step S112 in FIG. 12.

Figure 16A:
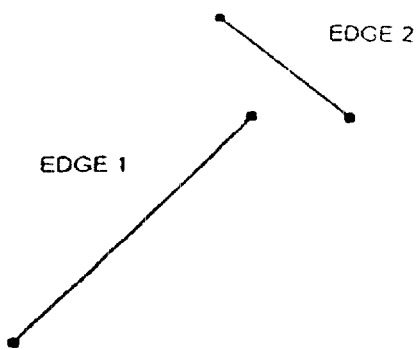
Figure 16B:
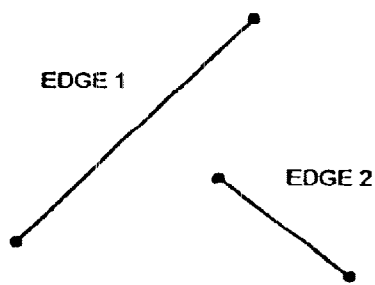
Figure 16C:
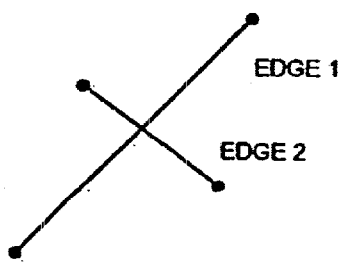

FIG. 16a, FIG. 16b and FIG. 16c show examples of two edges, FIGS. 16a and 16b showing examples in which the edges do not cross, and FIG. 16c showing an example in which the edges do cross.

Figure 17:
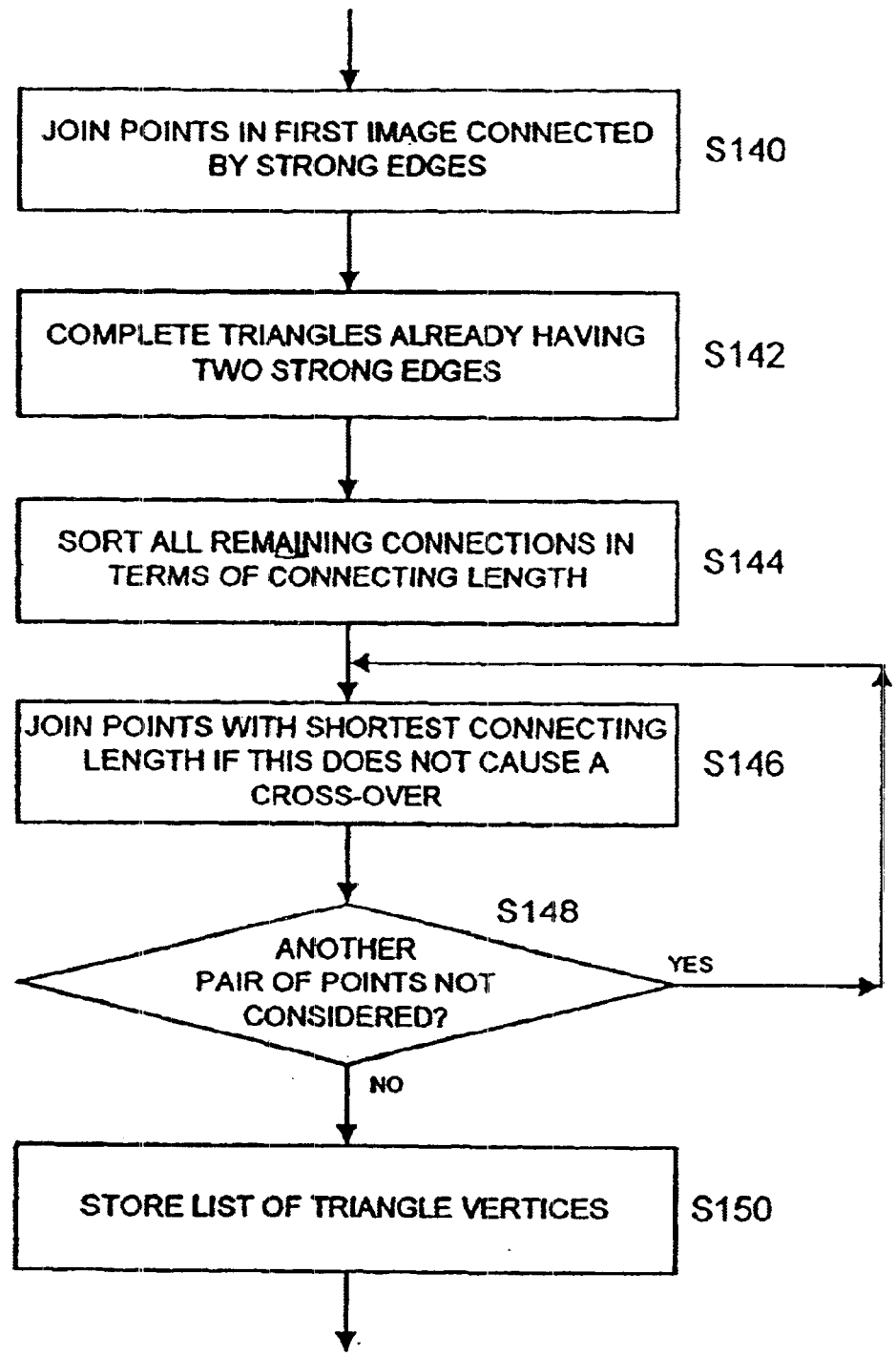

FIG. 17 shows the operations performed when triangulating points at step S102 in FIG. 11.

Figure 18A:
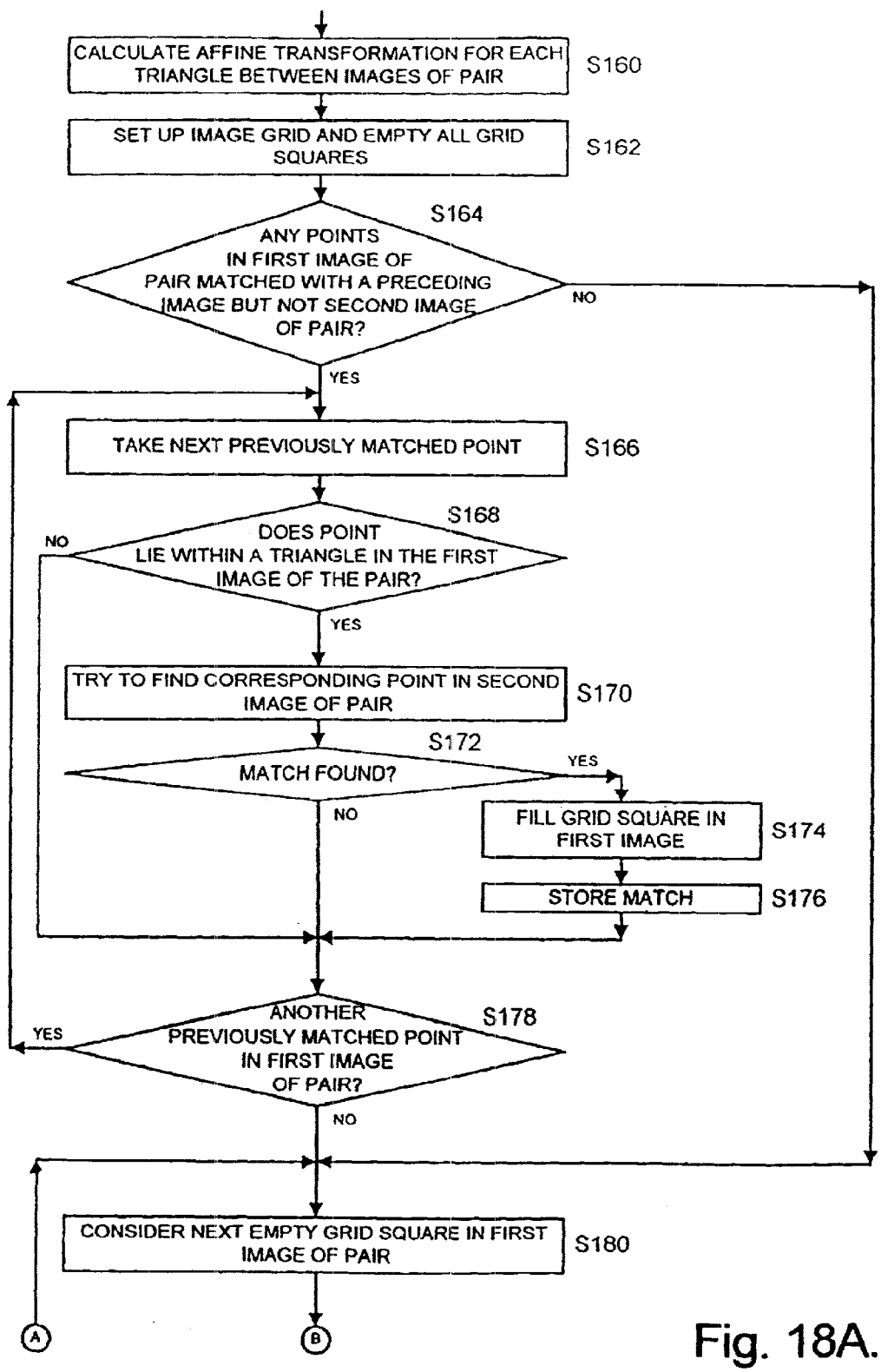
Figure 18B:
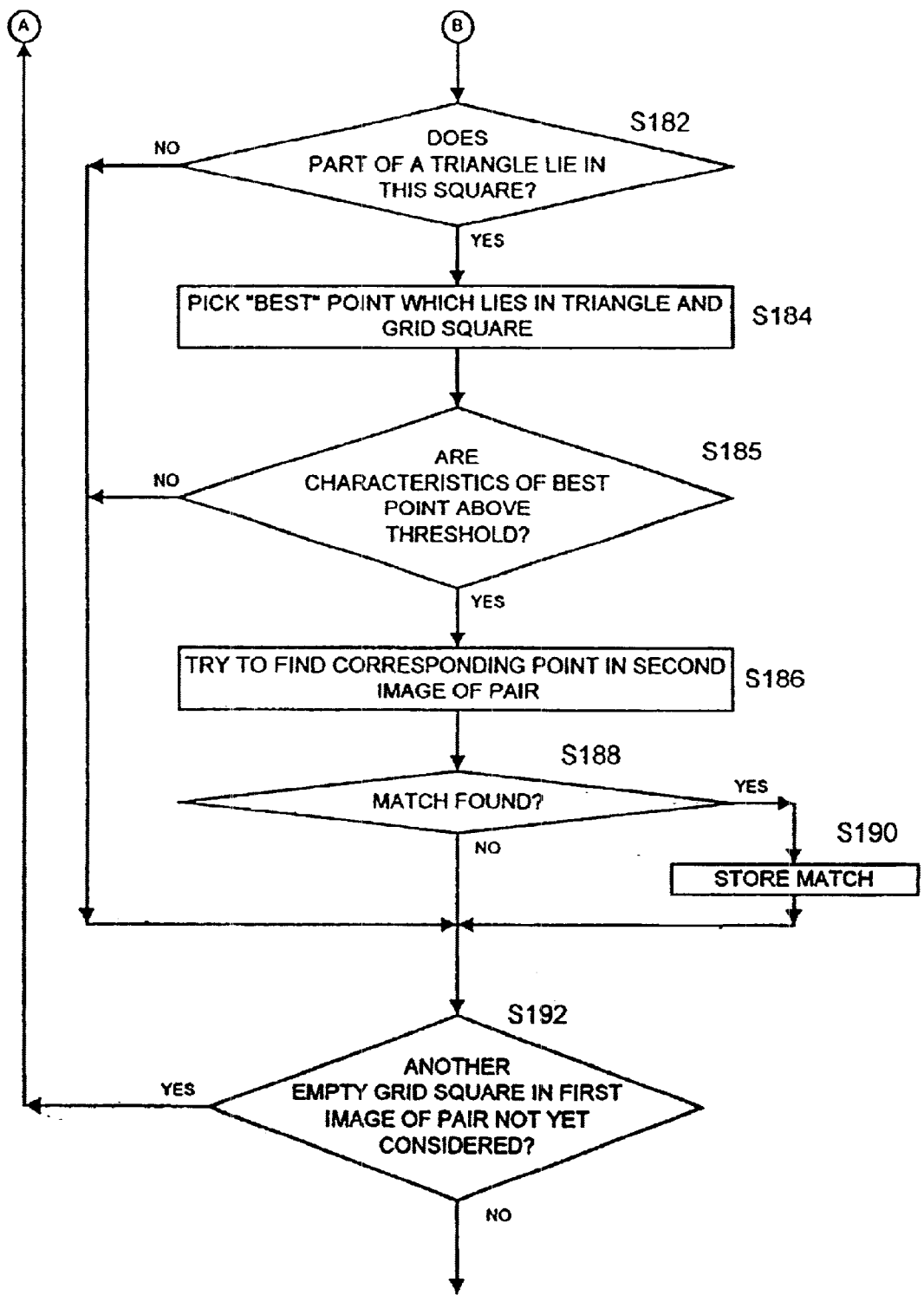

FIG. 18, which consists of FIGS. 18A and 18B, shows the operations performed when calculating further corresponding points in a pair of images at step S104 in FIG. 11.

Figure 19:
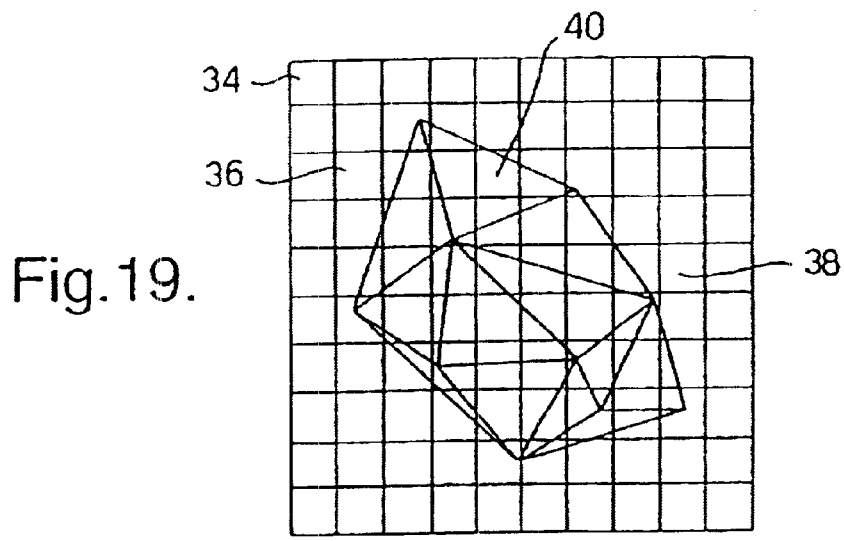

FIG. 19 illustrates the use of a grid of squares at steps S162, S174 and S180 in FIG. 18.

Figure 20:
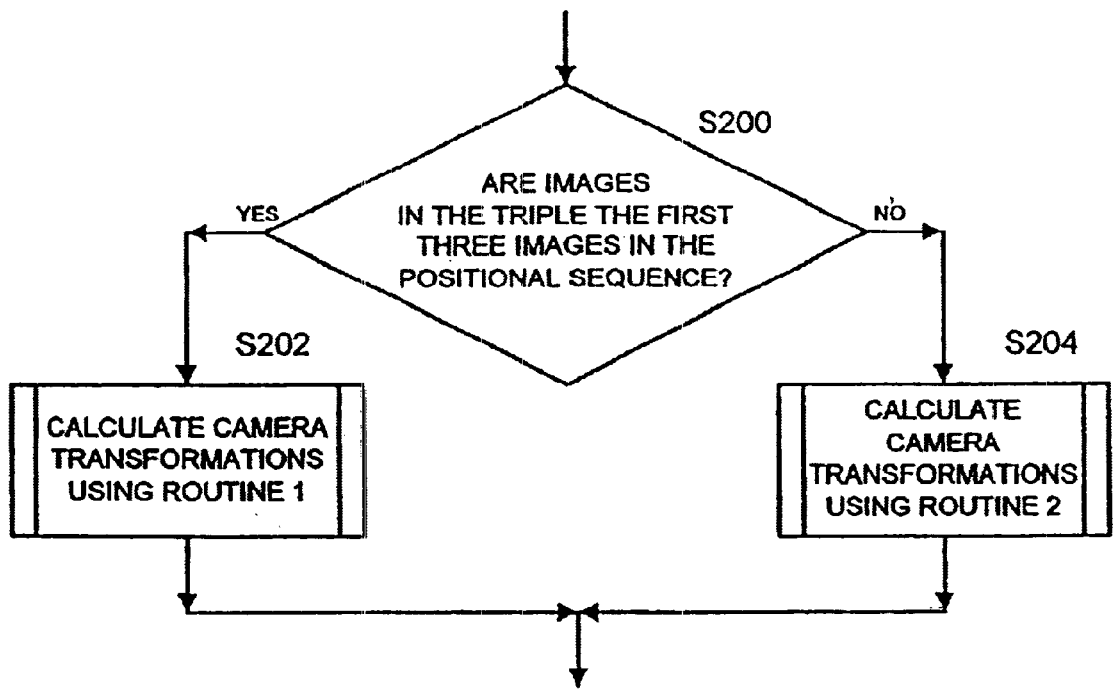

FIG. 20 shows, at a top level, the operations performed when calculating the camera transformations for a triple of images at steps S56 and S66 in FIG. 7.

Figure 21:
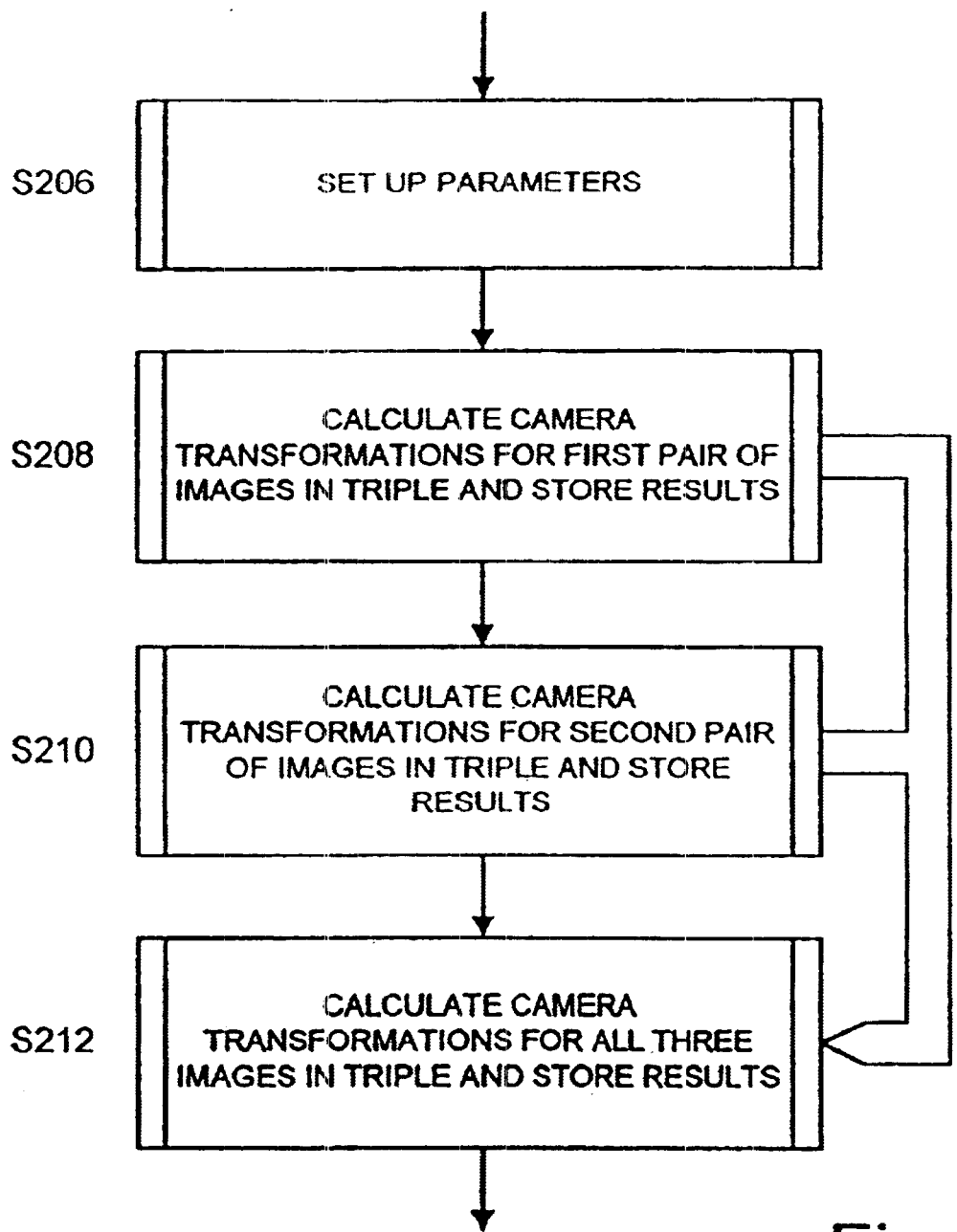

FIG. 21 shows, at a top level, the operations performed when carrying out processing routine 1 at step S202 in FIG. 20.

Figure 22:
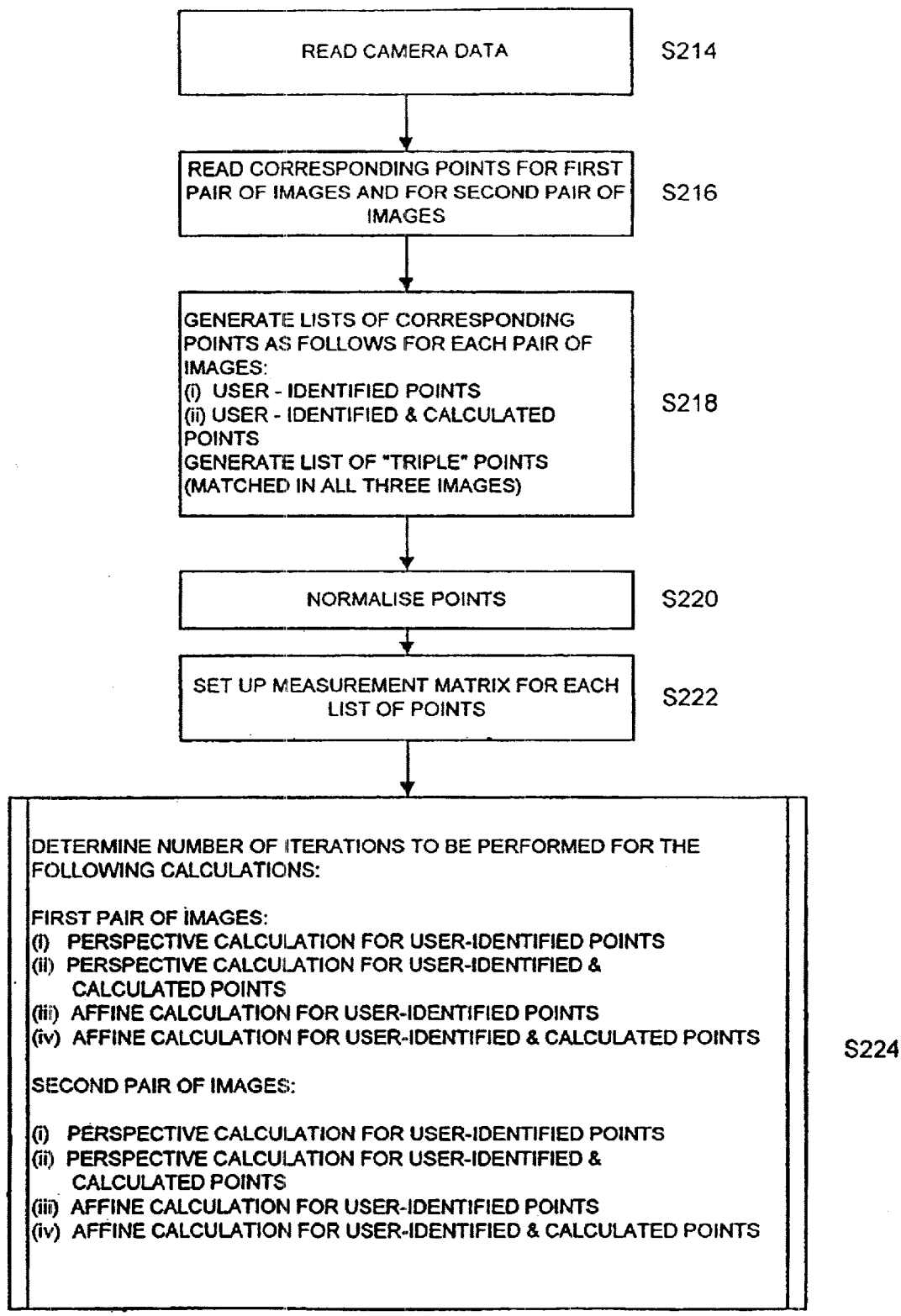

FIG. 22 shows the operations performed when setting up the parameters at step S206 in FIG. 21.

Figure 23:
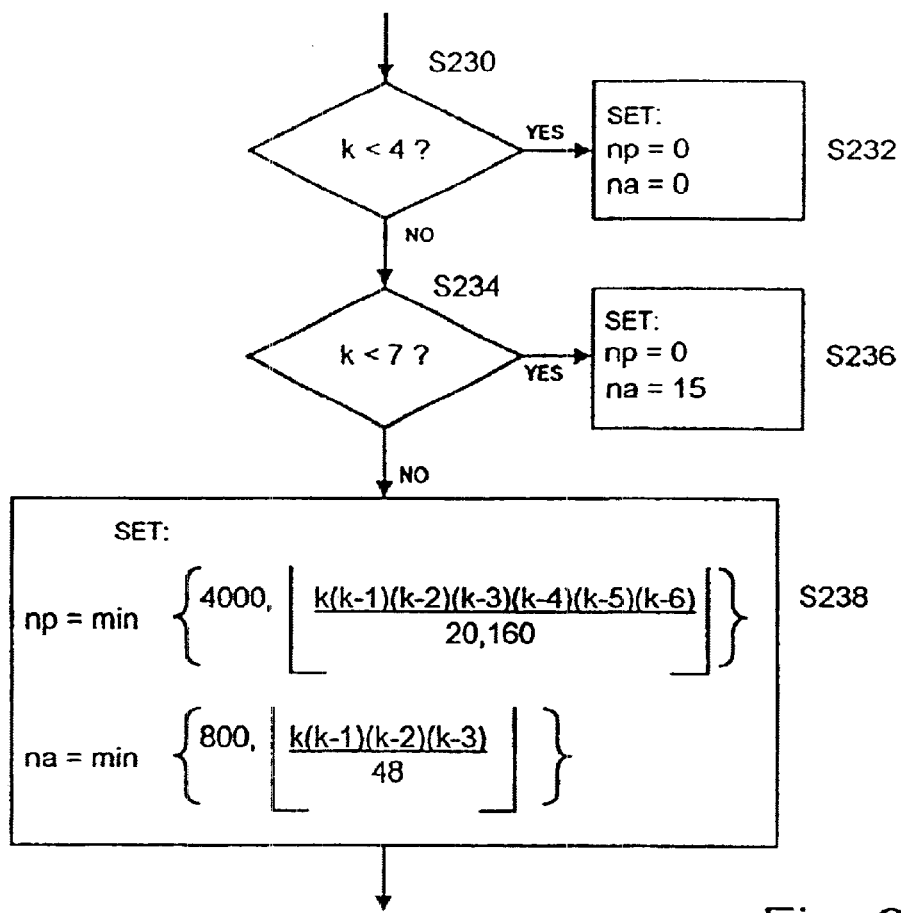

FIG. 23 shows the operations performed in determining the number of iterations to be carried out at step S224 in FIG. 22.

Figure 24:
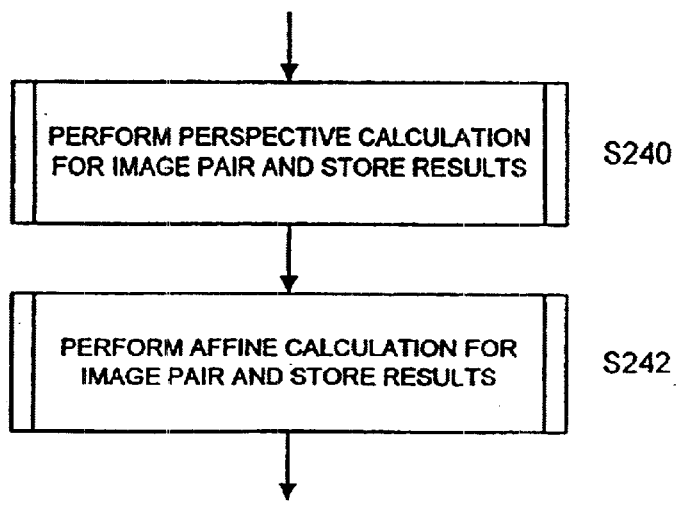

FIG. 24 shows, at a top level, the operations performed when calculating the camera transformations for a first pair of images in a triple or a second pair of images in a triple at step S208 or step S210 in FIG. 21.

Figure 25A:
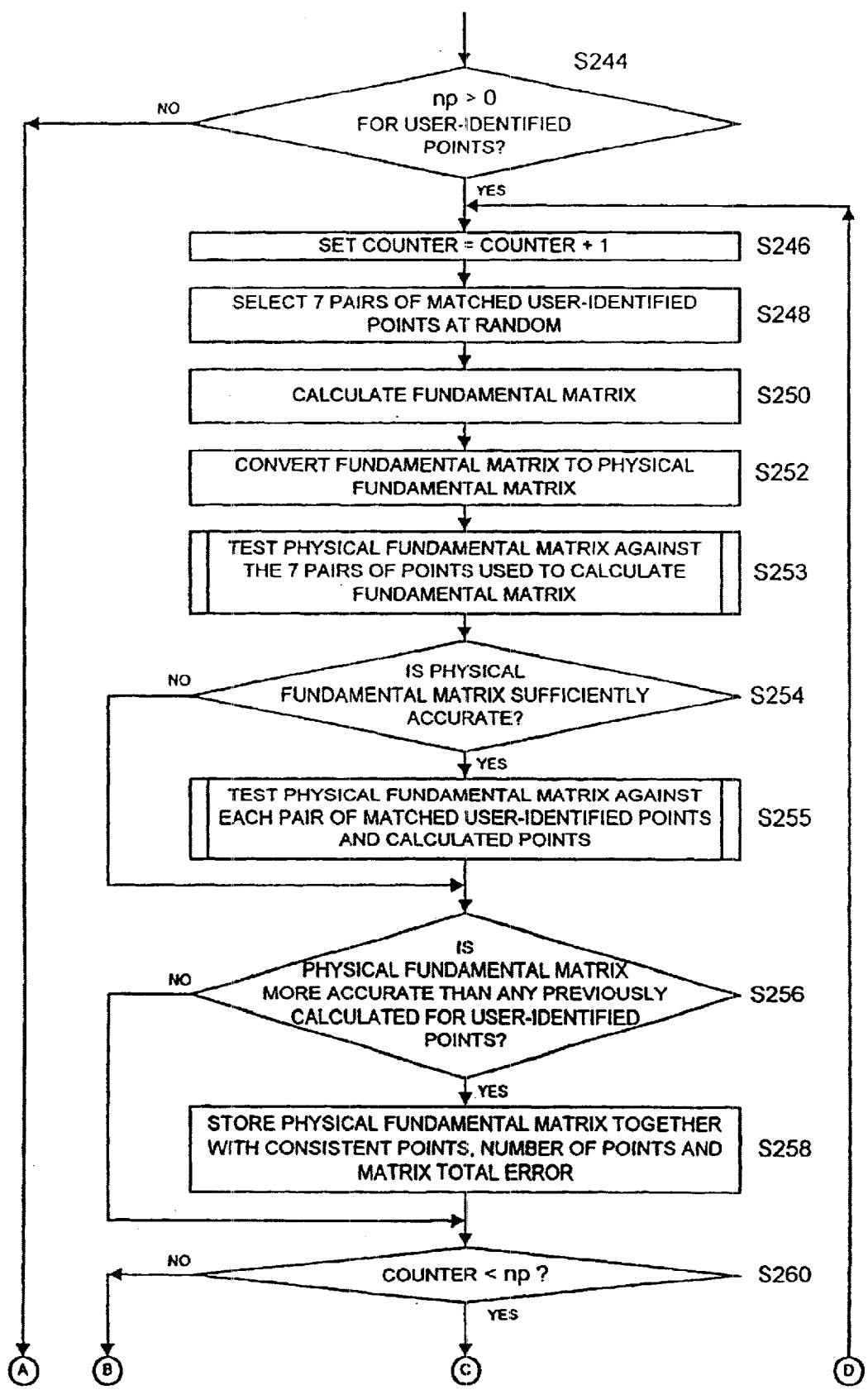
Figure 25B:
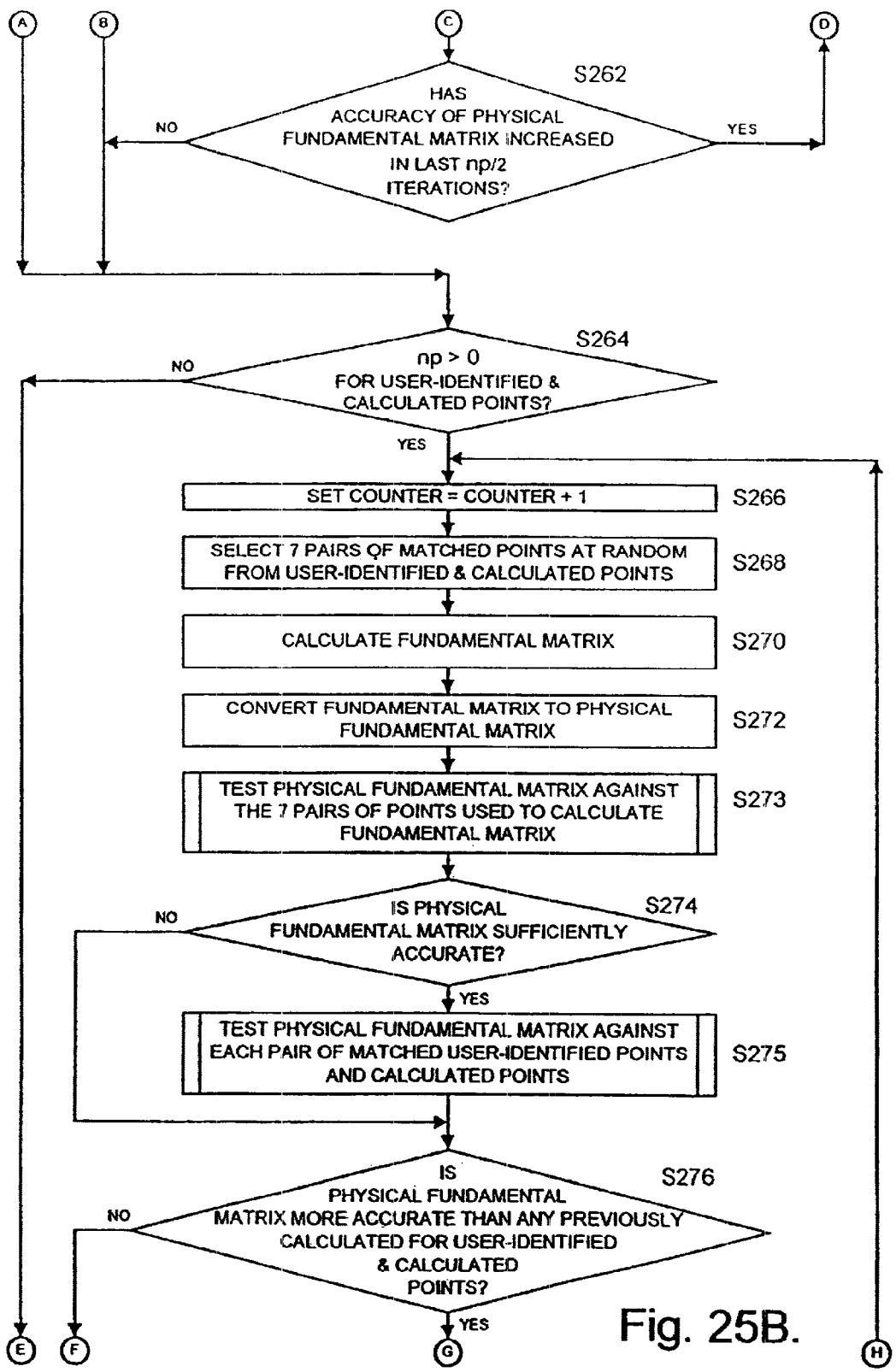
Figure 25C:
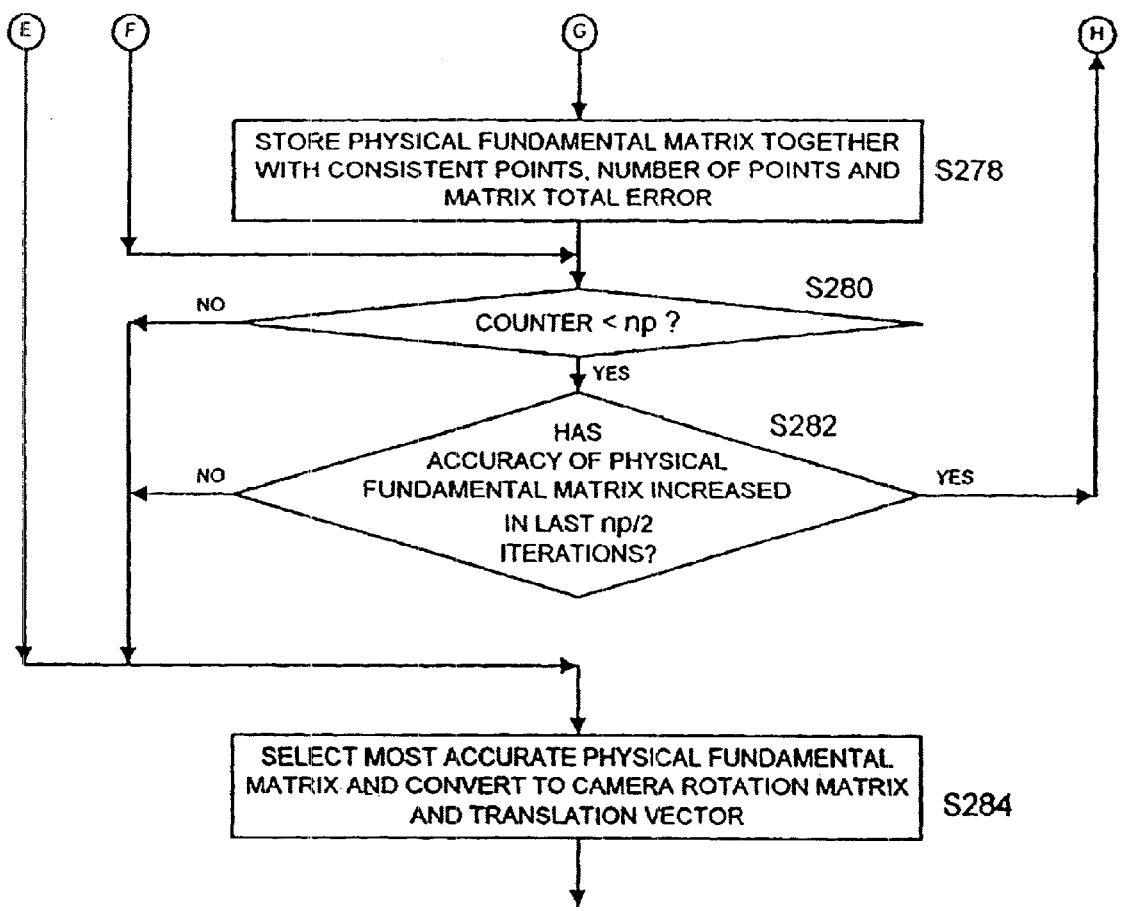

FIG. 25, which consists of FIGS. 25A, 25B and 25C, shows the operations performed when carrying out a perspective calculation for an image pair at step S240 in FIG. 24.

Figure 26:
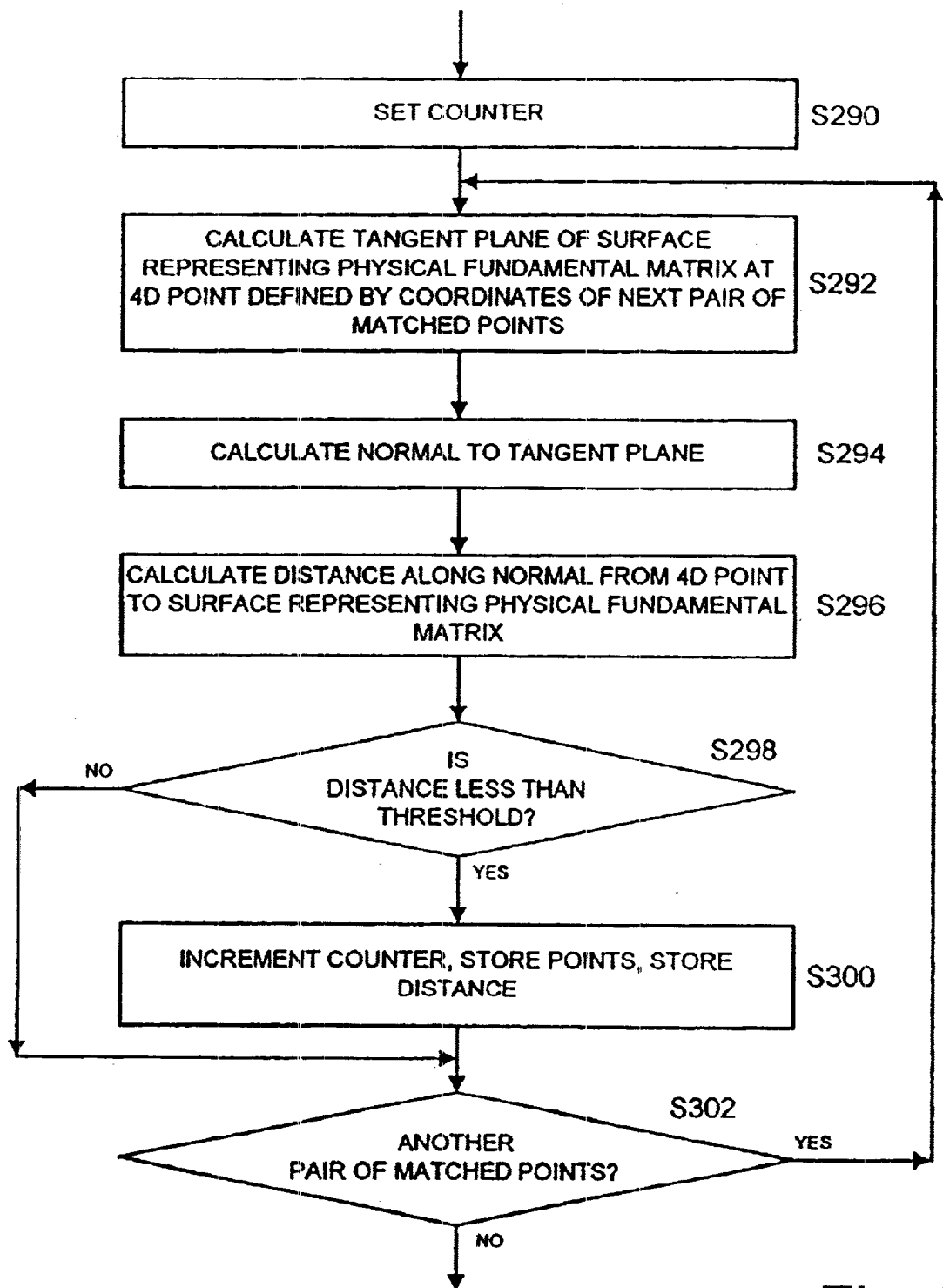

FIG. 26 shows the operations performed when testing the physical fundamental matrix against each pair of matched user-identified points and calculated points at steps S254 and S274 in FIG. 25.

Figure 27A:
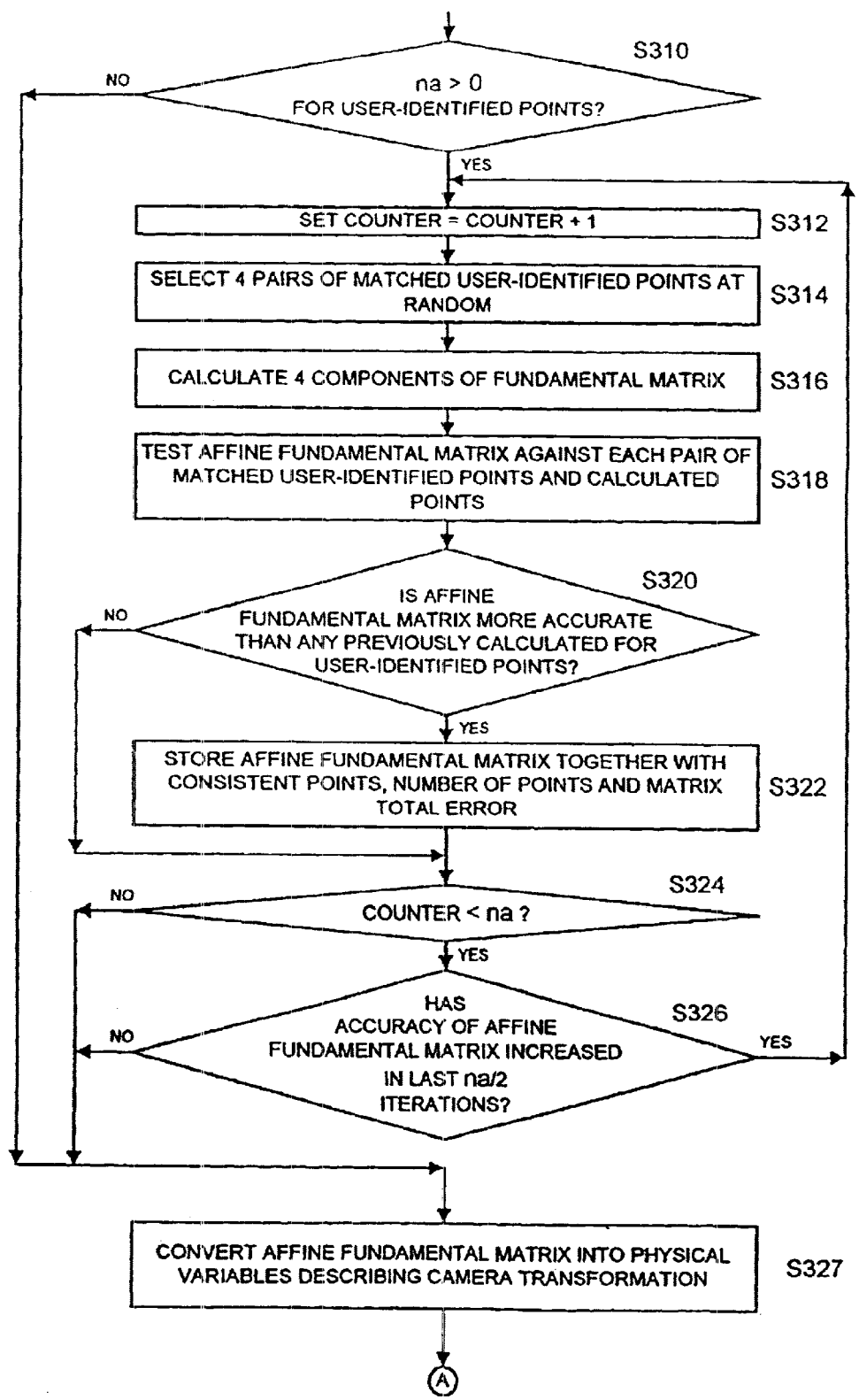
Figure 27B:
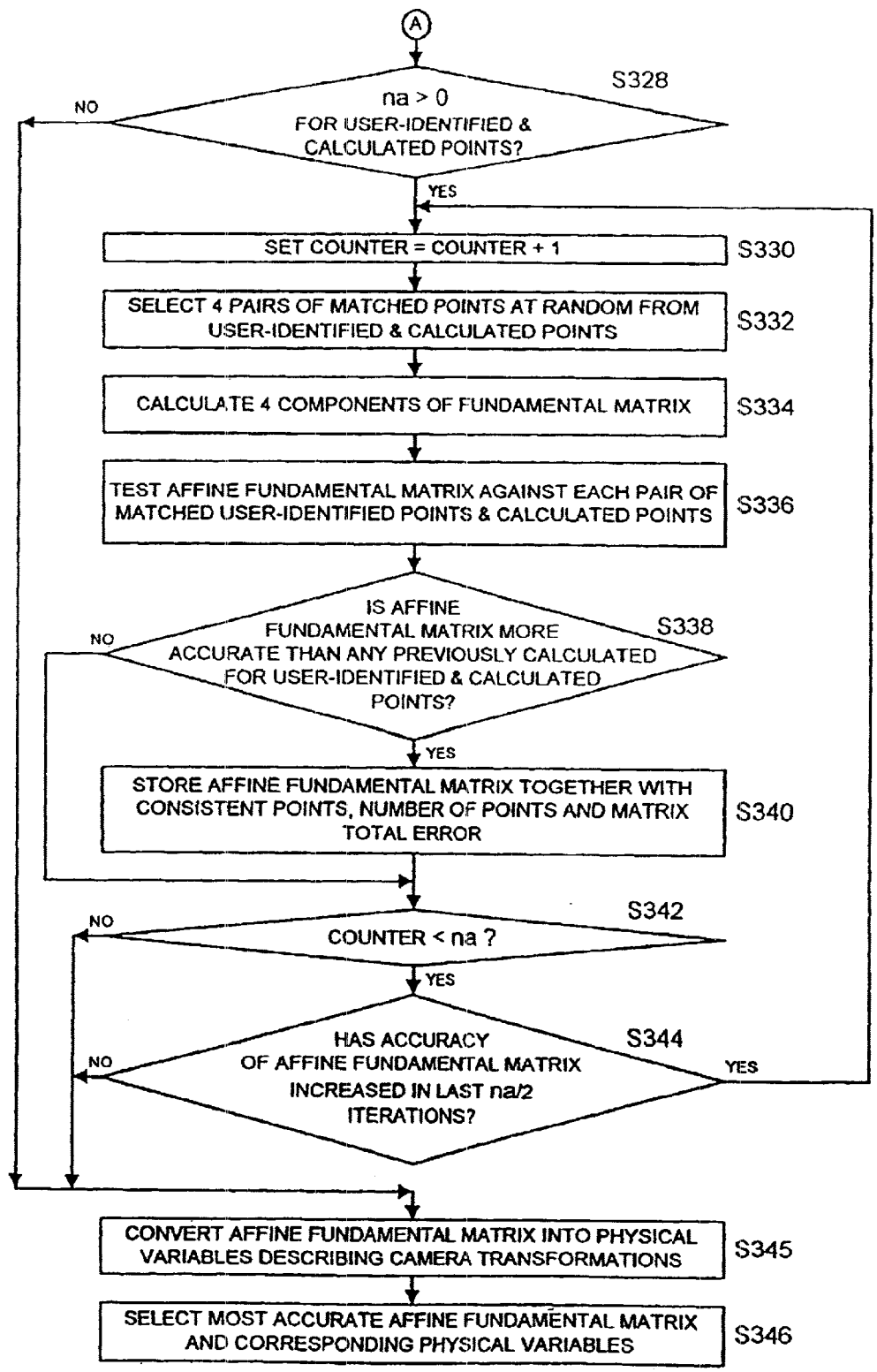

FIG. 27, which consists of FIGS. 27A and 27B, shows the operations performed when carrying out an affine calculation for an image pair at S242 in FIG. 24.

Figure 28:
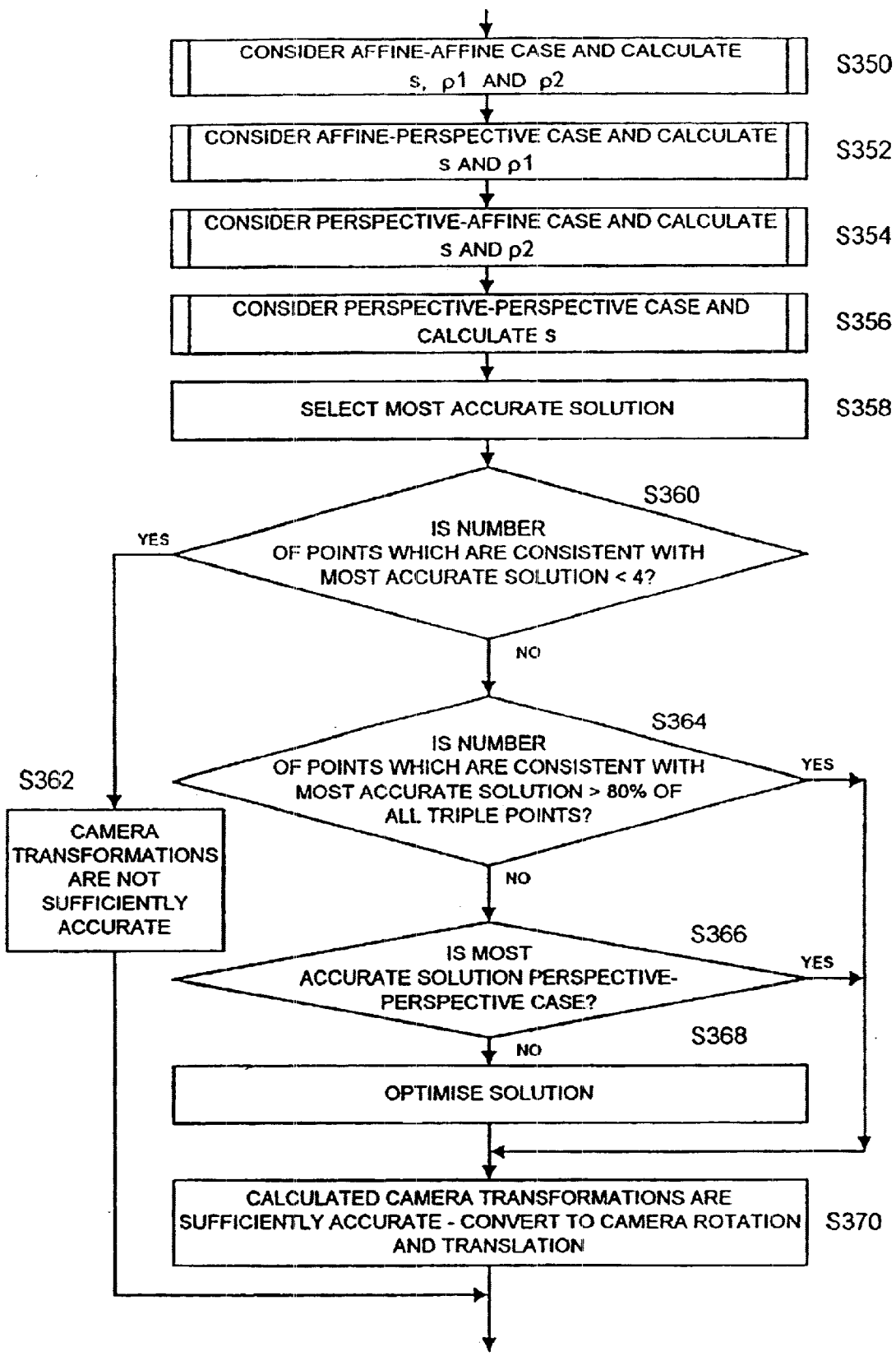

FIG. 28 shows the operations performed when calculating the camera transformations for all three images in a triple at step S212 in FIG. 21.

FIG. 29 illustrates the scale, s, and the rotation angles $\rho 1$ and $\rho 2$ for the three images in a triple.

Figure 30:
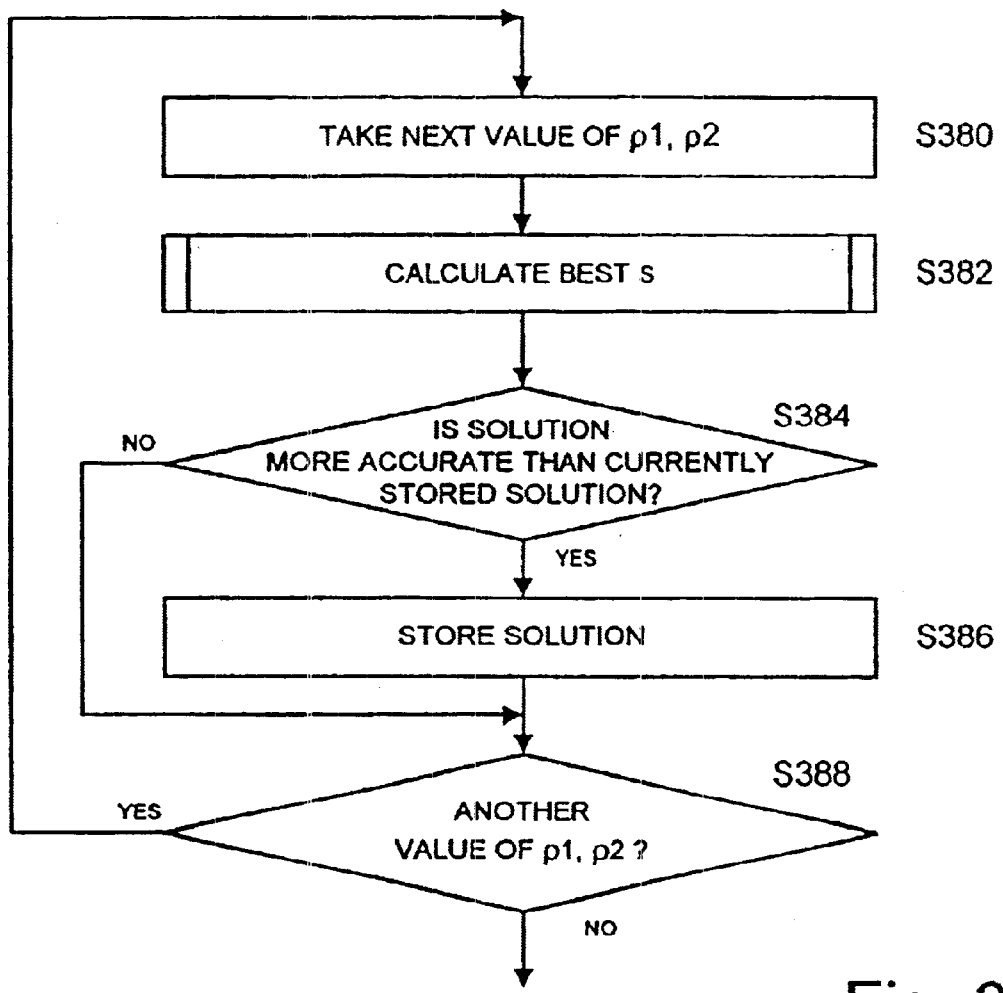

FIG. 30 shows the operations performed when calculating s and/or $\rho 1$ and/or $\rho 2$ at steps S350, S352, S354 and S356 in FIG. 28.

FIGS. 31a, 31b, 31c and 31d illustrate the different $\rho 1$, $\rho 2$ combinations considered at step S380 in FIG. 30.

Figure 32:
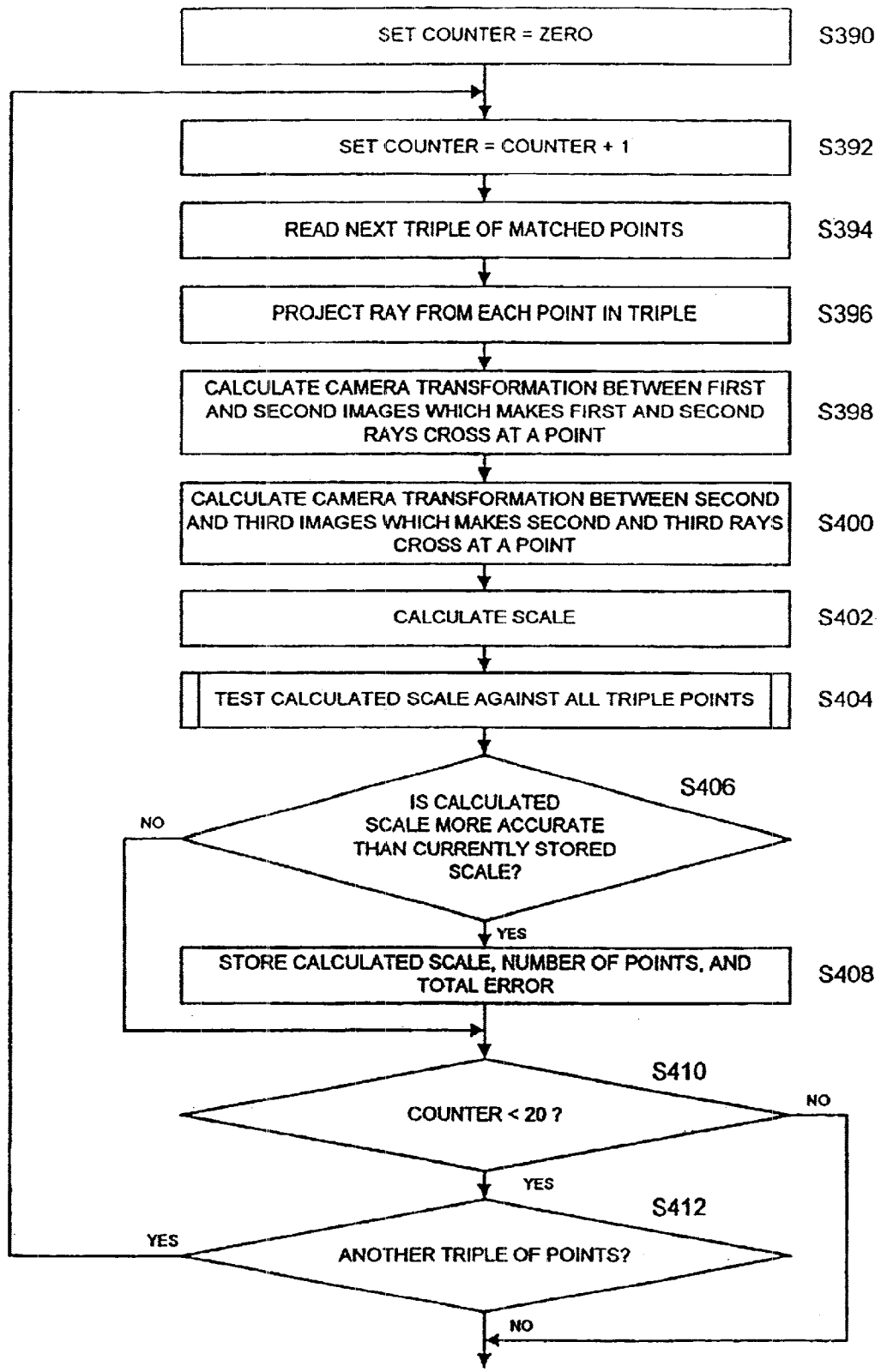

FIG. 32 shows the operations performed when calculating the best scale at step S382 in FIG. 30.

Figure 33:
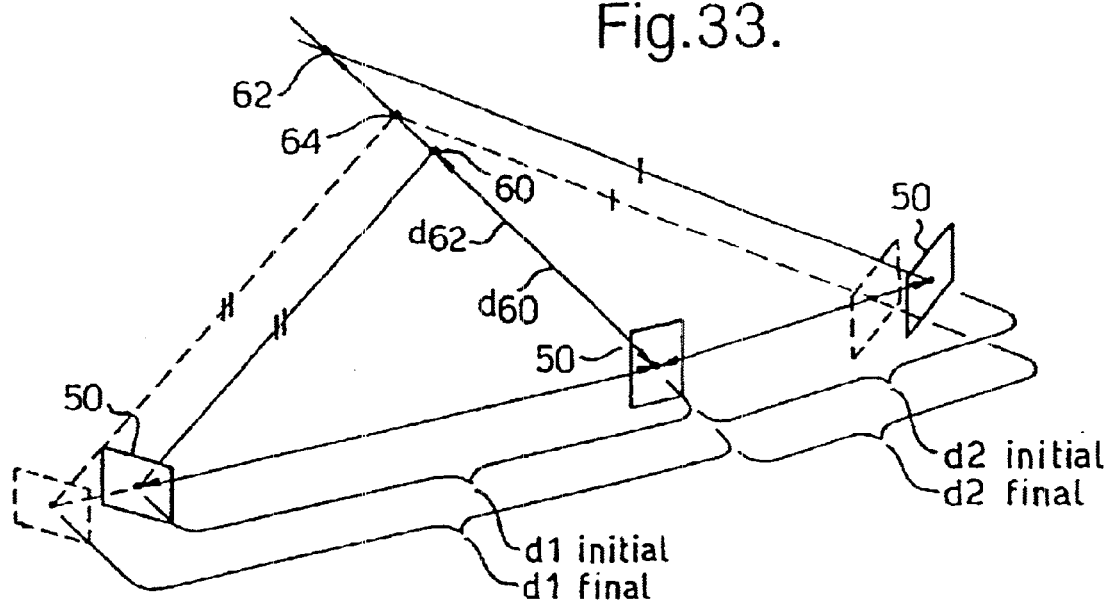

FIG. 33 illustrates how the translation of a camera is varied at step S400 in FIG. 32 to make rays from all three cameras cross at a single point.

Figure 34:
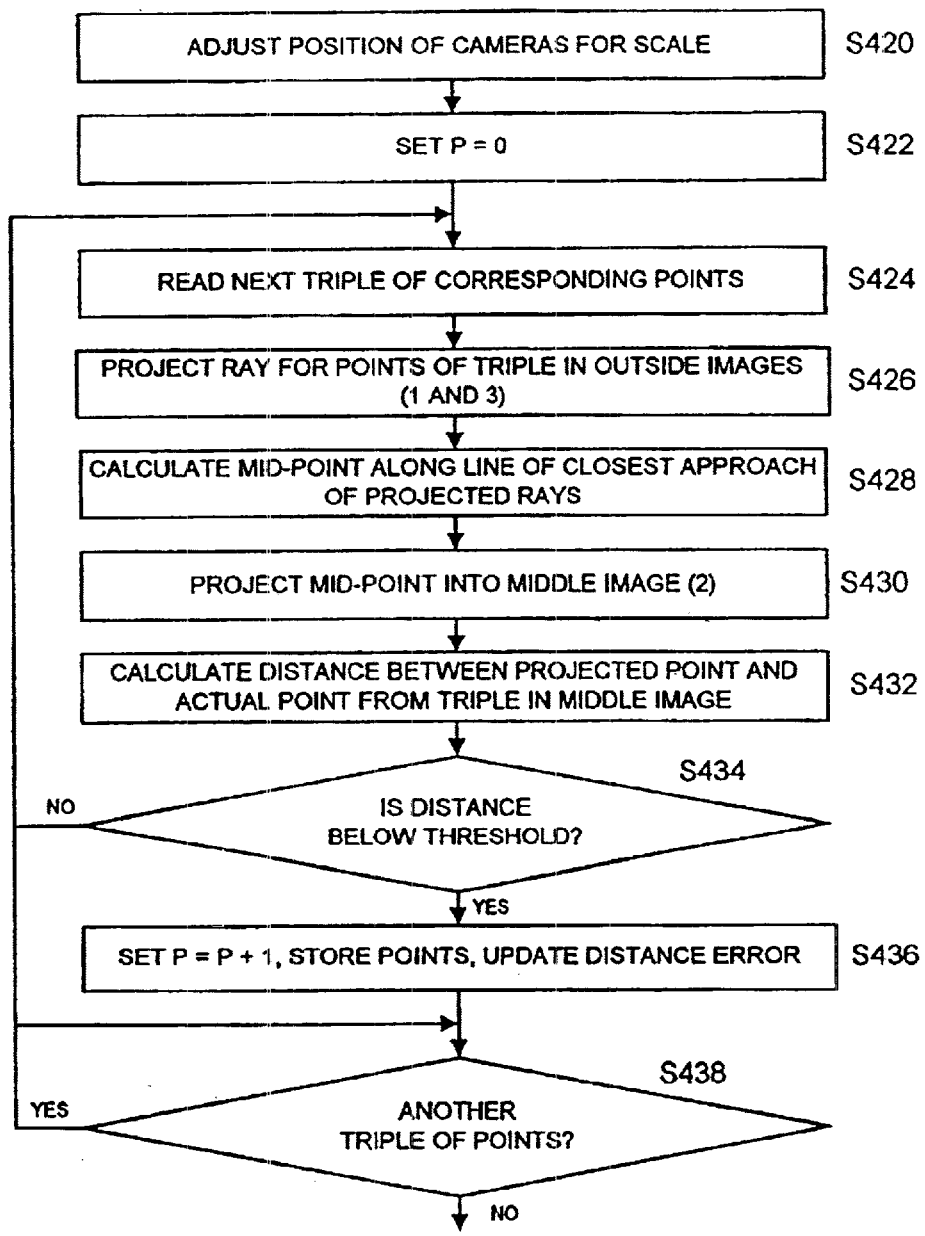

FIG. 34 shows the operations performed to test the calculated scale against all triple points at step S404 in FIG. 32.

Figure 35:
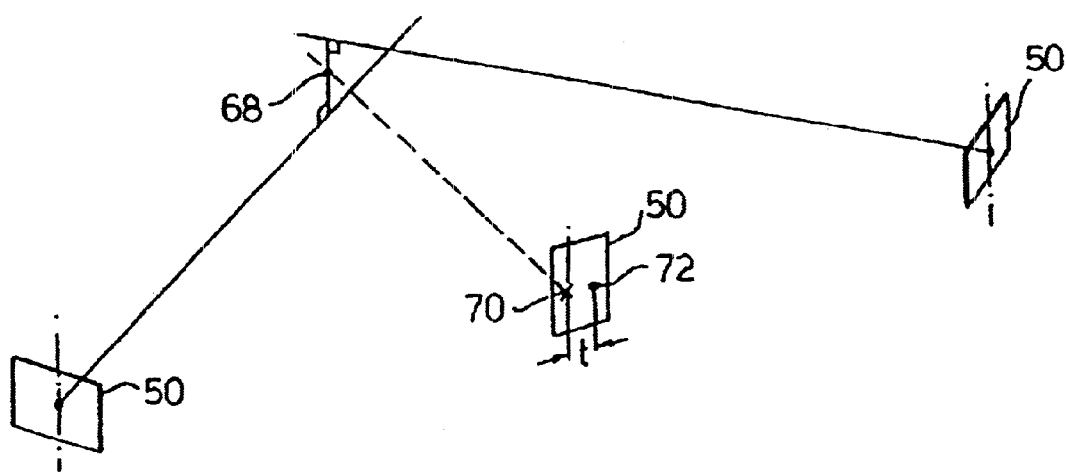

FIG. 35 illustrates the projection of rays for points in the outside images of a triple of images at step S426 in FIG. 34.

Figure 36:
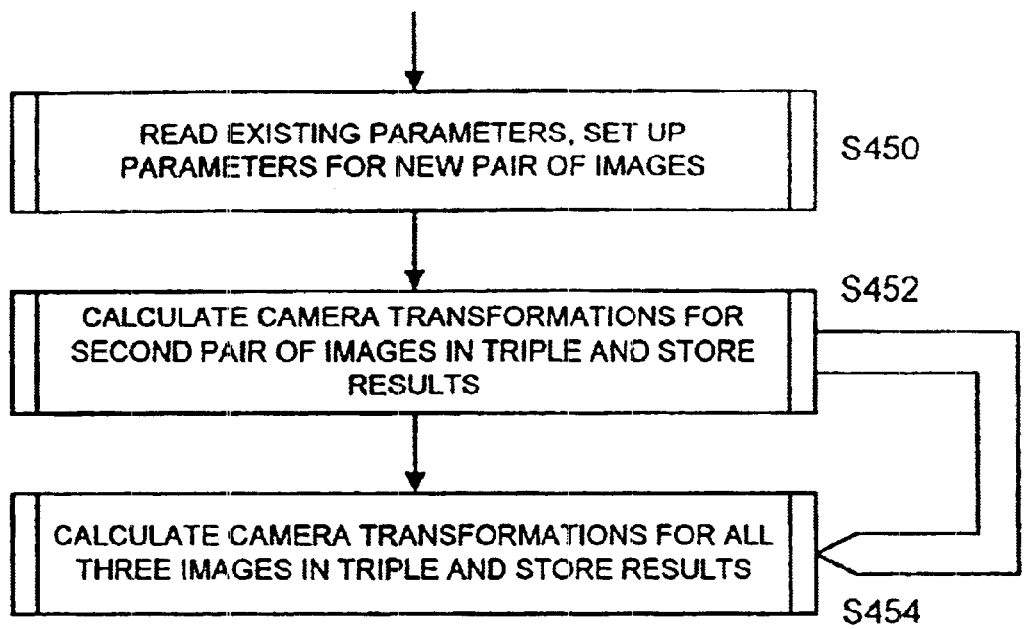

FIG. 36 shows, at a top level, the operations performed when carrying out processing routine 2 at step S204 in FIG. 20.

Figure 37:
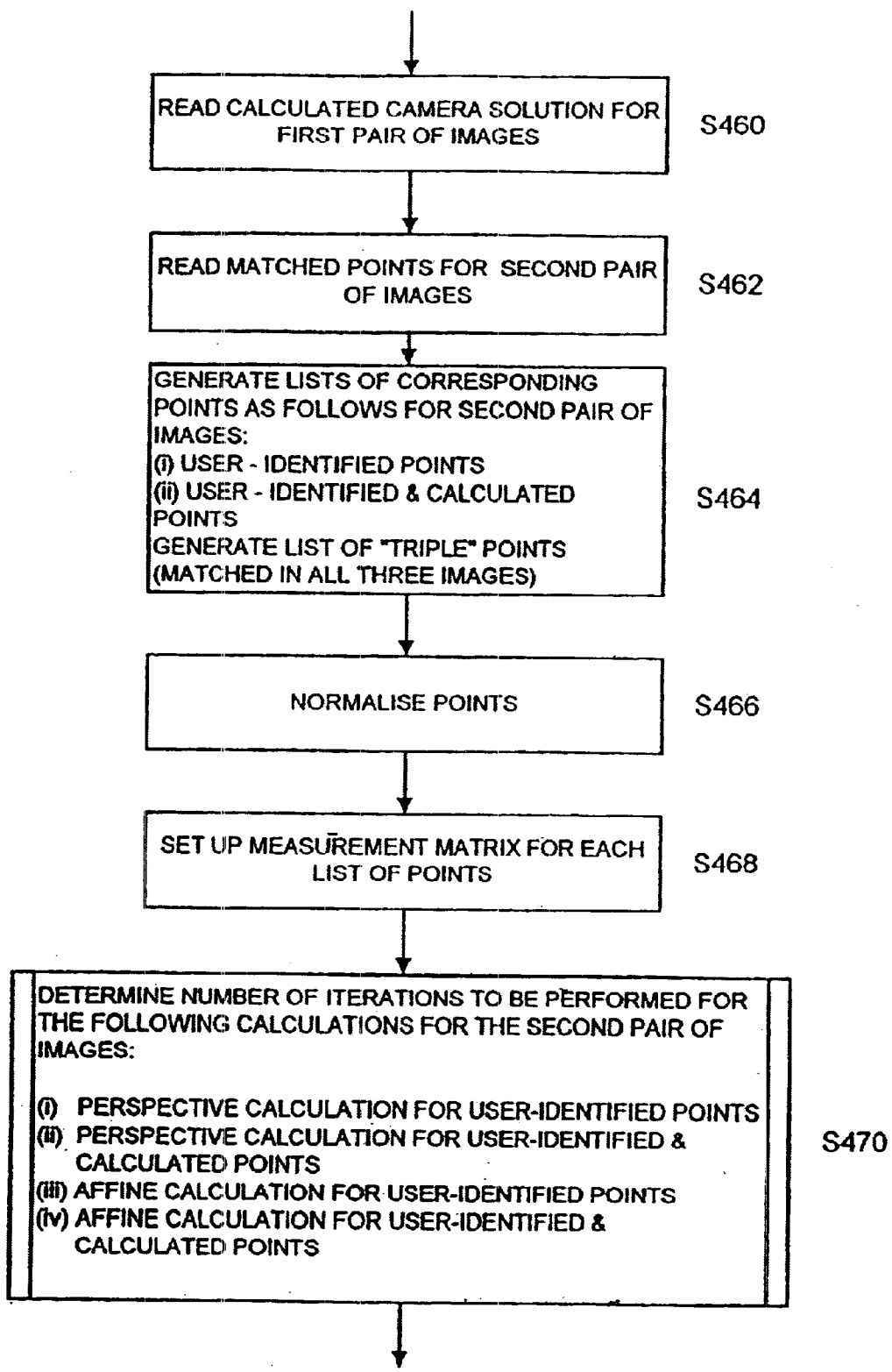

FIG. 37 shows the operations performed when reading existing parameters and setting up parameters for the new pair of images at step S450 in FIG. 36.

Figure 38:
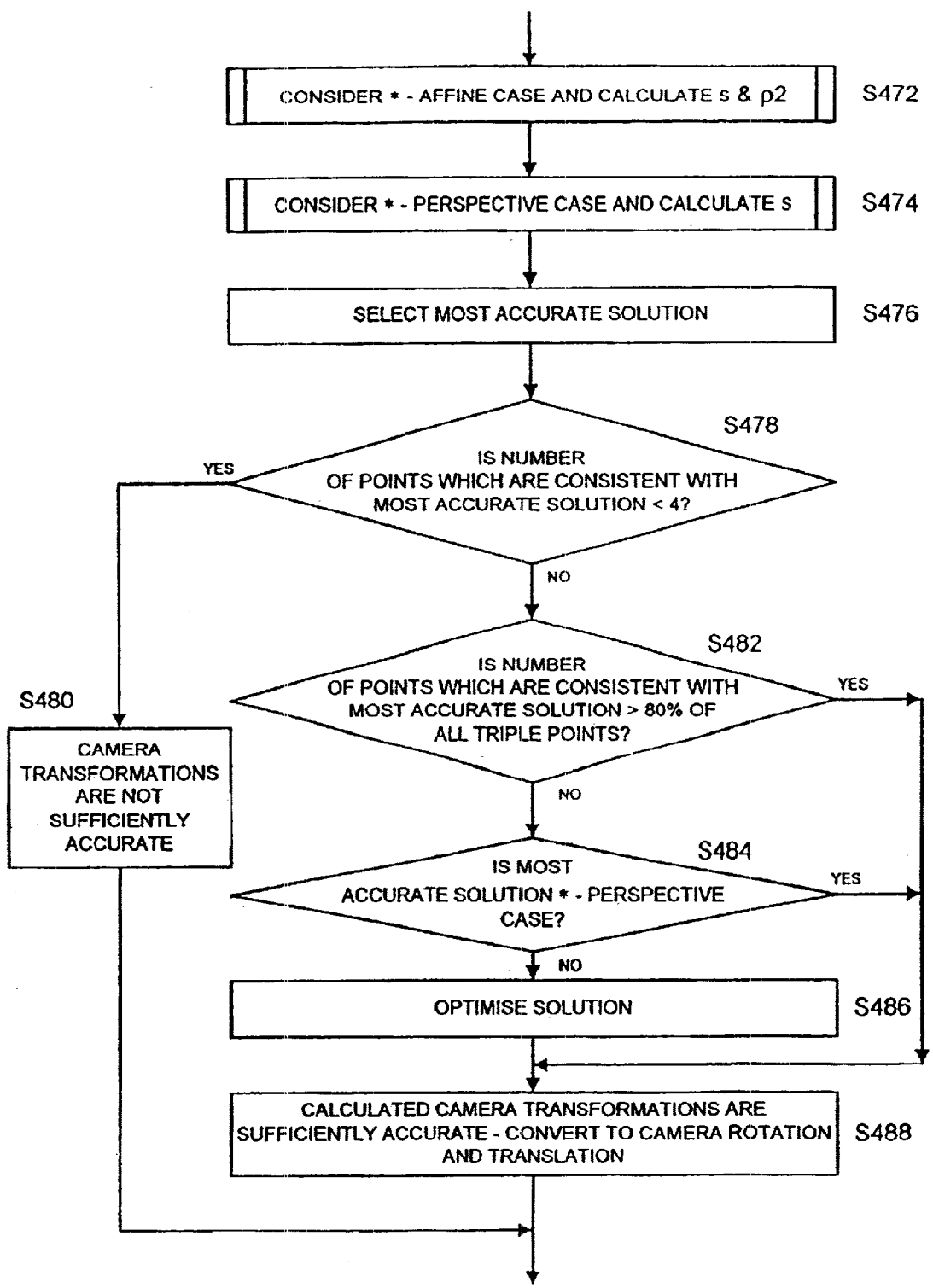

FIG. 38 shows the operations performed when calculating the camera transformations for all three images in a triple at step S454 in FIG. 36.

Figure 39:
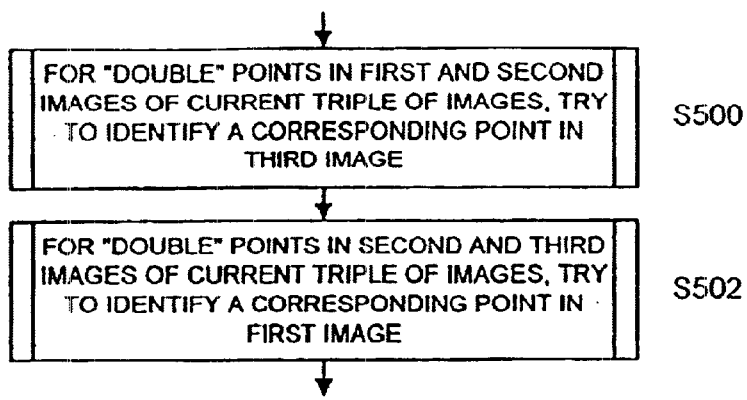

FIG. 39 shows, at a top level, the operations carried out when performing constrained feature matching for a triple of images at step S74 in FIG. 7.

Figure 40:
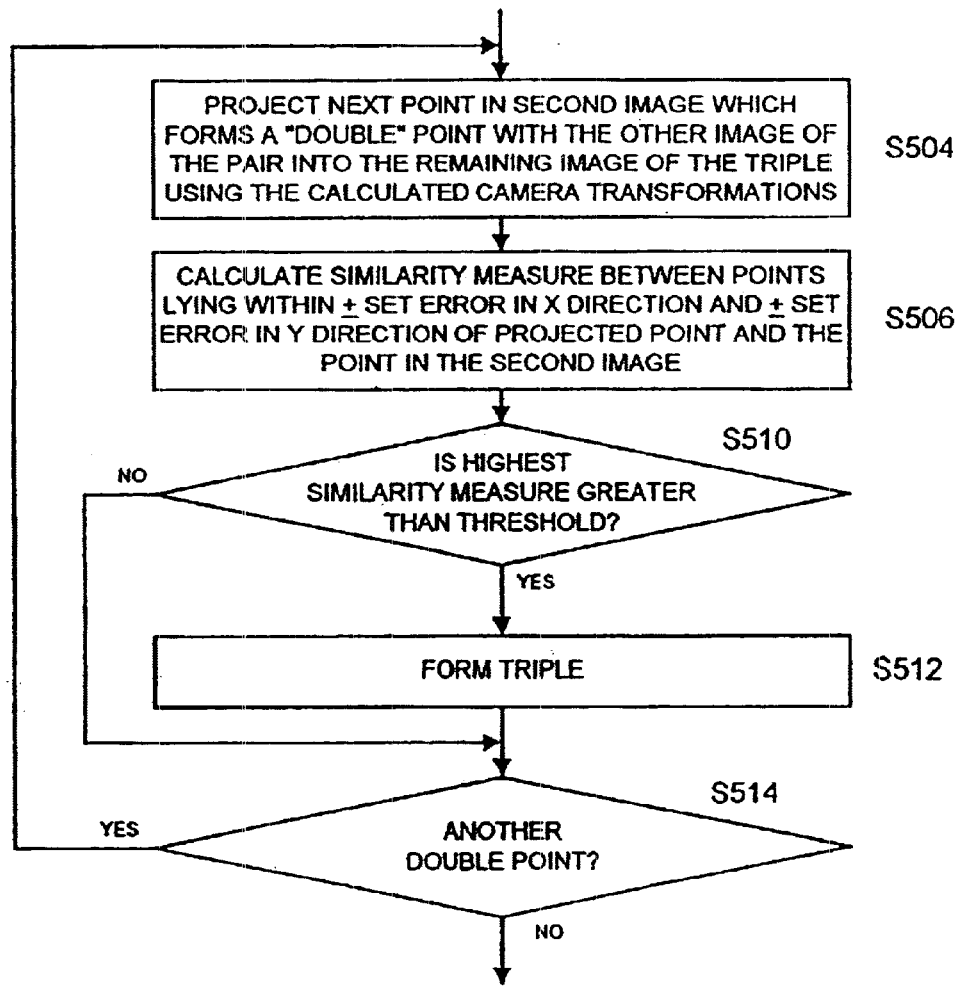

FIG. 40 shows the operations performed at steps S500 and S502 in FIG. 39 when performing processing to try to identify a corresponding point for each existing "double" point.

Figure 3:
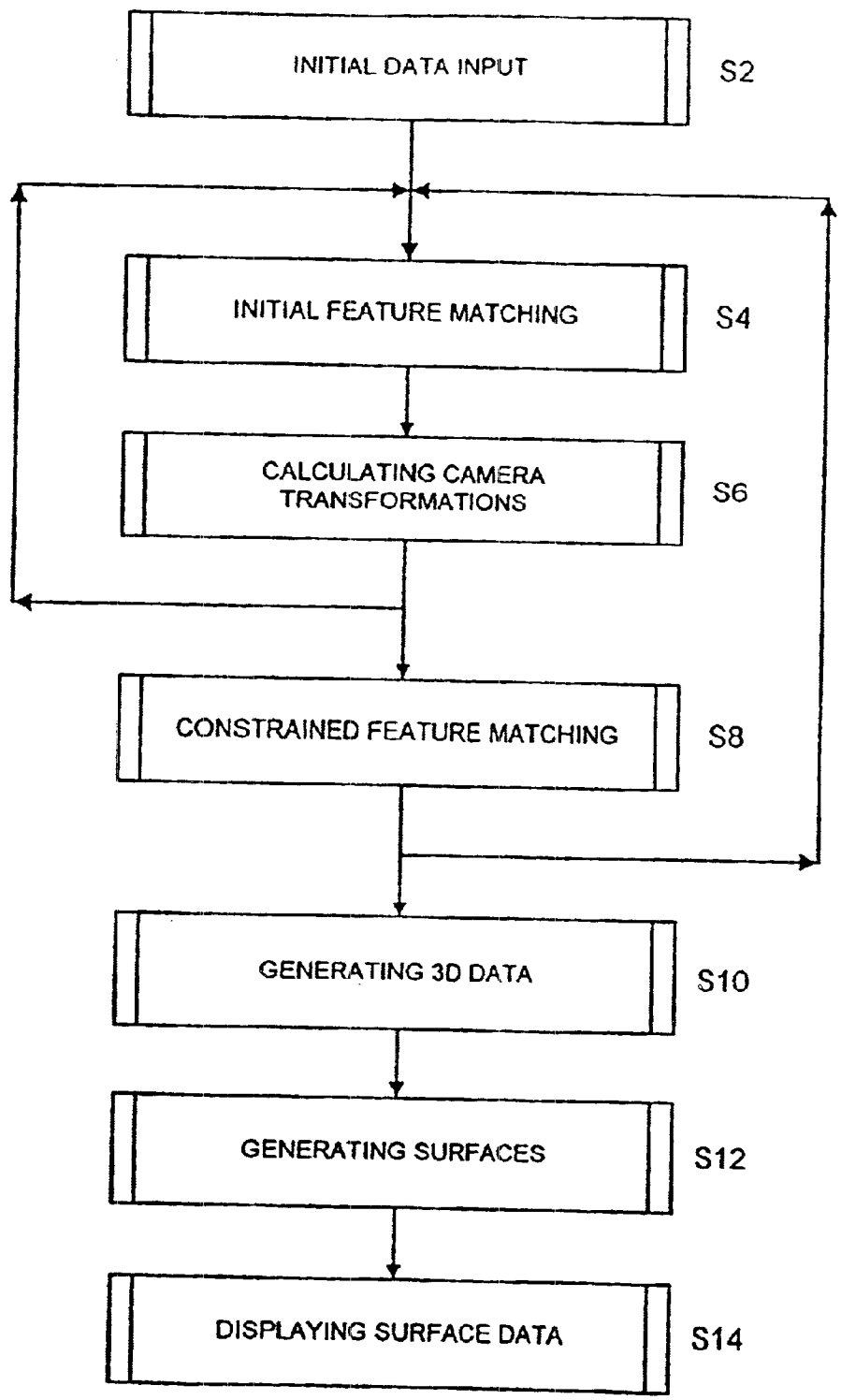
FIG. 3 shows, at a top level, the processing operations performed by the image processing apparatus of FIG. 1 in an embodiment of the invention.
Figure 41:
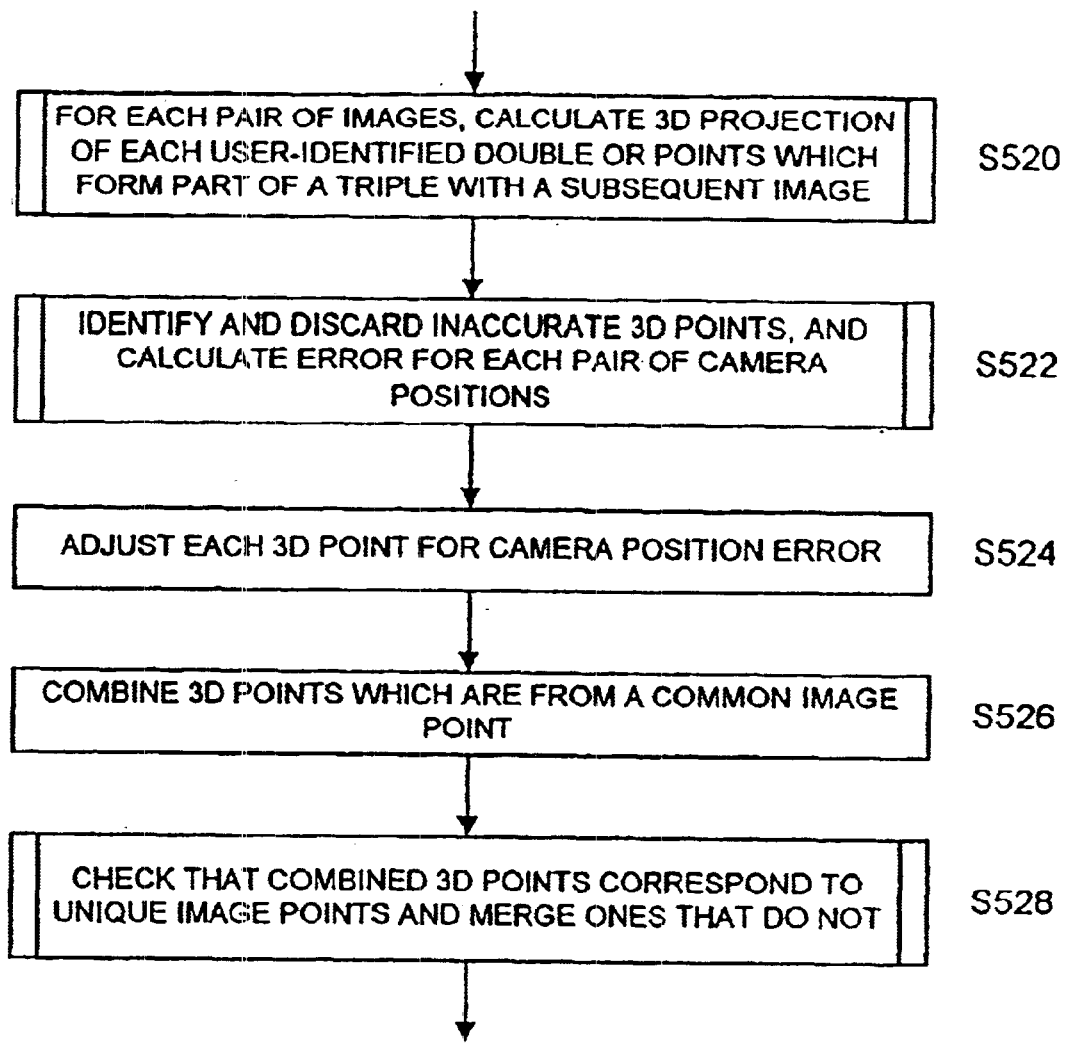

FIG. 41 shows, at a top level, the operations performed when generating 3D data at step S10 in FIG. 3.

Figure 42:
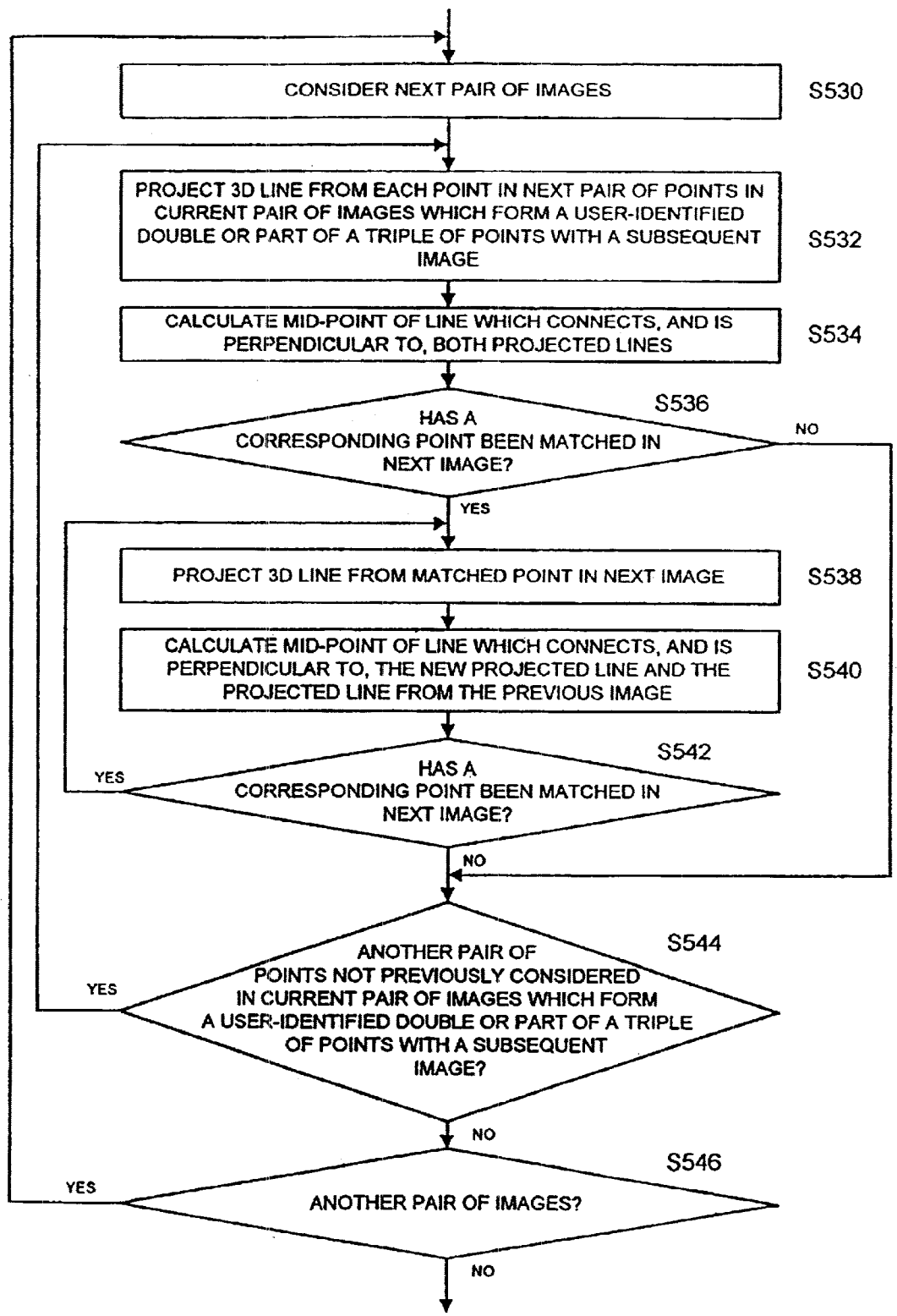

FIG. 42 shows the operations performed when calculating the 3D projection of points within each user-identified double or points which forms part of a triple with a subsequent image at step S520 in FIG. 41.

Figure 43:
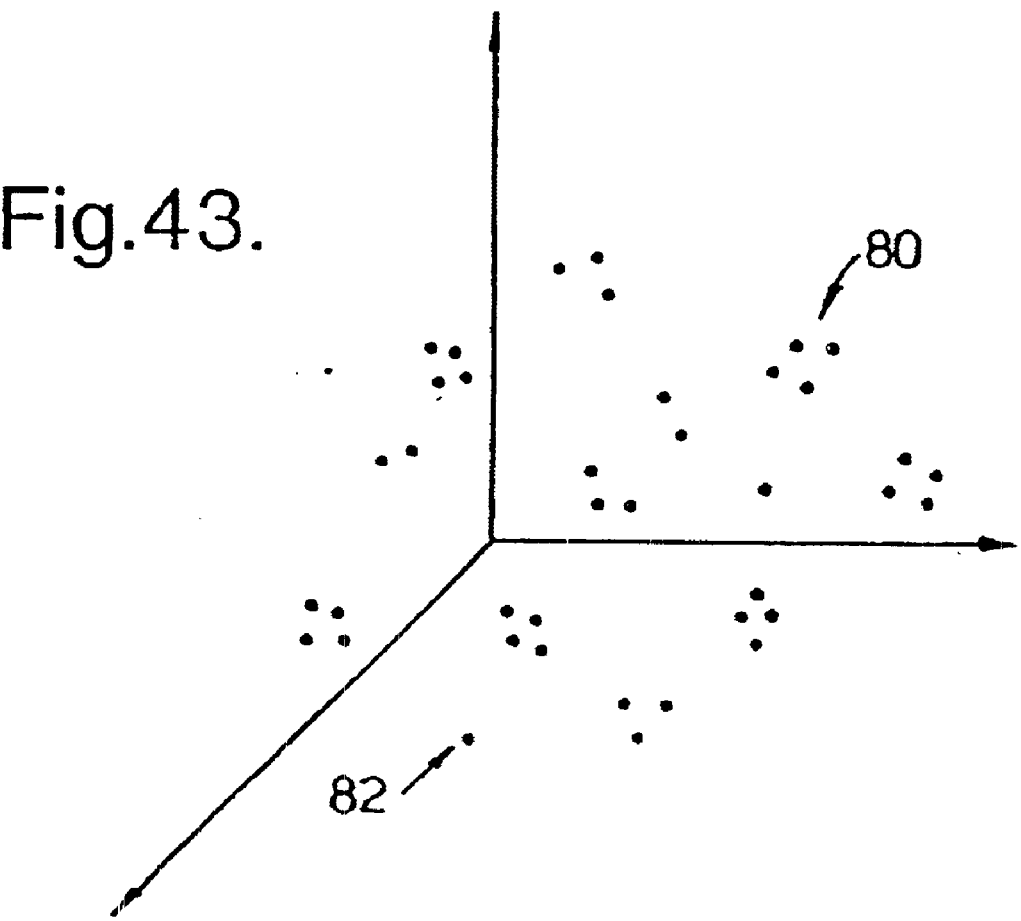

FIG. 43 illustrates the results when step S520 in FIG. 41 has been performed for a number of points across five images.

Figure 44:
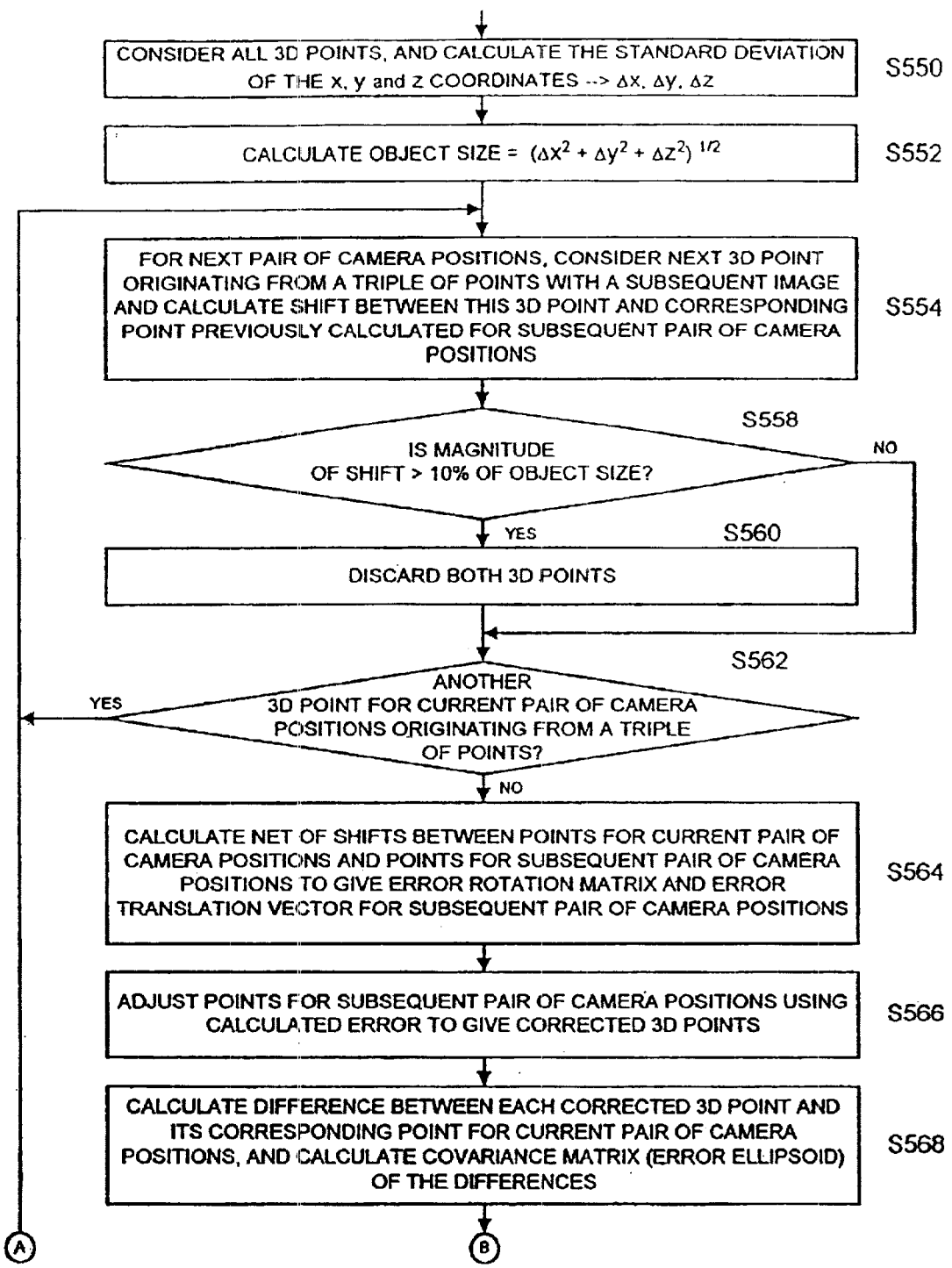
Figure 44B:
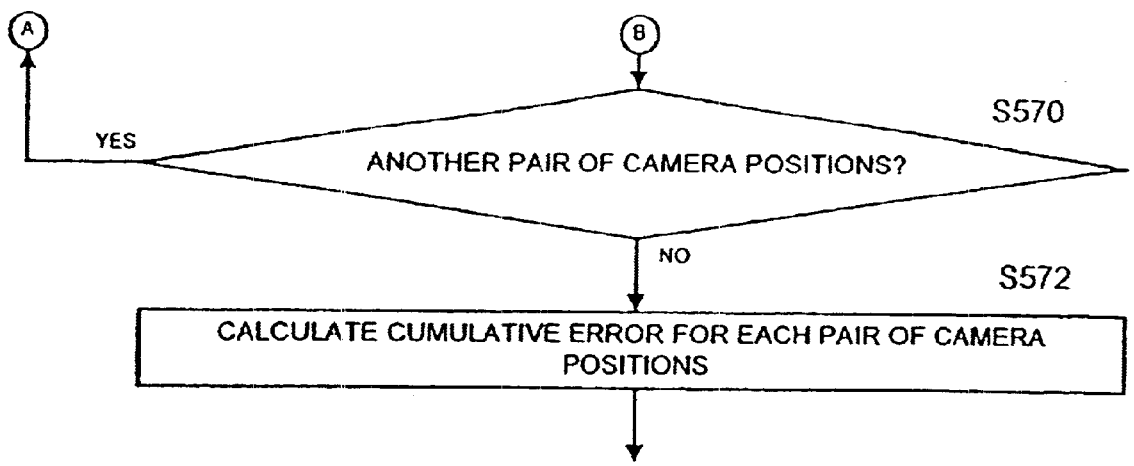

FIG. 44, which consists of FIGS. 44A and 44B, shows the operations performed in identifying and discarding inaccurate 3D points and calculating the error for each pair of camera positions at steps S522 in FIG. 41.

Figure 45A:
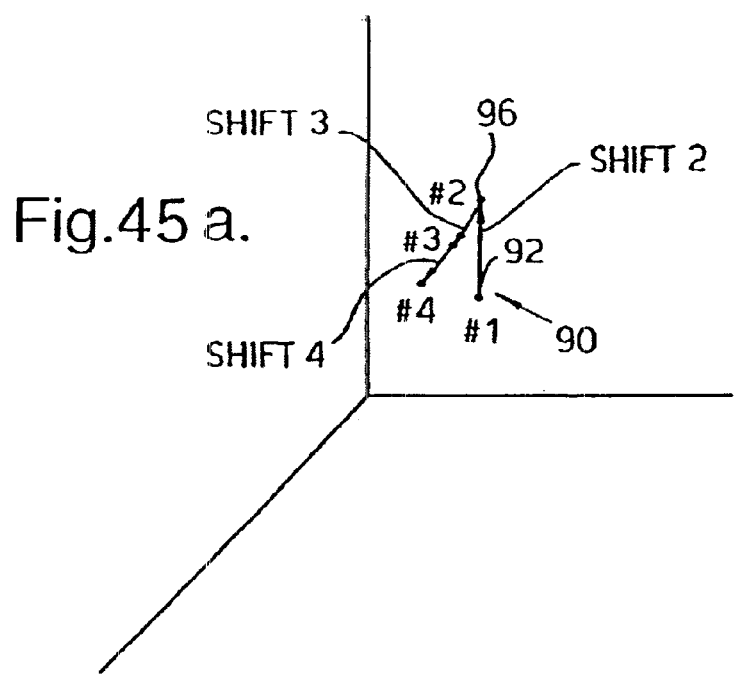
Figure 45B:
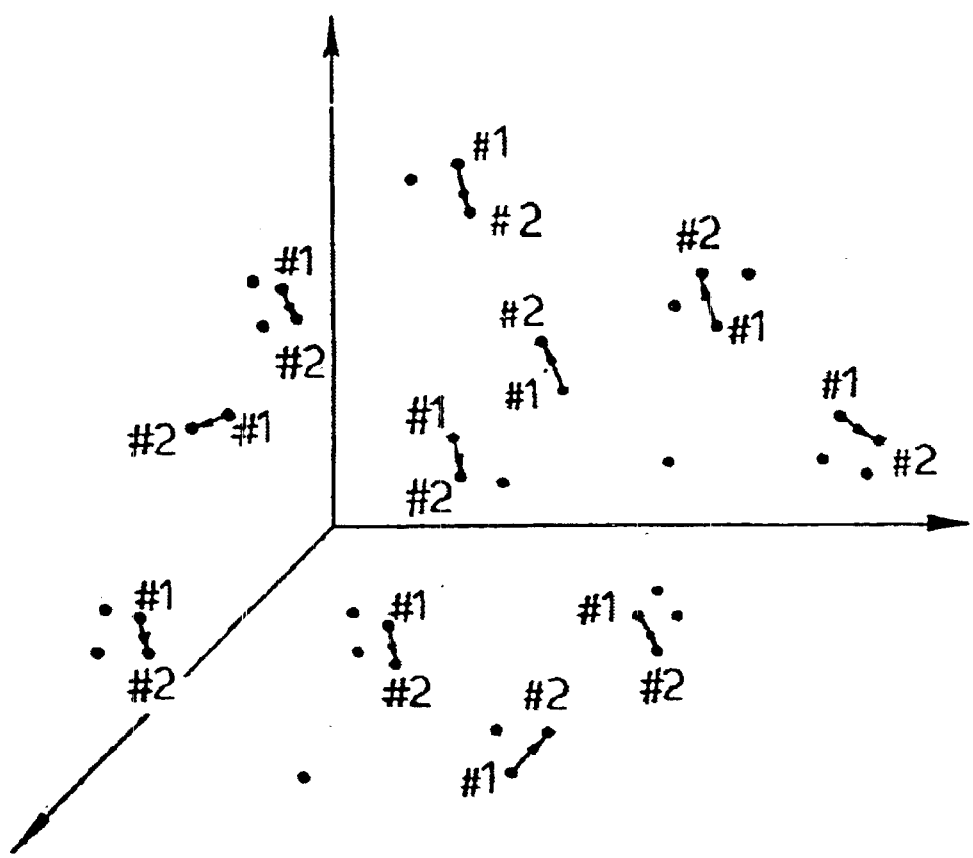

FIGS. 45a and 45b illustrate the shift calculated at step S556 in FIG. 44 between 3D points for a given pair of camera positions and corresponding points for the next pair of camera positions.

Figure 46:
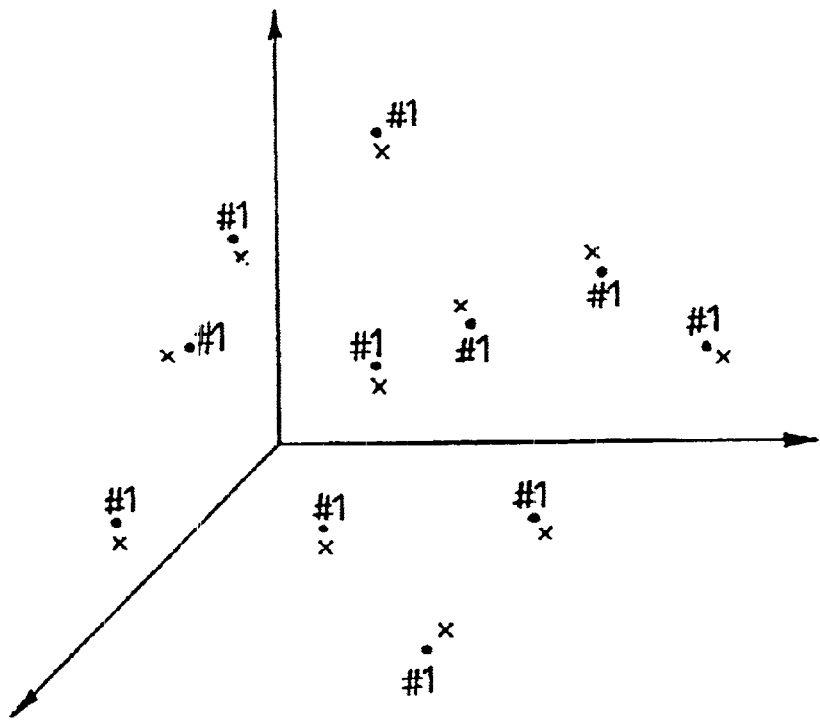

FIG. 46 illustrates corrected 3D points for the next pair of camera positions which result after step S566 in FIG. 44 has been performed, and the corresponding points for the current pair of camera positions.

Figure 47:
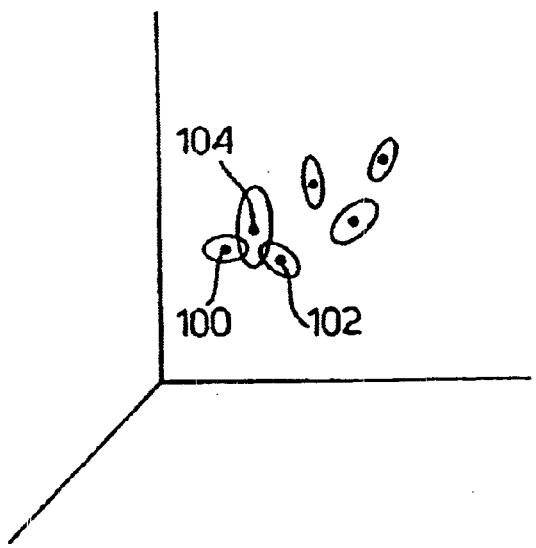

FIG. 47 illustrates a number of points in 3D space and their associated error ellipsoids.

Figure 48:
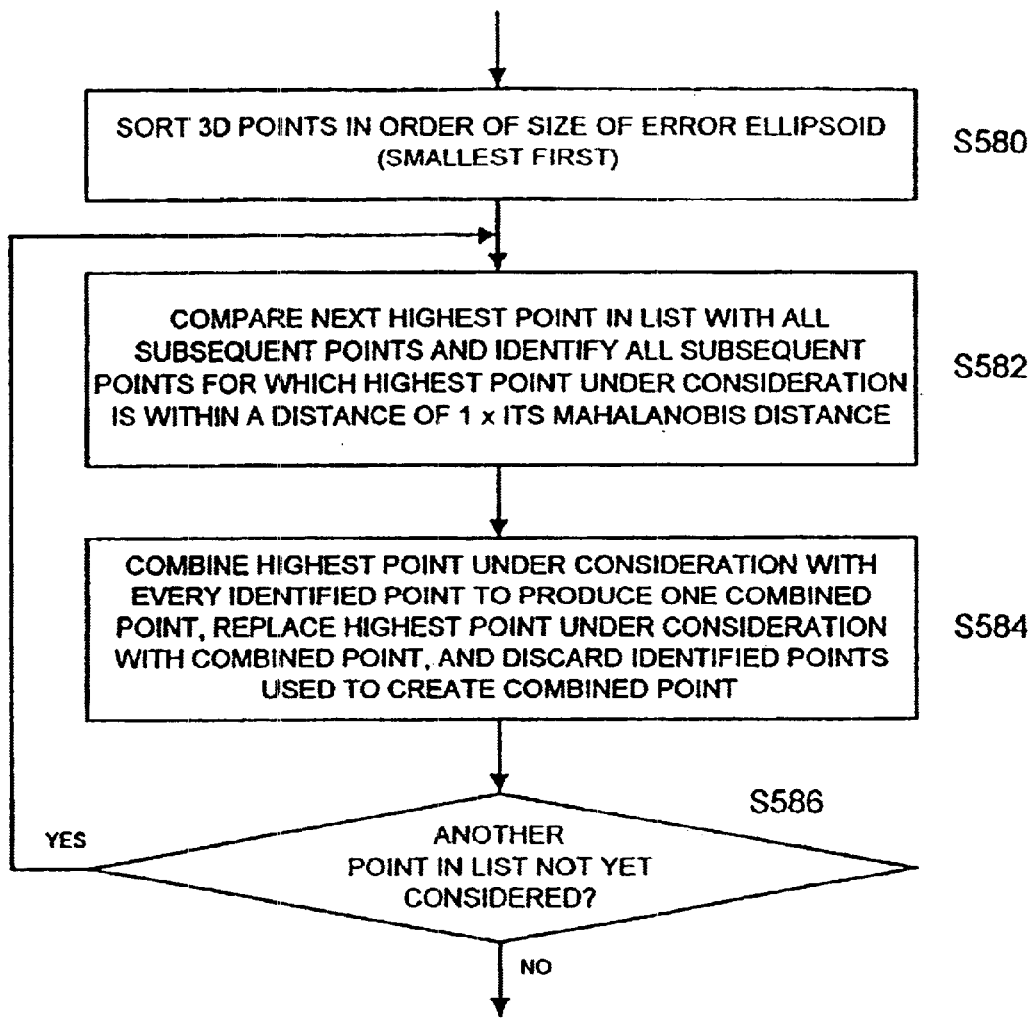

FIG. 48 shows the steps performed when checking whether combined 3D points correspond to unique image points and merging ones that do not at step S528 in FIG. 41.

Figure 49:
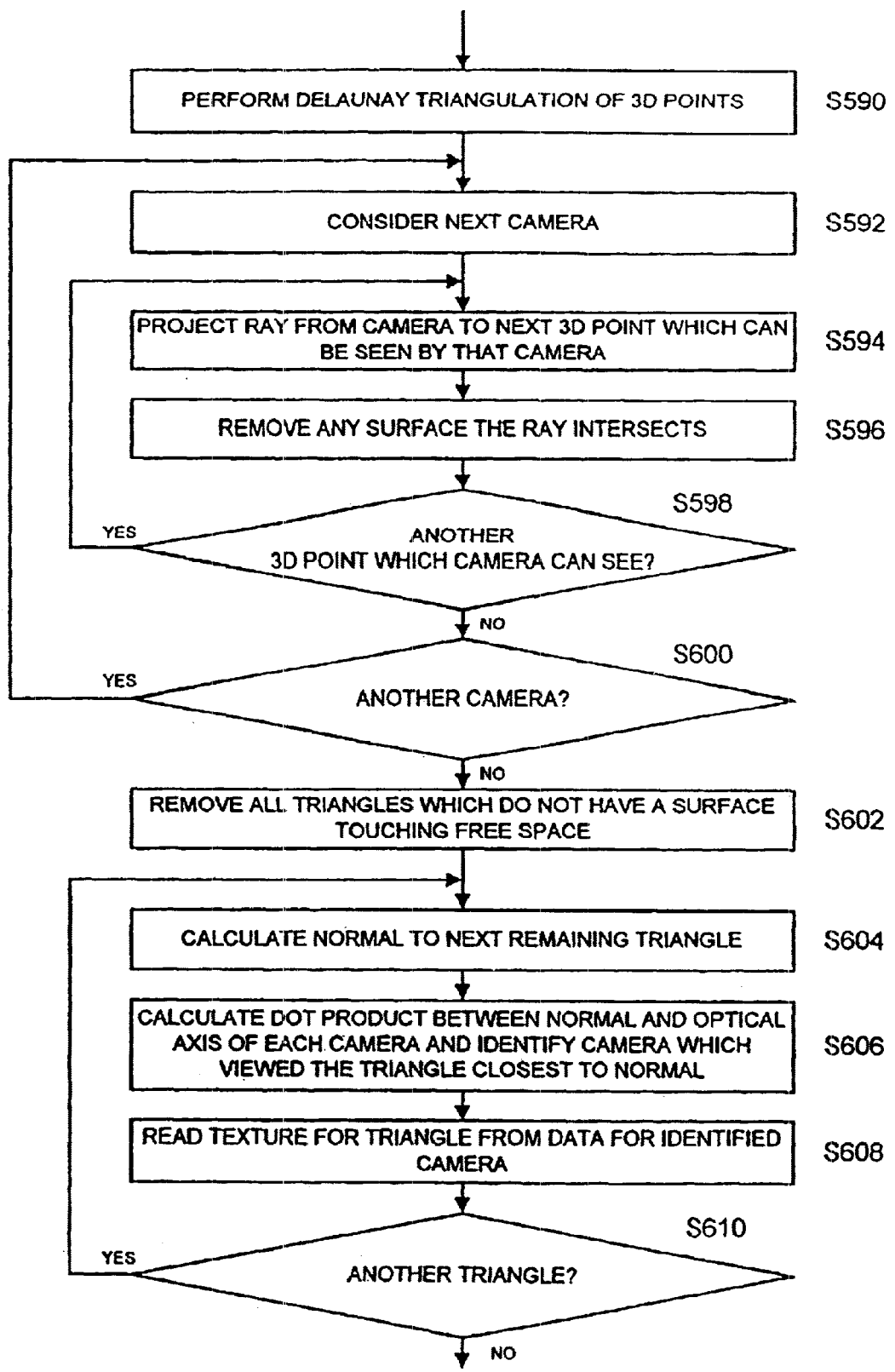

FIG. 49 shows the operations performed when generating surfaces at step S12 in FIG. 3.

Figure 50:
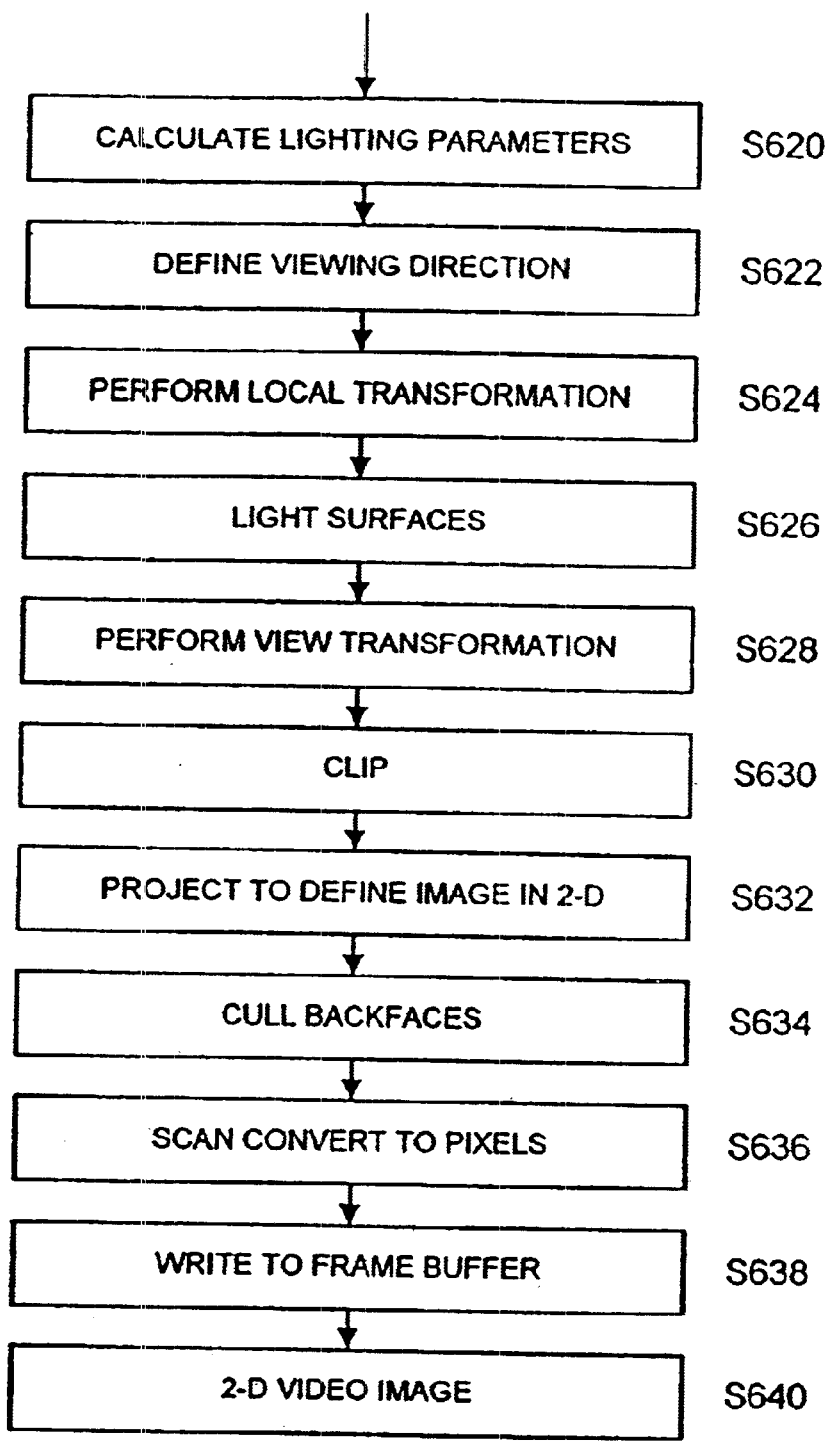

FIG. 50 shows the steps performed when displaying surface data at step S14 in FIG. 3.

A first embodiment of the invention will now be described, in which images of an object are processed to generate object data representing a three-dimensional computer model of the object.

In this embodiment, the object data representing the three-dimensional model of the object recreated from the two-dimensional photographs is processed to display an image of the object to a user from any selected viewing direction. The object data may, however, be processed in many other ways for different applications. For example, the three-dimensional model may be used to control manufacturing equipment to manufacture a model of the object. Alternatively, the object data may be processed so as to recognise the object, for example by comparing it with pre-stored data in a database. The data may also be processed to make measurements on the object. This may be particularly advantageous where measurements can not be made directly on the object itself, for example, if it would be hazardous to make such measurements—if the object was radioactive for example. The three-dimensional model may also be compared with three-dimensional models of the object previously generated to determine changes therebetween, representing actual physical changes to the object itself. The three-dimensional model may also be used to control movement of a robot to prevent the robot from colliding with the object. Of course, the object data may be transmitted to a remote processing device before any of the above processing is performed. In particular, the object data may be provided in virtual reality mark-up language (VRML) format for transmission over the Internet.

Figure 1:
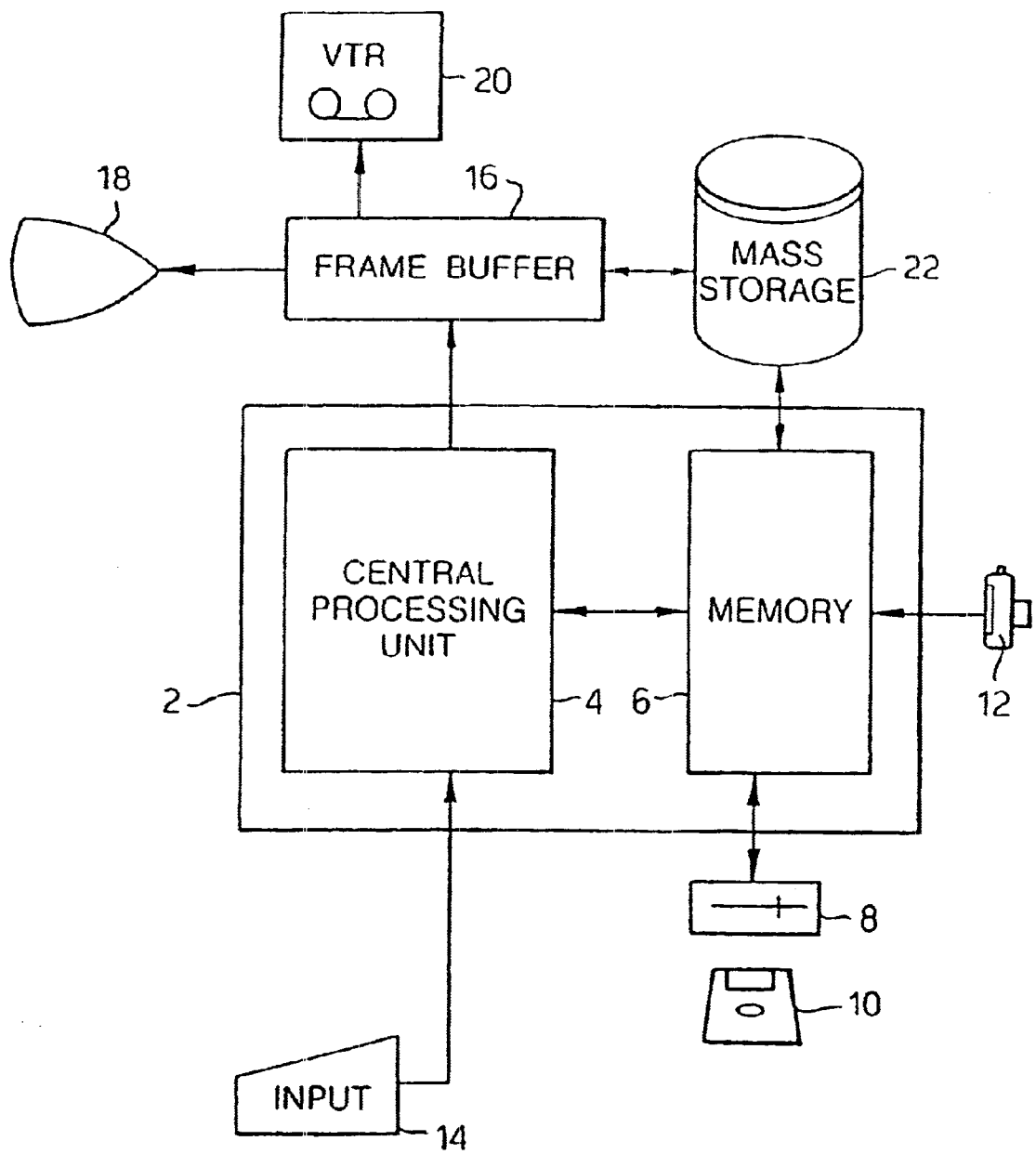

FIG. 1 is a block diagram showing the general arrangement of an image processing apparatus in an embodiment. In the apparatus, there is provided a computer 2, which comprises a central processing unit (CPU) 4 connected to a memory 6 operable to store a program defining the operations to be performed by the CPU 4, and to store object and image data processed by CPU 4.

Coupled to the memory 6 is a disk drive 8 which is operable to accept removable data storage media, such as a floppy disk 10, and to transfer data stored thereon to the memory 6. Operating instructions for the central processing unit 4 may be input to the memory 6 from a removable data storage medium using the disk drive 8.

Image data to be processed by the CPU 4 may also be input to the computer 2 from a removable data storage medium using the disk drive 8. Alternatively, or in addition, image data to be processed may be input to memory 6 directly from a camera 12 having a digital image data output, such as the Canon Powershot 600. The image data may be stored in camera 12 prior to input to memory 6, or may be transferred to memory 6 in real time as the data is gathered by camera 12. Image data may also be input from a conventional film camera instead of digital camera 12. In this case, a scanner (not shown) is used to scan photographs taken by the camera and to produce digital image data therefrom for input to memory 6. In addition, image data may be downloaded into memory 6 via a connection (not shown) from a local database, such as a Kodak Photo CD apparatus in which image data is stored on optical disks, or from a remote database which stores the image data.

Coupled to an input port of CPU 4, there is an input device 14, which may comprise, for example, a keyboard and/or a position sensitive input device such as a mouse, a trackerball, etc.

Also coupled to the CPU 4 is a frame buffer 16 which comprises a memory unit arranged to store image data relating to at least one image generated by the central processing unit 4, for example by providing one (or several) memory location(s) for a pixel of the image. The value stored in the frame buffer for each pixel defines the colour or intensity of that pixel in the image.

Coupled to the frame buffer 16 is a display unit 18 for displaying the image stored in the frame buffer 16 in a conventional manner. Also coupled to the frame buffer 16 is a video tape recorder (VTR) 20 or other image recording device, such as a paper printer or 35 mm film recorder.

A mass storage device, such as a hard disk drive, having a high data storage capacity, is coupled to the memory 6 (typically via the CPU 4), and also to the frame buffer 16. The mass storage device 22 can receive data processed by the central processing unit 4 from the memory 6 or data from the frame buffer 16 which is to be displayed on display unit 18.

The CPU 4, memory 6, frame buffer 16, display unit 18 and the mass storage device 22 may form part of a commercially available complete system, for example a workstation such as the SparcStation available from Sun Microsystems.

Operating instructions for causing the computer 2 to perform as an embodiment of the invention can be supplied commercially in the form of programs stored on floppy disk 10 or another data storage medium, or can be transmitted as a signal to computer 2, for example over a datalink (not shown), so that the receiving computer 2 becomes reconfigured into an apparatus embodying the invention.

Figure 2:
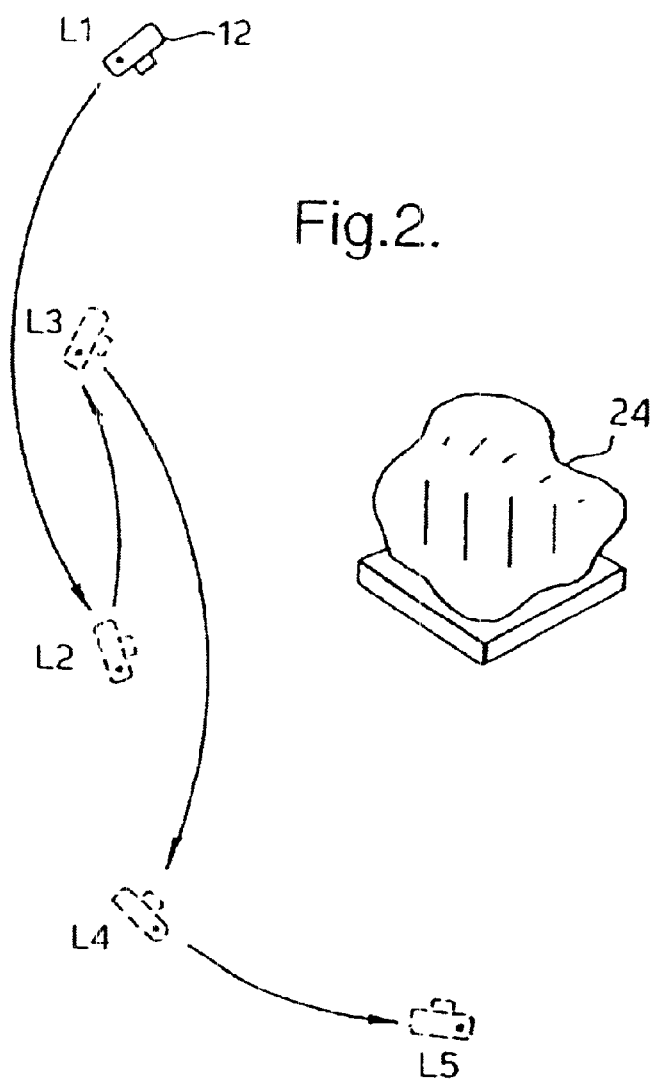
FIG. 2 illustrates the collection of image data by imaging an object from different positions around the object.

FIG. 2 illustrates the collection of image data for processing by the CPU 4.

An object 24 is imaged using camera 12 from a plurality of different locations. By way of example, FIG. 2 illustrates the case where object 24 is imaged from five different, random locations labelled L1 to L5, with the arrows in FIG. 2 illustrating the movement of the camera 12 between the different locations.

Image data recorded at positions L1 to L5 is stored in camera 12 and subsequently downloaded into memory 6 of computer 2 for processing by the CPU 4 in a manner which will now be described. In this embodiment, CPU 4 does not receive information defining the locations at which the images were taken, either in absolute terms or relative to each other.

FIG. 3 shows the top-level processing routines performed by CPU 4 to process the image data from camera 12.

At step S2, a routine for initial data input is performed, which will be described below with reference to FIGS. 4 and 5. The aim of this routine is to store the image data received from camera 12 in a manner which facilitates subsequent processing, and to store information concerning parameters of the camera 12.

At step S4, initial feature matching is performed to match features within the different images taken of the object 24 (that is, to identify points in the images which correspond to the same physical point on object 24). This process will be described below with reference to FIGS. 6 to 19.

At step S6, the transformations between the different camera positions from which the images were taken (L1 to L5 in FIG. 2), and hence the positions themselves in relative form, are calculated using the points matched in the images, as will be described below with reference to FIGS. 20–38.

At step S8, using the calculated camera transformations from step S6, further features are matched in the images (the calculated camera transformations being used to calculate, that is "constrain", the position in an image in which to look for a point matching a given point in another image). This process will be described below with reference to FIGS. 39 and 40.

At step S10, points in a three-dimensional modelling space representing actual points on the surface of object 24 are generated, as will be described below with reference to FIGS. 41 to 48.

In step S12, the points in three-dimensional space produced in step S10 are connected to generate three-dimensional surfaces, representing a three-dimensional model of object 24. This process will be described with reference to FIG. 49.

In step S14, the 3D model produced in step S12 is processed to display an image of the object 24 from a desired viewing direction on display unit 18. This process will be described with reference to FIG. 50.

Figure 4:
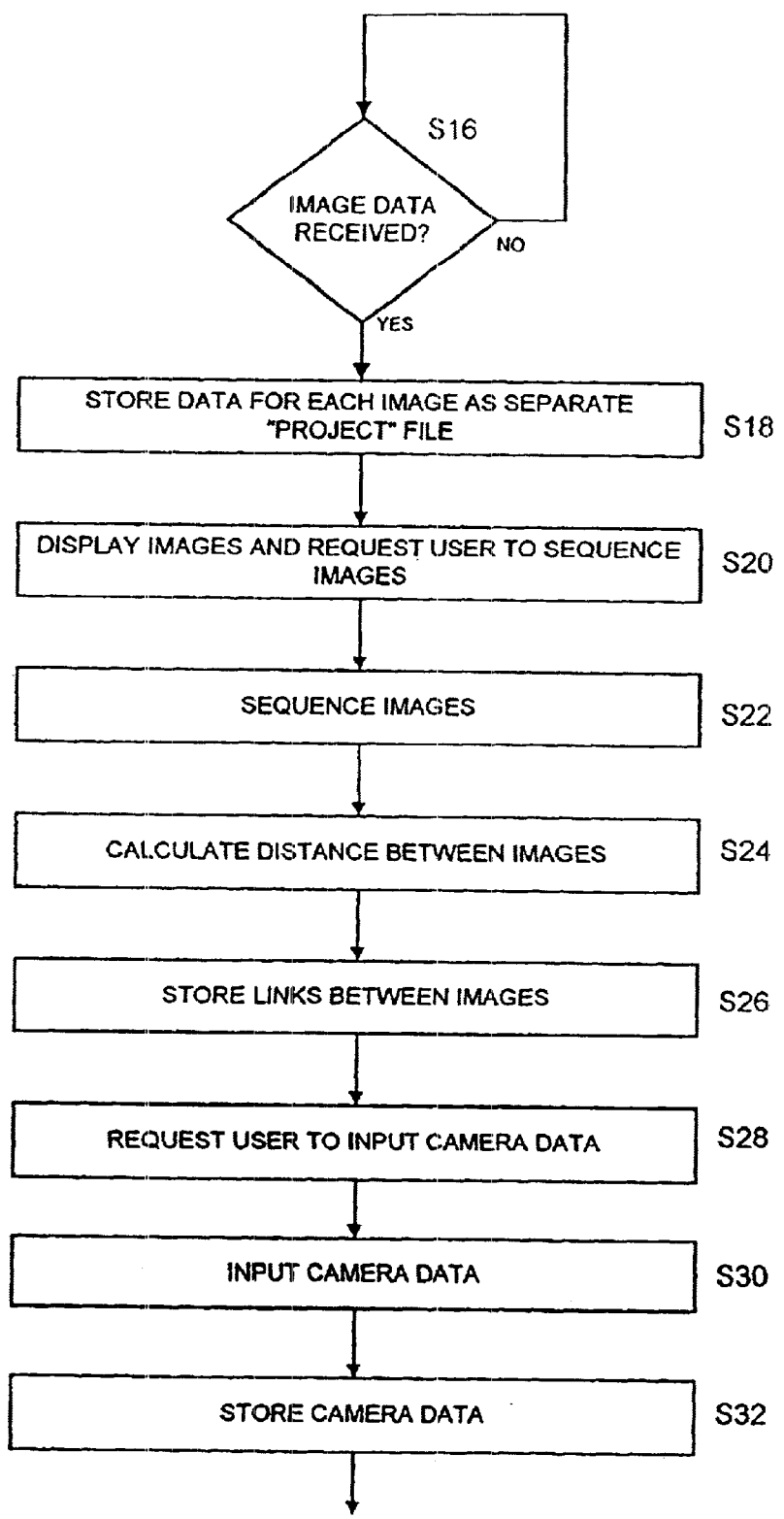
FIG. 4 shows the steps performed during initial data input at step S2 in FIG. 3.

FIG. 4 shows the steps performed in the initial data input routine at step S2 in FIG. 3. Referring to FIG. 4, at step S16, the CPU 4 waits until image data has been received within memory 6. As noted previously, this image data may be received from digital camera 12, via floppy disk 10, by digitisation of a photograph using a scanner (not shown), or by downloading image data from a database, for example via a datalink (not shown), etc.

After the data for all images has been received, CPU 4 re-stores the data for each image as a separate "project" file in memory 6 at step S18. At step S20, CPU 4 reads the stored data from memory 6 and displays the images to the user on display unit 18.

Figure 5:
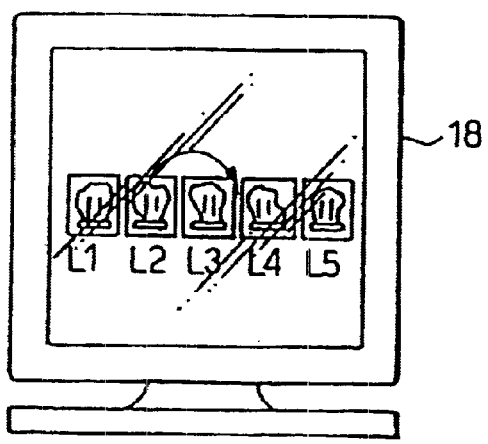
FIG. 5 illustrates the sequencing of images by a user at step S22 in FIG. 4.

FIG. 5 illustrates the display of the images to the user. CPU 4 initially displays the images in the order in which the image data was received. Referring again to FIG. 2, images were taken from locations L1, L2, L3, L4 then L5. Accordingly, the image data of the images taken at these locations is stored in the same sequence within camera 12 and is received by computer 2 in the same order when it is downloaded from camera 12. Therefore, as shown in FIG. 5, CPU 4 initially displays the images on display 18 in the same order, namely L1, L2, L3, L4, L5.

At the same time as displaying the images, CPU 4 prompts the user, for example by displaying a message (not shown) on display 18, to rearrange the images into an order which represents the positional sequence in which the images were taken around object 24, rather than the temporal sequence in which the images are initially displayed. The temporal sequence and the positional sequence may be the same. However, in the example illustrated in FIG. 2, location L3 is between locations L1 and L2. The positional sequence of images around the object 24 is, therefore, L1, L3, L2, L4 and L5. Accordingly, at step S22, the user rearranges the images on display 18, for example by highlighting the image taken at location L2 and dragging it to a position between the images for positions L3 and L4 (as indicated by the arrow in FIG. 5), to give the correct positional sequence for the images.

Following this, at step S24, CPU 4 calculates the distance between the centres of the images on the display 18 to determine the nearest neighbour(s) for each image. Thus, for example, referring to FIG. 5, for the image taken at position L1, CPU 4 calculates the distance between its centre and the centre of each other image, and determines that the nearest image is the one taken at position L3. For the image taken at position L3, the CPU 4 calculates the distance between its centre and each of the images taken at positions L2, L4 and L5 (the CPU already having determined that the image taken at position L1 is a nearest neighbour on one side of the image taken at position L3). In this way, CPU 4 determines that the image taken at position L2 is the nearest neighbour of the image taken at position L3 on its other side. The CPU performs the same routine for the images taken at positions L2, L4 and L5.

At step S26, CPU 4 stores links in memory 6 to identify the positional sequence of the images. For example, CPU 4 creates, and stores in memory 6, the links as separate entities. The data for each link identifies the image at each end of the link. Thus, referring to the example shown in FIGS. 2 and 5, CPU 4 creates four links, one having the images taken at positions L1 and L3 at its ends, one having the images taken at positions L3 and L2 at its ends, one having images taken at positions L2 and L4 at its ends, and one having images taken at positions L4 and L5 at its ends.

At step S26, CPU 4 also stores in the project file for each image (created at step S18) a pointer to each link entity connected to the image. For example, the project file for the image taken at position L3 will have pointers to the first and second links.

At step S28, CPU 4 requests the user to input information about the camera with which the image data was recorded. CPU 4 does this by displaying a message requesting the user to input the focal length of the camera lens and the size of the imaging charge coupled device (CCD) or film within the camera. CPU 4 also displays on display 18 a list of standard cameras, for which this information is pre-stored in memory 6, and from which the user can select the camera used instead of inputting the information directly. At step S30, the user inputs the requested camera data, or selects one of the listed cameras, and at step S32, CPU 4 stores the input camera data in memory 6 for future use.

The processing of the image data stored in memory 6 by CPU 4 will now be described with reference to FIGS. 6 to 50.

Figure 6:
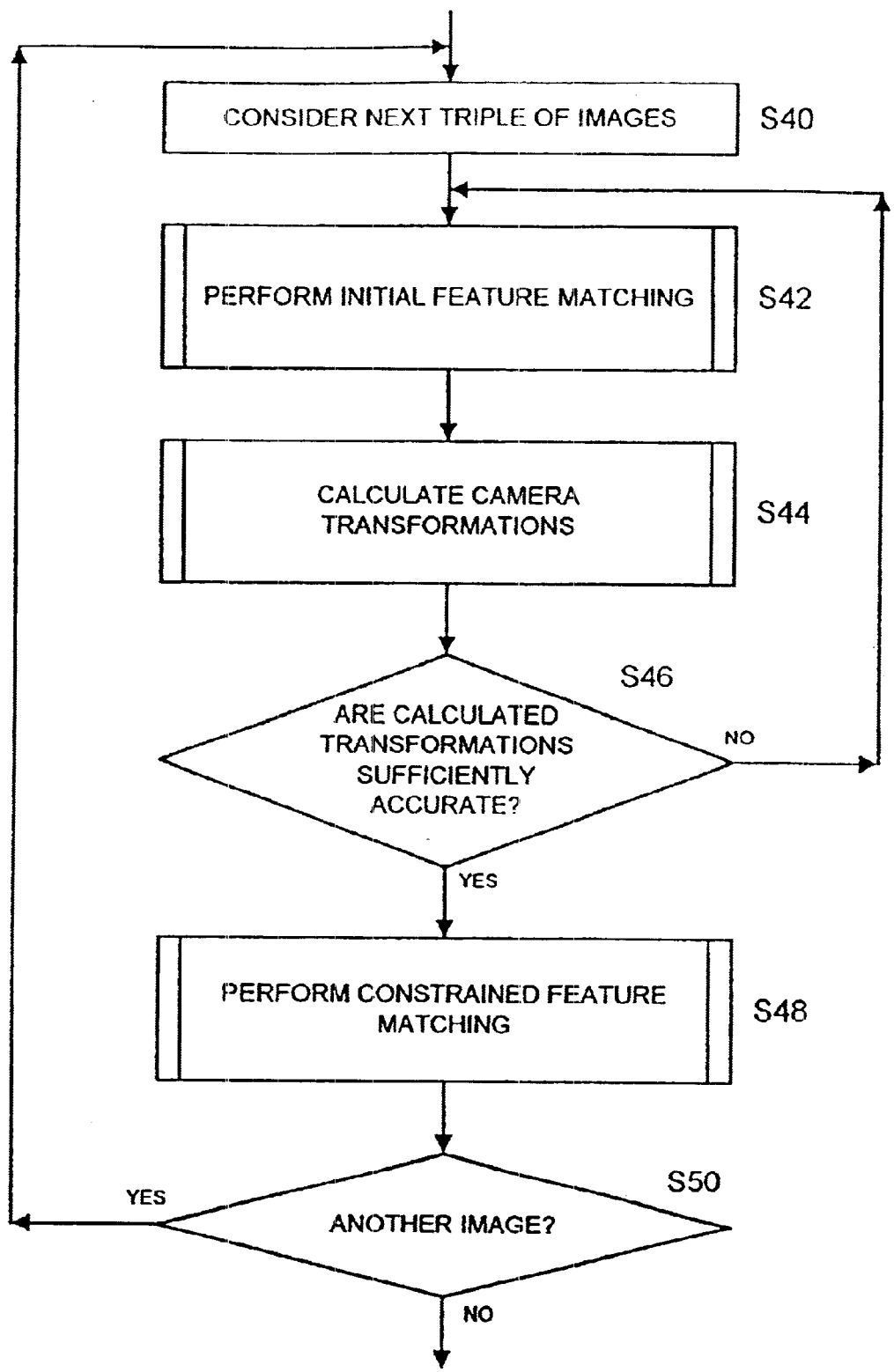
FIG. 6 shows the relationship between the operations in FIG. 1 of initial feature matching at step S4, calculating camera transformations at step S6 and constrained feature matching at step S8.

FIG. 6 shows, at a top level, the relationship between the routines of initial feature matching, calculating camera transformations and constrained feature matching performed by CPU 4 at steps S4, S6, S8 in FIG. 3. For the purpose of these routines, CPU 4 considers images in groups of three in the order in which they occur in the positional sequence created at step S22 (FIG. 4), each group being referred to as a "triple" of images. Thus, in the case where data for five images has been stored in memory 6 (as in the example of FIGS. 2 and 5), CPU 4 considers three triples of images (images 1-2-3, images 2-3-4, and images 3-4-5 in the positional sequence).

Within each triple of images, there are two "pairs" of images, namely the first and second images within the triple and the second and third images within the triple.

Referring to FIG. 6, at step S40, the next triple of images is considered for processing (this being the first triple, that is images 1-2-3 in the positional sequence, the first time step S40 is performed). At step S42, initial feature matching is performed for the three images under consideration to match points across pairs of images in the triple or across all three images, and at step S44 the camera transformations between the positions at which the three images were taken are calculated using the points matched in step S42. The calculated camera transformations define the translation and rotation of the camera between images in the positional sequence, as will be described in greater detail below.

At step S46, CPU 4 determines whether the camera transformations calculated at step S44 are sufficiently accurate. If it is determined that the transformations are sufficiently accurate, then, at step S48, further features are matched in the three images using the calculated camera transformations. The feature matching performed by CPU 4 at step S48 is termed "constrained" feature matching since the camera transformations calculated at step S44 are used to "constrain" the area within an image of the triple which is searched to identify a point which may match a given point in another image of the triple. If it is determined at step S46 that the calculated camera transformations are not sufficiently accurate, then steps S42 to S46 are repeated until sufficiently accurate camera transformations are obtained. However, as will be described below, when CPU 4 re-performs initial feature matching for the three images at step S42 for the first time after it has been determined at step S46 that the calculated camera transformations are not sufficiently accurate, it performs it using a second technique, which is different to the first technique used when step S42 is performed for the very first time. Further, in any subsequent re-performance of step S42, CPU 4 performs initial feature matching using the second technique, but with a different number of matched points in the images as input (the number increasing each time step S42 is repeated).

At step S50, CPU 4 determines whether there is another image which has not yet been considered in the positional sequence of images, and, if there is, steps S40 to S50 are repeated to consider the next triple of images. These steps are repeated until all images have been processed in the way described above.

FIG. 7 shows in greater detail the relationship between the routines of initial feature matching, calculating camera transformations and constrained feature matching.

Referring to FIG. 7, at step S52, CPU 4 performs initial feature matching using a first technique for the first pair of images in a triple of images, as will be described below. This first initial feature matching technique is automatic, in the sense that no input from the user is required. At step S54, CPU 4 performs initial feature matching using the first, automatic technique for the second pair of images in the triple. At step S56, CPU 4 calculates the camera transformations between the images in the triple. At step S58, CPU 4 determines whether the camera transformations calculated at step S56 are sufficiently accurate. If they are, constrained feature matching is performed at step S74 to match further points in the images of the triple.

On the other hand, if is determined at step S58 that the calculated camera transformations are not sufficiently accurate, then CPU 4 performs initial feature matching for the triple of images using a different technique at steps S60 to S68. In this embodiment, an "affine" technique (which assumes that the object 24 in the images does not exhibit significant perspective properties over small regions of the image) is used, as will be described below.

At step S60, the user is asked to identify matching points (that is, points which correspond to the same physical point on object 24) in the first pair of images of the triple and the second pair of images in the triple. This is done by displaying to the user on display unit 18 the three images in the triple. The user can then move a displayed cursor using input means 14 to identify a point in the first image and a corresponding, matched point (representing the same physical point on object 24) in the second image. This process is repeated until ten pairs of points have been matched in the first and second images. The user then repeats the process to identify ten pairs of matched points in the second and third images. It may be difficult for the user to precisely locate the displayed cursor at a desired point (which may occupy only one pixel) when selecting points. Accordingly, if any point identified by the user is within two pixels of a point previously identified in that image by the CPU in step S52 or S54 or, if performed previously, in step S62, S64 or S74, then CPU 4 determines that the user intended to identify a point which it had automatically identified previously, and consequently stores the co-ordinates of this point rather than the point actually identified by the user on display 18.

At step S62, CPU 4 matches points in the first pair of images in the triple using the affine matching technique, and at step S64, it matches points in the second pair of images in the triple using this technique. As will be described below, in affine feature matching, CPU 4 uses the points matched by the user at step S60 to determine the relationship between the images in each pair of images, that is the mathematical transformation necessary to transform points from one image to the other, and uses this to identify further matching points in the images.

At step S66, CPU 4 uses all of the points which have now been matched to determine again the camera transformations between the positions at which the three images in the triple were taken, and at step S68 determines whether the calculated transformations are sufficiently accurate. If it is determined that the transformations are sufficiently accurate, then CPU 4 performs constrained feature matching for the three images at step S74. On the other hand, if it is determined that the transformations are not sufficiently accurate, CPU 4 requests the user at step S70 to match more points across each pair of images in the triple (that is, to identify in each image of a pair the image points which correspond to the same physical point on object 24). In this embodiment, the user is asked to identify ten pairs of further matching points in the first pair of images in the triple of images and ten pairs of further matching points in the second pair of images in the triple. At step S72, the user identifies matching points in the same way as previously described for step S60. Again, if a user-identified point lies within two pixels of a point previously identified by CPU 4 (either in steps S52 or S54, or in steps S62 or S64, or in step S74) then it is determined that the user intended to identify that point, and the co-ordinates of the CPU-identified point are stored rather than the user-identified point.

Steps S62 to S72 are repeated until it is determined at step S68 that sufficiently accurate camera transformations between the images in the triple have been calculated. That is, the second feature matching technique (in this embodiment, an "affine" technique) is repeated using a different number of user-identified matching points as input each time, until sufficient matches are made to allow sufficiently accurate camera transformations to be calculated. Constrained feature matching for the three images in the triple is then performed at step S74.

At step S76, CPU 4 determines whether there is another image in the positional sequence to be processed. If there is, steps S54 to S76 are repeated until all images have been processed. It will be seen from FIG. 7, that step S52 is not performed when subsequent images are considered. Referring to the example illustrated in FIG. 2 and FIG. 5, there are five images of object 24 to be processed by CPU 4. Points in images 1 and 2 of the positional sequence are matched at step S52 (and step S62 if the second feature matching technique is used). Points in images 2 and 3 are matched at step S54 (and step S64 if the second feature matching technique is used). As explained previously, images are considered in triples. Accordingly, when image 4 is considered for the first time, it is considered in the triple comprising images 2, 3 and 4. However, points in images 2 and 3 will have been matched previously by CPU 4 at step S54 (and step S64). Step S52 is therefore omitted, and processing begins at step S54 in which automatic feature matching of points in the second pair of images in the triple (that is, images 3 and 4) is performed. If the automatic technique fails to generate sufficiently accurate camera transformations at steps S56 and S58, then the affine technique is performed for both the first pair of images and the second pair of images in the triple. That is, initial feature matching is re-performed for the first pair of images since the user will identify further matching points in these images at step S60.

In this embodiment, constrained feature matching is performed for a given triple of images before the next image in the sequence is considered and initial feature matching is performed on it. As described previously, the step of constrained feature matching produces further matching points in the triple of images being considered. In fact, as will be described below, points are identified in the final image of the triple which match points which have been previously matched in the first pair of images (thus giving points which are matched in all three images). The present embodiment provides the advantage that these newly matched points in the final image of the triple are used when performing initial feature matching on the next image in the triple. For example, when the first three images of the sequence shown in FIG. 5 are processed, the step of constrained feature matching at step S74 identifies points in image 3 which match points in images 1 and 2. When CPU 4 considers image 4 and performs initial feature matching at step S54 (and step S64) the new points generated at step S74 are considered and processing is performed to determine whether a matching point exists in image 4. If a matching point is identified in image 4, the new points matched by constrained feature matching at step S74 and the new point identified in image 4 by initial feature matching from a triple of points and are taken into consideration when calculating the camera transformations at step S56 or S66. Thus, the step of constrained feature matching at step S74 may generate points which are used when calculating the camera transformations for the next triple of images (that is, if the initial feature matching at step S54 or S64 for the second pair of images in the next triple matches at least one of the points matched across the first pair of images in constrained feature matching into the third image of the new triple). This will be described in greater detail later.

Thus, the procedure shown in FIG. 7 generates a flow of new matched points determined using the calculated camera transformations for input to subsequent initial feature matching operations, and possibly also to subsequent calculating camera transformation operations. The operations performed by CPU 4 for automatic initial feature matching at steps S52 and S54 in FIG. 7 will now be described.

Figure 8:
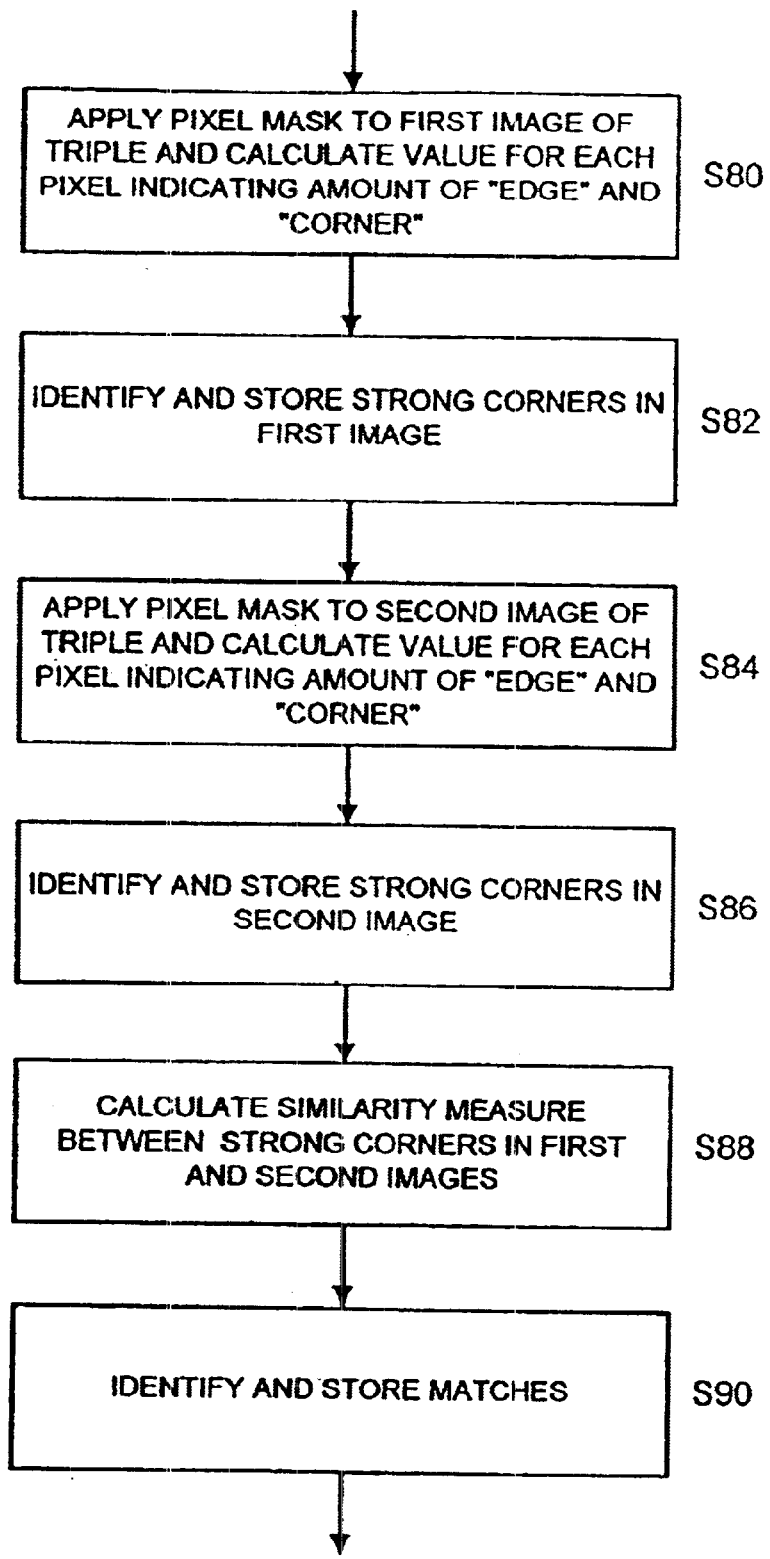
FIG. 8 shows the operations performed during automatic initial feature matching across the first pair of images in a triple of images at step S52 in FIG. 7.

FIG. 8 shows the operations performed by CPU 4 at step S52 when performing automatic initial feature matching for the first pair of images in the triple.

At step S80, a value is calculated for each pixel in the first image of the triple indicating the amount of "edge" and "corner" for that pixel. This is done, for example, by applying a conventional pixel mask to the first image, and moving this so that each pixel is considered. Such a technique is described in "Computer and Robot Vision Volume 1", by R. M. Haralick and L. G. Shapiro, Section 8, Addison-Wesley Publishing Company, 1992, ISBN 0-201-10877-1 (V.1). At step S82, any pixel which has "edge" and "corner" values exceeding predetermined thresholds is identified as a strong corner in the first image, in a conventional manner. At step S84, CPU 4 performs the operation previously carried out at step S80 for the first image for the second image, and likewise identifies strong corners in the second image at step S86 using the same technique previously performed at step S82.

At step S88, CPU 4 compares each strong corner identified in the first image at step S82 with every strong corner identified in the second image at step S86 which lies within a given area centred on the pixel in the second image which has the same pixel coordinates as the corner point under consideration in the first image to produce a similarity measure for the corners in the first and second images. In this embodiment, the size of the area considered in the second image is ±10 pixels of the centre pixel in the y-direction and ±200 pixels of the centre pixel in the x-direction. The use of such a "window" area to restrict the search area in the second image ensures that similar points which lie on different parts of object 24 are not identified as matches. The window in this embodiment is set to have a small "y" value (height) and a relatively large "x" value (width) since it has been found that the images of object 24 are often recorded by a user with camera 12 at approximately the same vertical height (so that a point on the surface of object 24 is not displaced significantly in the vertical (y) direction in the images) but displaced around object 24 in a horizontal direction. In this embodiment, the comparison of points is carried out using an adaptive least squares correlation technique, for example as described in "Adaptive Least Squares Correlation: A Powerful Image Matching Technique" by A. W. Gruen in Photogrammetry Remote Sensing and Cartography 1985 pages 175–187.

At step S90, CPU 4 identifies and stores matching points. This is performed using a "relaxation" technique, as will now be described. Step S88 produces a similarity measure between each strong corner in the first image and a plurality of strong corners in the second image (that is, those lying within the window in the second image described above). At step S90, CPU 4 effectively arranges these values in a table array, for example listing all of the strong corners in the first image in a column, all of the strong corners in the second image in a row, and the similarity measure for each given pair of corners at the appropriate intersection in the table. In this way, rows of the table array define the similarity measure between a given corner point in the first image and each corner point in the second image (the similarity measure may be zero if the corner in the first image was not compared with the corner in the second image at step S88). Similarly, the columns in the array define the similarity measure between a given corner point in the second image and each corner point in the first image (again, some values may be zero if the points were not compared at step S88). CPU 4 then considers the first row of values, selects the highest similarity measure value in the row, and determines whether this value is also the highest value in the column in which the value lies. If the value is the highest in the row and column, this indicates that the corner point in the second image is the best matching point for the point in the first image and vice versa. In this case, CPU 4 sets all of the values in the row and the column to zero (so that these values are not considered in further processing), and determines whether the highest similarity measure is above a predetermined threshold (in this embodiment, 0.1). If the similarity measure is above the threshold, CPU 4 stores the point in the first image and the corresponding point in the second image as matched points. If the similarity measure is not above the predetermined threshold, then it is determined that, even though the points are the best matching points for each other, the degree of similarity is not sufficient to store the points as matching points.

CPU 4 then repeats this processing for each row of the table array, until all of the rows have been considered. If it is determined that the highest similarity measure in a row is not also the highest for the column in which it lies, CPU 4 moves on to consider the next row. Thus, it is possible that no pairs of matching points are identified in step S90.

CPU 4 reconsiders each row in the table array to repeat the processing above if matching points were identified the previous time all the rows were considered. CPU 4 continues to perform such iterations until no matching points are identified in an iteration.

Figure 9:
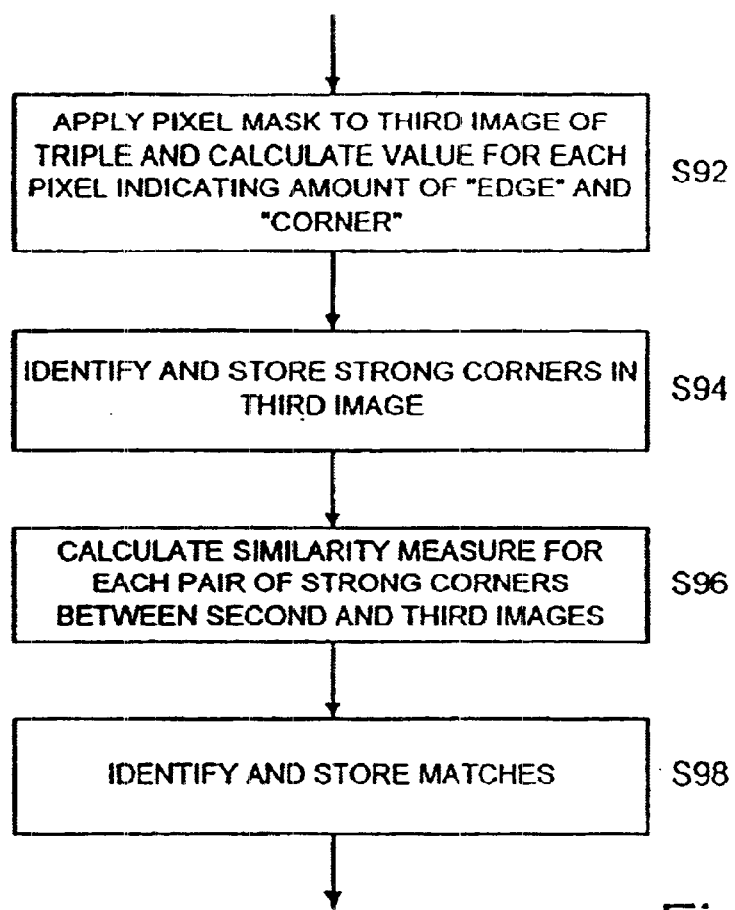
FIG. 9 shows the operations performed during automatic initial feature matching across the second pair of images in a triple of images at step S54 in FIG. 7.

FIG. 9 shows the steps performed by CPU 4 at step S54 in FIG. 7 when performing automatic initial feature matching for the second pair of images in a triple. In this case, points in the first image of the pair have already been identified: strong corners in steps S84 and S86 of FIG. 8 when the previous pair of images was considered; and other feature points from automatic initial feature matching (step S54), affine initial feature matching (steps S60, S64 and S72) and constrained feature matching (step S74) if these steps have been performed for the previous triple of images. Accordingly, CPU 4 needs only to identify strong corners in the second image of the pair (the third image of the triple under consideration).

Referring to FIG. 9, at step S92, CPU 4 applies a pixel mask to the third image of the triple and calculates a value for each pixel in the third image indicating the amount of edge and corner for that pixel. This is performed in the same way as the operation in step S80 described previously. In step S94, CPU 4 identifies and stores strong corners in the third image. This is performed in the same way as step S82 described previously. At step S96, CPU 4 considers the strong points previously identified and stored at step S86, S54, S60, S64, S72 and S74 for the second image in the triple and the strong corners identified and stored at step S94 for the third image in the triple, and calculates a similarity measure between pairs of points. This is carried out in the same way as step S88 described previously (again using a "window" to restrict the points in the third image which are compared against each point in the second image). At step S98, matching points in the second and third images of the triple are identified and stored. This is carried out in the same way as step S90 described previously.

It has been found that the feature matching technique performed by CPU 4 at steps S52 and S54 (described above) may not accurately generate matched points if the object 24 contains a plurality of feature points which look similar, that is, if a number of points having the same visual characteristics are distributed over the surface of object 24. This is because, in this situation, points may have been matched in images which, although they have the same visual characteristics, do not actually represent the same physical point on the surface of object 24. To take account of this, in this embodiment, a second initial feature matching technique is performed by CPU 4 which divides an image into small regions using a small number of points which are known to be accurately matched across images, and then tries to match points in corresponding small regions within each image. This second technique assumes that the small regions created are flat (rather than exhibiting perspective qualities), so that an "affine" transformation between the corresponding regions in images can be calculated. The second technique is therefore referred to as an "affine" initial feature matching technique.

FIGS. 10a and 10b illustrate the difference between an object exhibiting perspective properties (FIG. 10a) and an object exhibiting affine properties (FIG. 10b). (The other type of image that could be input to memory 6 for processing by CPU 4 is an image of a flat object. In this case, it is not possible to generate a three-dimensional model of the object since all the points on the object lie in a common, flat plane.)

The way in which CPU 4 performs affine initial feature matching for the first pair of images in the triple at step S62 and for the second pair of images in the triple at step S64 in FIG. 7 will now be described.

FIG. 11 shows, at a top level, the operations performed by CPU 4 when carrying out affine initial feature matching across a pair of images in a triple at step S62 or S64 in FIG. 7.

Referring to FIG. 11, at step S100, CPU 4 considers the points in each image of a pair which have been matched with points in the other image by the user at step S60 or S72, and processes the image data to determine whether an edge exists between these points in the images. These user-identified points are used since they accurately identify matching points in the images (points calculated by CPU 4, e.g. at step S52, S54, S62, S64 or S74 may not be accurate, and are therefore not used in step S100 in this embodiment).

FIG. 12 shows the way in which step S100 is performed by CPU 4. Referring to FIG. 12, at step S106, CPU 4 calculates the non-binary strength of any edge lying between the identified points in the first image of the pair (that is, points which were previously identified by the user as corresponding to points in the second image of the pair), and at step S108, CPU 4 performs the same calculation for the identified points in the second image of the pair (that is, points which were previously identified by the user as corresponding to points in the first image of the pair).

FIGS. 13 and 14 show the way in which edge strengths are determined by CPU 4 at steps S106 and S108 in FIG. 12. Referring to FIG. 13, CPU 4 considers the image data in area "A" lying between two user-identified points 30, 32 in an image. The area A comprises pixels lying within a set number of pixels (in this embodiment, two pixels) on either side of the pixel through which a straight line connecting points 30 and 32 passes, and within end boundaries which are placed at a distance "a", in this embodiment corresponding to two pixels, from the points 30, 32 as shown in FIG. 13. The pixels above and below the line are considered because user-identified points (e.g. points 30, 32) may not have been positioned accurately by the user during identification on the display, and therefore the edge (if any) may not run exactly between the points. If points 30, 32 are positioned within the image such that a line therebetween is more vertical than horizontal, then two pixels either side of the pixel through which the line passes are considered, rather than two pixels above and below the line. The end boundaries are set because it has been found that points in an image matched by a user at step S60 or step S72 in FIG. 7 with points in another image tend to be points which lie at the end of edges (that is, corners). Pixels close to these points distort the orientation calculations which are used to identify edges if the points do indeed lie at the end of edges. This is because the edges become curved near points 30, 32, giving the individual pixels different orientation values to those in the centre region between the points. For this reason, pixels within two pixels of the points 30, 32 are omitted from the calculation of strength/orientation.

Referring to FIG. 14, at step S114, CPU 4 smooths the image data in a conventional manner, for example as described in chapter 4 of "Scale-Space Theory in Computer Vision" by Tony Lindeberg, Kluwer Academic Publishers, ISBN 0-7923-9418-6. A smoothing parameter of 1.0 pixels is used in this embodiment (this being the standard deviation of the mask operator used in the smoothing process).

At step S115, CPU 4 calculates edge magnitude and direction values for each pixel in the image. This is done by applying a pixel mask in a conventional manner, for example as described in "Computer and Robot Vision" by Haralick and Shapiro, Addison Wesley Publishing Company, Pages 337–346, ISBN 0-201-10877-1 (V.1). In this embodiment, at step S114 the data for the entire image is smoothed and at step S115 edge magnitude and direction values are calculated for every pixel. However, it is possible to select only relevant areas of the image for processing in each of these steps instead.

At step S116, CPU 4 considers the pixels lying within area A between each pair of user-identified points, and calculates the magnitude of any edge line between those points. Referring again to FIG. 13, CPU 4 starts by considering the first column of pixels in the area A, for example the column of pixels which are left-most in the image. Within this column, it first considers the top pixel, and compares the edge magnitude and edge direction values calculated at step S115 for this pixel against thresholds. In this embodiment the magnitude threshold is set at a very low setting of 0.01 smooth grey levels per pixel. This is because edges often become "weakened" in an image, for example by the lighting, which can produce shadows etc. across the edge. Accordingly, by using a small magnitude threshold, it is assured that all pixels having any reasonable value of edge magnitude are considered. The direction threshold is set so as to impose a relatively strict requirement for the direction value of the pixel to lie within a small angular deviation (in this embodiment 0.5 radians) of the direction of the straight line connecting points 30 and 32. This is because direction has been found to be a much more accurate way of determining whether the pixel actually represents an edge than the pixel magnitude value.

If the top pixel in a column of pixels has values above the magnitude threshold and below the direction threshold, then a "vote" is registered for that column, indicating that part of an edge between the points 30, 32 exists in that column of pixels. If the values of the top pixel do not meet this criteria, then the same tests are applied to the remaining pixels in the column, moving down the column. Once a pixel is found satisfying the threshold criteria, a "vote" is registered for the column and the next column of pixels is considered. On the other hand, if no pixel within the column is found which satisfies the threshold criteria, then no "vote" is registered for the column. When all of the columns of pixels have been processed in this manner, CPU 4 determines the percentage of columns which have registered a "vote", this representing the strength of the edge, and stores this percentage.

Referring again to FIG. 12, after performing steps S106 and S108, CPU 4 has calculated and stored a strength for each edge in each image of the pair.

At step S110, CPU 4 calculates the combined strength of corresponding edges in the first image of the pair and the second image of the pair. This is done, for example, by reading the stored percentage edge strength calculated at step S106 for an edge in the first image and the value calculated in step S108 for the corresponding edge in the second image and calculating the geometric mean of the percentages (that is, the square root of the product of the percentages). If the resulting, combined strength value is less than 90%, CPU 4 determines that the edges are not sufficiently strong to consider further, and discards them. If the combined strength value is 90% or greater, CPU 4 stores the value and identifies the edges in both images as strong edges for future use.

By performing step S110, CPU 4 effectively considers the strength of an edge in both images of a pair to determine whether an edge actually exists between given points. In this way, an edge may still be identified even if it has become distorted (for example, broken) somewhat in one of the images since the strength of the edge in the other image will compensate.

At step S112, CPU 4 considers the strong edges in the first image of the pair, that is the edges which remain after the weak ones have been removed at step S110, and processes the image data to remove any crossovers between the edges.

FIG. 15 shows the operations performed by CPU 4 in determining whether any crossovers occur between the edges and removing them. Referring to FIG. 15, at step S120, CPU 4 produces a list of the edges in the first image of the pair arranged in combined strength order, with the edge having the highest combined strength at the top of the list. Since the strength of the edges is calculated and stored as floating point numbers, it is unlikely that two edges will have the same combined strength. At step S122, CPU 4 considers the next pair of edges in the list (this being the first pair the first time the step is performed), and at step S124, CPU 4 compares the coordinates of the points at the ends of each edge to determine whether both end points of the first edge lie on the same side of the second edge. If it is determined that they do, CPU 4 determines at step S126 that the edges have a relationship corresponding to the case shown in FIG. 16a and that therefore they do not cross. On the other hand, if it is determined at step S124 that both end points of the first edge do not lie on the same side of the second edge, then the edges have a relationship corresponding to either that shown in FIG. 16b or that shown in FIG. 16c. To determine which, at step S128, CPU 4 again considers the coordinates of the points to determine whether both end points of the second edge lie on the same side of the first edge. If they do, CPU 4 determines at step S126 that the edges do not cross, the edges corresponding to the case shown in FIG. 16b. If it is determined that both end points of the second edge do not lie on the same side of the first edge at step S128, then CPU 4 determines that the edges cross, as shown in FIG. 16c, and at step S130 deletes the second edge of the pair, this being the edge with the lower combined strength. This is done by setting the combined strength of the edge to zero, thereby effectively deleting the edge from both the first and second images. At step S132, CPU 4 determines whether there is another edge in the list which has not yet been compared. Steps S122 to S132 are repeated until all edges have been considered in the manner just described. That is, steps 122 to 132 are repeated to compare the edge with the highest combined strength with each edge lower in the list (proceeding down the list), and then to compare the next highest edge remaining in the list with each remaining lower edge (proceeding down the list) and to continue to compare edges in this decreasing strength order until all comparisons have been made (i.e. the next highest edge is the last in the list).

By arranging the edges in combined strength order at step S120, so that the edges are compared in this order, it is ensured that the greatest number of edges with the highest combined strength are retained for further processing. For example, if the edges are considered in a different order, the edge with the third highest strength could, for example, be deleted since it crosses the edge with the second highest strength, but the edge with the second highest combined strength could itself subsequently be deleted when it is found to cross the edge with the highest combined strength. This does not occur with the processing in the present embodiment.

Referring again to FIG. 11, after performing step S100, computer 2 has stored therein a set of edges for each image in the pair which have a strength above the set threshold and which do not cross each other. At step S102, CPU 4 connects the user-identified points in the images to create triangles.

FIG. 17 shows the operations performed by CPU 4 at step S102 in FIG. 11. Referring to FIG. 17, at step S140, CPU 4 firstly connects the user-identified points in the first image of the pair which are connected by strong edges remaining after process S100 (FIG. 11) has been performed. At step S142, CPU 4 completes any triangle which already has two strong edges by joining the appropriate points to create the third side of the triangle. Step S142 provides the advantage that if two strong edges meet, the other ends of the edges are inter- connected to form a single triangle having the strong edges as sides. This produces more triangles lying on physical surfaces of object 24 than if the points are interconnected in other ways. This is because edges in the images of object 24 usually correspond to features on a surface or the edge of a surface.

It will be seen that, in steps S140 and S142, the side of a triangle is formed from a complete edge if the edge has a strength above the threshold (that is, it is a strong edge). This provides the advantage that the edge is not divided so that triangles with sides running the full length of the edge are created.

At step S144, CPU 4 considers the co-ordinates of the user-identified points in the first image of the pair and calculates the length of a straight edge connecting any points not already connected in steps S140 and S142. These connections are then sorted in terms of length. At step S146, CPU 4 considers the co-ordinates of the pair of points with the next shortest connecting length (this being the pair of points with the shortest connecting length the first time the step is performed), and connects the points to create an edge if the new edge does not overlap any existing edge (if it does, the points are not connected). At step S148, CPU 4 determines whether there is another pair of points in the list created at step S144 which has not been considered, and if there is, step S146 is repeated. Steps S146 and S148 are repeated until all pairs of user-identified points have been considered. At step S150, CPU 4 stores in memory 6 a list of the vertices of triangles defined by the connecting edges.

Referring again to FIG. 11, at step S104, CPU 4 uses the triangles defined from user-identified points in step S102 to calculate further corresponding points in a pair of images.

FIG. 18 shows the operations performed by CPU 4 in step S104. Referring to FIG. 18, at step S160, CPU 4 reads the co-ordinates of the triangle vertices stored at step S150 (FIG. 17) and calculates the transformation for each triangle between the images in the pair. This is done by considering the vertices of a triangle in the first image and the vertices of the corresponding triangle in the second image (that is the points in the second image previously matched to the vertex points in the first image). It is assumed that the small part of the image within the given triangle is flat, and therefore unaffected by perspective. Accordingly, each point within a triangle in one image is related to the corresponding point in the other image by a mathematical, affine transformation, as follows:

$$\begin{pmatrix} x' \\ y' \\ 1 \end{pmatrix} = \begin{pmatrix} A & B & C \\ D & E & F \\ 0 & 0 & 1 \end{pmatrix} \begin{pmatrix} x \\ y \\ 1 \end{pmatrix} \quad (1)$$

where (x, y, 1) are the homogeneous co-ordinates of the point in the first image of the pair, (x', y', 1) are the homogeneous co-ordinates of the point in the second image of the pair, and A, B, C, D, E and F are unknown variables defining the transformation.

To calculate the variables A to F, CPU 4 assumes that the mathematical transformation is the same for each vertex of a triangle (because the area of each triangle is sufficiently small that the portion of the surface of the object represented in the image within a triangle can be assumed to be flat), so that the following equation can be set up using the three known vertices of the triangle in the first image and the three known corresponding points in the second image:

$$\begin{pmatrix} x'_1 \\ y'_1 \\ x'_2 \\ y'_2 \\ x'_3 \\ y'_3 \end{pmatrix} = \begin{pmatrix} x_1 & y_1 & 1 & 0 & 0 & 0 \\ 0 & 0 & 0 & x_1 & y_1 & 1 \\ x_2 & y_2 & 1 & 0 & 0 & 0 \\ 0 & 0 & 0 & x_2 & y_2 & 1 \\ x_3 & y_3 & 1 & 0 & 0 & 0 \\ 0 & 0 & 0 & x_3 & y_3 & 1 \end{pmatrix} \begin{pmatrix} A \\ B \\ C \\ D \\ E \\ F \end{pmatrix} \quad (2)$$

where (x, y, 1) are the homogeneous co-ordinates of a triangle vertex in the first image, the co-ordinate numbers indicating with which vertex the co-ordinates are associated, and (x', y', 1) are the homogeneous co-ordinates of the point in the second image which is matched with the triangle vertex in the first image (again, the co-ordinate numbers indicating with which vertex the point is matched). This equation is solved in a conventional manner to calculate values for A to F and hence define the transformation for each triangle.

At step S162, CPU 4 divides the first image into a series of grid squares of size 25 pixels by 25 pixels, and sets a flag for each square to indicate that the square is "empty". FIG. 19 illustrates an image divided into grid squares. At step S164, CPU 4 determines whether there are any points in the first image of the pair under consideration which have been matched with a point in the preceding image in the sequence but which have not been matched with a point in the second image of the pair. When the first image of the pair under consideration is the very first image in the sequence (the image taken at position L1 in the example of FIG. 2) then there are no such points since there is no preceding image in the sequence. When the second image in the sequence (the image taken at position L3 in the example of FIG. 2) is the first image in the pair under consideration, it will be seen from FIG. 7 that points may have been matched with the preceding image (the first image in the sequence) by automatic initial feature matching at step S52, by user matching at step S60 or step S72 or by affine initial feature matching at step S62. When the first image of the pair under consideration is the third or a subsequent image in the sequence (one of the images taken at positions L2, L4 or L5), points may have been matched with the preceding image by automatic initial feature matching at step S54, by user matching at step S60 or step S72, by affine initial feature matching at step S62 or step S64, or additionally by constrained feature matching at step S74, as described previously and as described in greater detail later.

Referring again to FIG. 18, if CPU 4 determines at step S164 that such points exist, at step S166 it considers one of the points, referred to as a "previously matched" point, and at step S168 determines whether this point lies within a triangle created at step S102 in FIG. 11 in the first image of the pair. If the point does not lie within a triangle, the processing proceeds to step S178 where CPU 4 determines whether there is another previously matched point in the first image of the pair. Steps S166, S168 and S176 are repeated until a previously matched point lying within a triangle in the first image of the pair is identified, or until all such previously matched points have been considered. When it is determined at step S168 that the previously matched point being considered does lie within a triangle in the first image of the pair, at step S170, CPU 4 tries to find a corresponding point in the second image of the pair. This is done by applying the affine transformation for the triangle in which the point lies (previously calculated at step S160) to the co-ordinates of the point to identify a point in the second image, and then applying an adaptive least squares correlation routine, such as the one described in the paper "Adaptive Least Squares Correlation: A Powerful Image Matching Technique" by A. W. Gruen, Photogrammetry Remote Sensing and Cartography, 1985, pages 175–187, to consider the identified point in the second image and points in a small area around it to determine whether any point has the same image characteristics as the previously matched point in the first image of the pair. This produces a similarity measure for a point in the second image. At step S172, CPU 4 determines whether a corresponding point in the second image of the pair has been found by comparing the similarity measure with a threshold (in this embodiment, 0.4). If the similarity measure is greater than the threshold, it is determined that the point in the second image having this similarity measure corresponds to the previously matched point in the first image and at step S174, CPU 4 changes the flag for the grid square in which the point in the first image lies to indicate that the grid square is "full". At step S176, CPU 4 stores data identifying the points as matched.

At step S178, CPU 4 considers whether there is another previously matched point in the first image of the pair not yet considered, and if there is, steps S166 to S178 are repeated until all previously matched points in the first image of the pair have been processed in the manner just described.

When all of the previously matched points in the first image of the pair have been processed, or if it is determined at step S164 that there are no previously matched points, then at step S180, CPU 4 considers the next empty grid square in the first image of the pair, and at step S182 determines whether part of a triangle (defined at step S102 in FIG. 11) lies within the square. If no part of a triangle lies within the square, for example as is the case with squares 34, 36, 38 in FIG. 19, then processing proceeds to step S192 where CPU 4 determines whether there is another empty grid square in the first image which has not yet been considered. Steps S180, S182 and S192 are repeated until a grid square is identified which contains part of a triangle (for example square 40 in FIG. 19). Processing then proceeds to step S184 in which CPU 4 identifies the point lying in both the triangle and the grid square which has the best matching characteristics. In this embodiment this selection is performed using a technique such as that described in "Scale-Space Theory in Computer Vision" by Tony Lindeberg, Kluwer Academic Publishers, ISBN 0-7923-9418-6, pages 158–160, Junction (corner) Detection, to identify the point with the strongest corner values.

At step S185, CPU 4 compares the value of the "best" point with a threshold (in this embodiment, the corner value is compared with a threshold of 1.0). If the value is below the threshold, CPU 4 determines that the matching characteristics of the best point are not sufficiently high to justify processing to try to match the point with a point in the other image, and processing proceeds to step S192.

On the other hand, if the value is equal to, or above, the threshold (indicating that the point is suitable for matching), at step S186, CPU 4 applies the affine transformation for the triangle in which the point lies (previously calculated at step S160) to the co-ordinates of the point selected at step S184 to identify a point in the second image, and carries out an adaptive least squares correlation routine, such as that described in the paper "Adaptive Least Squares Correlation: A Powerful Image Matching Technique" by A. W. Gruen, Photogrammetry Remote Sensing and Cartography, 1985, pages 175–187, to consider pixels within a surrounding area of the identified point in the second image and to produce a value indicating the degree of similarity between the point in the first image and the best matching point in the area in the second image. At step S188, CPU 4 determines whether a matching point has been found in the second image of the pair by comparing the similarity measure with a threshold. If the similarity measure is greater than the threshold, CPU 4 determines that the point identified in the second image matches the point in the first image, and at step S190 stores the match. If the similarity measure is below the threshold, CPU 4 determines that no matching point has been found in the second image.

At step S192, CPU 4 determines whether there is another empty grid square in the first image which has not yet been considered. Steps S180 to S192 are repeated until all empty grid squares have been considered in the way described above.

The use of grid squares as described above to identify points in the first image of the pair for matching with points in the second image of the pair provides the advantage that the points in the first image considered for matching are spread over a wide area with a degree of uniformity in their spacing (rather than being bunched together in a small area of the image). The number and density of points in the first image of the pair to be considered for matching can be changed by changing the size of the squares in the grid. If the squares are made smaller, then a larger number of points, which are more closely spaced will be considered, while if the grid squares are made larger, a smaller number of more widely spaced points will be considered.

The way in which CPU 4 calculates the camera transformations between three images in a triple at steps S56 and S66 in FIG. 7 will now be described with reference to FIGS. 20 to 38.

FIG. 20 shows, at a top level, the operations performed by CPU 4 in calculating the camera transformations. At step S200, CPU 4 determines whether the images in the triple, for which the camera transformations are to be calculated, are the first three images in the positional sequence. Referring again to FIG. 7, when the first three images in the positional sequence (that is, the images taken at positions L1, L3 and L2 in the example of FIG. 2) are processed, the camera transformations for the first pair of images in the triple have not been calculated previously. However, when the next image in the sequence is considered, the triple of images being processed comprises the second, third and fourth images in the sequence. In this case, the camera transformations between the second and third images in the sequence have previously been calculated when these images where processed in connection with the previous triple of images (the first, second and third images in the sequence). Similarly, when subsequent images of the sequence are considered, the camera transformations for the first pair of images will also have been calculated previously in connection with the previous triple of images.

When the camera transformations for the first pair of images in the triple have been calculated previously, the processing performed by CPU 4 is simplified by using the previously calculated transformations. Accordingly, CPU 4 performs a different calculation routine depending upon whether the camera transformations for the first pair of images in the triple have been previously calculated: a first routine is performed in step S202 when the triple of images being considered comprises the first three images in the positional sequence, and a second routine is performed at step S204 for other triples of images.

The calculation routine performed at step S202 for the triple of images comprising the first three images in the positional sequence will be described first.

FIG. 21 shows, at a top level, the operations performed by CPU 4 in performing the calculation routine at step S202 in FIG. 20. Referring to FIG. 21, at step S206, CPU 4 sets up the parameters necessary for the calculation. At step S208, CPU 4 calculates the camera transformations between the first pair of images in the triple and stores the results, and at step S210, CPU 4 calculates the camera transformations between the second pair of images in the triple and stores the results. At step S212, the camera transformations for the first pair of images calculated at step S208 and for the second pair of images calculated at step S210 are used to calculate the camera transformations for all three images in the triple, these transformations then being stored.

FIG. 22 shows the operations performed by CPU 4 in setting up the parameters at step S206. Referring to FIG. 22, at step S214, CPU 4 reads the camera data input by the user at step S30 (FIG. 4). At step S216, CPU 4 reads the points matched in the first pair of images of the triple during initial feature matching at steps S52, S60, S62 and S72 (FIG. 7) and the points matched in the second pair of images in the triple during initial feature matching at steps S54, S60, S64 and S72 (FIG. 7).

At step S218, CPU 4 generates, for each pair of images, a list of the matched points which are user-identified (that is, identified by the user at step S60 or S72 in FIG. 7) and a list of matched points comprising both points calculated by CPU 4 as matching (at steps S52, S54, S62 or S64 in FIG. 7) and user-identified points. Some of the calculated matching points may be the same as user-identified matching points. If this is the case, CPU 4 deletes the CPU-calculated points from the list so that there are no duplicate pairs of matching points. By deleting the CPU-calculated points, CPU 4 ensures that a point appears in both of the lists which will be used for the calculations (one of these lists being user-identified points alone, and hence the point would not appear in this list if user-identified points were deleted to remove duplicates). The number of points in the list of user-identified matching points may be zero. This will be case if affine initial feature matching at steps S60 to S72 in FIG. 7 has not been performed.

Also at step S218, CPU 4 generates a list of "triple" points, that is, points (including both user-matched points and CPU-calculated points) which are matched across all three images in the triple of images being considered.

At step S220, CPU 4 normalises the co-ordinates of the points in the lists created at step S218. Up to this point, the co-ordinates of the points are defined in terms of the number of pixels across and down the image from the top left-hand corner of the image. At step S220, CPU 4 uses the camera focal length and image plane (film or CCD) size read at step S214 to convert the co-ordinates of the points from pixels to a co-ordinate system in millimetres having an origin at the camera optical centre. The millimetre coordinates are related to the pixel coordinates as follows:

$$x^* = h \times (x - C_x) \quad (3)$$

$$y^* = -v \times (y - C_y) \quad (4)$$

where (x*, y*) are the millimetre coordinates, (x, y) are the pixel coordinates, ($C_x$, $C_y$) is the centre of the image (in pixels), which is defined as half of the number of pixels in the horizontal and vertical directions, and "h" and "v" are the horizontal and vertical distances between adjacent pixels (in mm).

CPU 4 stores both the millimetre coordinates and the pixel coordinates.

At step S222, CPU 4 sets up a measurement matrix, M, as follows for each of the list of user-identified points and the list of user-identified and calculated points generated at step S218:

$$M = \begin{pmatrix} x_1 x_1' & -y_1 x_1' & x_1' & -x_1 y_1' & y_1 y_1' & -y_1' & x_1 & -y_1 & 1 \\ x_2 x_2' & -y_2 x_2' & x_2' & -x_2 y_2' & -y_2 y_2' & -y_2' & x_2 & -y_2 & 1 \\ \vdots & \vdots & \vdots & \vdots & \vdots & \vdots & \vdots & \vdots & \vdots \\ x_k x_k' & -y_k x_k' & x_k' & -x_k y_k' & y_k y_k' & -y_k' & x_k & -y_k & 1 \end{pmatrix} \quad (5)$$

where (x, y) are the pixel co-ordinates of the point in the first image of the pair, (x', y') are the pixel co-ordinates of the corresponding (matched) point in the second image of the pair, and the numbers 1 to k indicate to which pair of points the co-ordinates correspond (there being k pairs of points in total in the list—which may, of course, be different for the user-identified points list and the user-identified and calculated points list).

At step S224, CPU 4 determines the number of iterations to be performed for the four different calculation techniques that it will use to calculate the camera transformations for the first pair of images and the four different calculation techniques that it will use to calculate the camera transformations for the second pair of images. The four techniques used to calculate the camera transformations (the same techniques being used for the first pair of images and the second pair of images) are: a perspective calculation using the list of user-identified points; a perspective calculation using the list of both user-identified and calculated points; an affine calculation using the list of user-identified points; and an affine calculation using the list of both user-identified and calculated points.

FIG. 23 shows the steps performed by CPU 4 at step S224 in FIG. 22 to determine the number of iterations to be used in each calculation. Referring to FIG. 23, at step S230, CPU 4 considers one of the lists produced at step S218 and determines whether the number of points in that list is less than four. If it is, then at step S232, CPU 4 sets the number of iterations, "np", to be performed for the perspective calculation using the points in that list to zero, and the number of iterations, "na", to be performed for the affine calculation using the points in that list to be zero, too. That is, if it is found at step S230 that the number of points in the list is less than four, the number of iterations is set to zero at step S232 to ensure that neither the perspective calculation nor the affine calculation is performed since there are not enough pairs of matching points.

If it is determined at step S230 that the number of pairs of points in the list is not less than four, then at step S234, CPU 4 determines whether the number of pairs of points is less than seven. If it is, then at step S236, the number of iterations, "np", for the perspective calculation using the points in the list is set to zero (since again there are not sufficient points to perform the calculation), and the number of iterations, "na", to be used when performing the affine calculation for the points in the list is set to be fifteen. The value "na" is set to 15 because this represents the maximum number of iterations it is possible to perform without repetition using six pairs of points (the highest number less than seven) in the affine calculation.

If it is determined at step S234 that the number of pairs of points in the list is not less than seven, then at step S238 CPU 4 sets the number of iterations, "np", to be performed for the perspective calculation using the points in the list to be the minimum of 4,000 and the integer part of k(k-1)(k-2)(k-3)(k-4)(k-5)(k-6)/20160, and sets the number of iterations, "na", to be performed for the affine calculation using the points in the list to be the minimum of 800 and the integer part of k(k-1)(k-2)(k-3)/48. As will be seen later, the value k(k-1)(k-2)(k-3)(k-4)(k-5)(k-6)/20160 represents 25% of the maximum number of iterations it is possible to perform without repetition for the perspective calculation and the value k(k-1)(k-2)(k-3)/48 represents 50% of the maximum number of iterations it is possible to perform without repetition for the affine calculation. The values 4,000 and 800 are chosen since they have been determined empirically to produce acceptable results in a reasonable time limit.

The operations described above with respect to FIG. 23 are performed for each of the lists set up at step S218, with the exception of the list of "triple" points, to calculate the number of iterations to be performed in all four camera transformation calculation techniques for the first pair of images and for the second pair of images.

FIG. 24 shows, at a top level, the operations performed by CPU 4 when calculating the camera transformations for the first pair of images in the triple at step S208 (FIG. 21), and when calculating the camera transformations for the second pair of images in the triple at step S210 (FIG. 21). Referring to FIG. 24, at step S240, CPU 4 calculates the camera transformation between the pair of images using a perspective calculation, and stores the results. At step S242, CPU 4 calculates the camera transformations for the image pair using an affine calculation, and stores the results.

That is, CPU 4 calculates the camera transformations for each pair of images using two techniques, each corresponding to a respective one of the two possible types of image that can be input for processing (as noted previously, for the third type of image, namely images of a flat object, it is not possible to perform processing to generate a 3D model of the object).

FIGS. 25(A–C) shows the operations performed by CPU 4 when calculating the camera transformations using a perspective calculation at step S240 in FIG. 24. Referring to FIGS. 25(A–C) CPU 4 first performs the perspective calculation using the pairs of points in the list of user-identified points (steps S244 to S262) and then using the pairs of points in the list containing both user-identified points and calculated points (steps S264 to S282). CPU 4 then determines which list of points produced the most accurate results, and converts these results into calculated camera transformations for the pair of images (step S284). These processing operations provide the advantage that the transformation is calculated using a plurality of different sets of points, thereby giving a greater probability that an accurate transformation will be calculated. The operations will now be described in greater detail.

Referring to FIGS. 25(A–C) at step S244, CPU 4 reads the value for the number of iterations to be performed for the perspective calculation using the user-identified points which was set at step S224 (FIG. 22) and determines whether this value is greater than zero. If it is not, then the processing proceeds to step S264, which is the start of the processing operations for the perspective calculation using the list of both user-identified and calculated points, since there are not sufficient user-identified points alone on which to perform the perspective calculation.

On the other hand, if it is determined at step S244 that the number of iterations is greater than zero, at step S246 CPU 4 increments the value of a counter by one (the first time step S246 is performed, CPU 4 setting the counter value to one). At step S248, CPU 4 selects at random seven pairs of points from the list of matched user-identified points set up at step S218 (FIG. 22). At step S250, CPU 4 uses the selected seven pairs of points and the measurement matrix set at step S222 to calculate the fundamental matrix, F, representing the geometrical relationship between the images, F being a three by three matrix satisfying the following equation:

$$(x' \quad y' \quad 1)F\begin{pmatrix} x \\ y \\ 1 \end{pmatrix} = 0 \tag{6}$$

where (x, y, 1) are the homogeneous pixel co-ordinates of any of the seven selected points in the first image of the pair, and (x', y', 1) are the corresponding homogeneous pixel co-ordinates in the second image of the pair. The fundamental matrix is calculated in a conventional manner, for example using the technique disclosed in "Robust Detection of Degenerate Configurations Whilst Estimating the Fundamental Matrix" by P. H. S. Torr, A. Zisserman and S. Maybank, Oxford University Technical Report 2090/96.

It is possible to select more than seven pairs of matched points at step S248 and to use these to calculate the fundamental matrix at step S250. However, seven pairs of points are used in this embodiment, since this has been shown empirically to produce satisfactory results, and also represents the minimum number of pairs needed to calculate the parameters of the fundamental matrix, reducing processing requirements.

At step S252, CPU 4 converts the fundamental matrix, F, into a physical fundamental matrix, $F_{phys}$, using the camera data read at step S214 (FIG. 22). This is again performed in a conventional manner, for example as described in "Motion and Structure from Two Perspective Views: Algorithms, Error Analysis and Error Estimation" by J. Weng, T. S. Huang and N. Ahuja, IEEE Transactions on Pattern Analysis and Machine Intelligence, vol. 11, No. 5, May 1989, pages 451–476, and as summarised below.

First the essential matrix, E, which satisfies the following equation is calculated:

$$(x*' \quad y*' \quad f)E\begin{pmatrix} x* \\ y* \\ f \end{pmatrix} = 0 \tag{7}$$

where (x*, y*, f) are the co-ordinates of any of the selected seven points in the first image in a millimetre co-ordinate system whose origin is at the centre of the image, the z co-ordinate having being normalised to correspond to the focal length, f, of the camera, and (x*', y*', f) are the corresponding co-ordinates of the matched point in the second image of the pair. The fundamental matrix, F, is converted into the essential matrix, E, using the following equations:

$$A = \begin{pmatrix} 1/h & 0 & c_x/f \\ 0 & 1/v & -c_y/f \\ 0 & 0 & 1/f \end{pmatrix} \tag{8}$$

$$M = A^T F A \tag{9}$$

$$E = \sqrt{\frac{2}{tr(M^T M)}} \times M \tag{10}$$

where the camera parameters "h", "v", "$c_x$", "$C_y$" and "f" are as defined previously, the symbol T denotes the matrix transpose, and the symbol "tr" denotes the matrix trace.

The calculated essential matrix, E, is then converted into a physical essential matrix, "$E_{phys}$", by finding the closest matrix to E which is decomposable directly into a translation vector (of unit length) and rotation matrix (this closest matrix being $E_{phys}$).

Finally, the physical essential matrix is converted into a physical fundamental matrix, using the equation:

$$F_{phys} = A^{-1T} E_{phys} A^{-1} \tag{11}$$

where the symbol "−1" denotes the matrix inverse.

Each of the physical essential matrix, $E_{phys}$, and the physical fundamental matrix, $F_{phys}$ is a "physically realisable matrix", that is, it is directly decomposable into a rotation matrix and translation vector.

The physical fundamental matrix, $F_{phys}$, defines a curved surface in a four-dimensional space, represented by the coordinates (x, y, x', y') which are known as "concatenated image coordinates". The curved surface is given by Equation 6 above, which defines a 3D quadric in the 4D space of concatenated image coordinates.

At step S253, CPU 4 tests the calculated physical fundamental matrix against each pair of points that were used to calculate the fundamental matrix at step S250. This is done by calculating an approximation to the 4D Euclidean distance (in the concatenated image coordinates) of the 4D point representing each pair of points from the surface representing the physical fundamental matrix. This distance is known as the "Sampson distance", and is calculated in a conventional manner, for example as described in "Robust Detection of Degenerate Configurations Whilst Estimating the Fundamental Matrix" by P. H. S. Torr, A. Zisserman and S. Maybank, Oxford University Technical Report 2090/96.

FIG. 26 shows the way in which CPU 4 tests the physical fundamental matrix at step S253. Referring to FIG. 26, at step S290, CPU 4 sets a counter to zero. At step S292, CPU 4 calculates the tangent plane of the surface representing the physical fundamental matrix at the four-dimensional point defined by the co-ordinates of the next pair of points in the seven pairs of user-identified points (the two co-ordinates defining each point in the pair being used to define a single point in the four-dimensional space of the concatenated image co-ordinates). Step S292 effectively comprises shifting the surface to touch the point defined by the co-ordinates of the pair of points, and calculating the tangent plane at that point. This is performed in a conventional manner, for example as described in "Robust Detection of Degenerate Configurations Whilst Estimating the Fundamental Matrix" by P. H. S. Torr, A. Zisserman and S. Maybank, Oxford University Technical Report 2090/96.

At step S294, CPU 4 calculates the normal to the tangent plane calculated at step S292, and at step S296, it calculates the distance along the normal from the point in the 4D space defined by the co-ordinates of the pair of matched points to the surface representing the physical fundamental matrix (the "Sampson distance"). At step S298, the calculated distance is compared with a threshold which, in this embodiment, is set at 2.8 pixels. If the distance is less than the threshold, then the point lies sufficiently close to the surface, and the physical fundamental matrix is considered to accurately represent the movement of the camera from the first image of the pair to the second image of the pair for the particular pair of matched points being considered. Accordingly, if the distance is less than the threshold, at step S300, CPU 4 increments the counter which was initially set to zero at step S290, stores the points, and stores the distance calculated at step S296.

At step S302, CPU 4 determines whether there is another pair of points in the seven pairs of points used to calculate the fundamental matrix, and steps S292 to S302 are repeated until all such points have been processed as described above.

Referring again to FIG. 25(A–C), at step S254, CPU 4 determines whether the physical fundamental matrix calculated at step S252 is sufficiently accurate to justify further processing to test it against all of the user-identified and calculated points. In this embodiment, step S254 is performed by determining whether the counter value set at step S300 (indicating the number of pairs of points which have a distance less than the threshold at step S298, and hence are considered to be consistent with the physical fundamental matrix) is equal to 7. That is, CPU 4 determines whether the physical fundamental matrix is consistent with all of the points used to calculate the fundamental matrix from which the physical fundamental matrix was derived. If the counter is less than 7, CPU 4 does not test the physical fundamental matrix further, and processing proceeds to step S256. On the other hand, if the counter value is equal to 7, at step S255 CPU 4 tests the physical fundamental matrix against each pair of points in the list containing both user-identified and calculated points (even though the physical fundamental matrix has been derived using points from the list containing only user-identified points). This is performed in the same way as step S253 described above, with the following exceptions: (i) at step S290, CPU 4 sets the counter to 7 to reflect the seven pairs of points already tested at step S253 and determined to be consistent with the physical fundamental matrix; (ii) the physical fundamental matrix is tested against all user-identified and calculated points (although the pairs of points previously tested at step S253 are not re-tested), and (iii) CPU 4 calculates the total error for all points stored at step S300, using the following equation:

$$\text{Total error} = \frac{\sqrt{\sum \frac{e_i^2}{p}}}{e_{th}} \quad (12)$$

where $e_i$ is the distance for the "i"th pair of matched points between the 4D point represented by their co-ordinates and the surface representing the physical fundamental matrix calculated at step S296, this value being squared so that it is unsigned (thereby ensuring that the side of the surface representing the physical fundamental matrix on which the point lies does not affect the result), p being the total number of points stored at step S300 and $e_{th}$ being the distance threshold used in the comparison at step S298.

In step S255, the counter value and stored points at step S300 (FIG. 26) and the total error described above include the seven pairs of points tested at step S253.

The effect of step S255 is to determine whether the physical fundamental matrix calculated at step S252 is accurate for each pair of user-identified and calculated points, the value of the counter at the end (step S300) indicating the total number of the points for which the calculated matrix is sufficiently accurate.

At step S256, CPU 4 determines whether the physical fundamental matrix tested at step S255 is more accurate than any previously calculated using the perspective calculation technique for the user-identified points alone. This is done by comparing the counter value stored at step S300 in FIG. 26 for the last-calculated physical fundamental matrix (this value representing the number of points for which the physical fundamental matrix is an accurate camera solution) with the corresponding counter value stored for the most accurate physical fundamental matrix previously calculated. The matrix with the highest number of points (counter value) is taken to be the most accurate. If the number of points is the same for two matrices, the total error for each matrix (calculated as described above) is compared, and the most accurate matrix is taken to be the one with the lowest error. If it is determined at step S256 that the physical fundamental matrix is more accurate than the currently stored one, at step S258 the previous one is discarded, and the new one is stored together with the number of points (counter value) stored at step S300 in FIG. 26, the points themselves, and the total error calculated for the matrix.

At step S260, CPU 4 determines whether the value of the counter incremented at step S246 is less than the value "np" set at step S224 in FIG. 22 defining the number of iterations to be performed. If the value is not less than "np", the required number of iterations has been performed, and the processing proceeds to step S264 in order to carry out the perspective calculation for the points in the list comprising both user-identified points and calculated points. Alternatively, if the required number of iterations has not yet been reached (value of the counter is still less than "np" at step S260), at step S262, CPU 4 determines whether the accuracy of the physical fundamental matrix (represented by the counter value and the total error stored at step S258) has increased at all in the last np/2 iterations. If it has, it is worthwhile performing further iterations, and steps S246 to S262 are repeated. If there has not been any change in the accuracy of the physical fundamental matrix in the last np/2 iterations, processing is stopped even though the number of iterations has not yet reached the value "np" set at step S224 in FIG. 22. In this way, processing time can be saved in cases where performing the full number of iterations would not produce significantly more accurate results.

As described above with respect to FIG. 23, the value of "np" is set based on the number of pairs of points in the list of points from which the seven pairs are selected at random at step S248. Referring to step S238 in FIG. 23, the value (k-1)(k-2)(k-3)(k-4)(k-5)(k-6)/20160 represents 25% of the maximum number of iterations that it would be possible to perform without repetition (this maximum number being the total number of different combinations of seven pairs of points selected from the list). The value np/2 used at step S262 has been determined empirically to produce acceptable results in a reasonable time.

Referring again to FIGS. 25(A–C) at steps S264 to S282, CPU 4 carries out the perspective calculation for the pair of images using pairs of points selected at random from the list comprising both user-identified and calculated points. The steps are the same as those performed at steps S244 to S262, described above, with the exception that the value "np" defining the number of iterations to be performed has been set differently (step S224 in FIG. 22), and the seven pairs of points used to calculate the fundamental matrix selected at random are chosen from the list comprising both user-identified and calculated points. The operations performed in this processing will not, therefore, be described again. As before, FIG. 26 shows the steps performed when testing the physical fundamental matrix against each pair of user-identified and calculated points (step S273 and step S275).

At step S284, CPU 4 compares the most accurate physical fundamental matrix calculated using the user-identified points alone (stored at step S258) and the most accurate physical fundamental matrix calculated using both the user-identified points and calculated points (stored at step S278), and selects the most accurate of the two (by comparing the counter values which represent the number of points for which the matrices are an accurate solution, and, if these are the same, the total error). The most accurate physical fundamental matrix is then converted to a camera rotation matrix and translation vector representing the movement of the camera between the pair of images. This conversion is performed in a conventional manner, for example as described in the above-referenced "Motion and Structure from Two Perspective Views: Algorithms, Error Analysis and Error Estimation" by J. Weng, T. S. Huang and N. Ahuja, IEEE Transactions on Pattern Analysis and Machine Intelligence, Vol. 11, No. 5, May 1989, pages 451–476.

In the processing described above with respect to FIG. 25, CPU 4 calculates a fundamental matrix (steps S250 and S270), and converts this to a physical fundamental matrix (steps S252 and S272) for testing against the user-identified points and calculated points (steps S255 and S275). This has the advantage that, although additional processing is required to convert the fundamental matrix to a physical fundamental matrix, the physical fundamental matrix ultimately selected at step S284 has itself been tested. If the fundamental matrix was tested against the user-identified and calculated points, and the most accurate fundamental matrix selected, this would then have to be converted to a physical fundamental matrix which would not, itself, have been tested.

Referring again to FIG. 24, CPU 4 has now completed the perspective calculations for the image pair and proceeds to step S242, in which it performs the second type of calculation, namely an affine calculation, for the image pair.

FIGS. 27(A,B) shows the operations performed by CPU 4 when carrying out the affine calculations.

As when performing the perspective calculations, CPU 4 performs an affine calculation using pairs of points selected from the list of user-identified points alone (steps S310 to S327), and using pairs of points from the list of points comprising both user-identified points and calculated points (steps S328 to S345), and then selects the most accurate affine solution (step S346). Again, this provides the advantage that the transformation is calculated using a plurality of different sets of points, thereby giving a greater probability that an accurate transformation will be calculated.

When performing the perspective calculations, it is possible to calculate all of the components of the fundamental matrix, F. However, when the relationship between the pair of images is an affine relationship, it is possible to calculate only four independent components of the fundamental matrix, these four independent components defining what is commonly known as an "affine" fundamental matrix.

Referring to FIGS. 27(A,B), at step S310, CPU 4 determines whether the number of iterations, "na", set at step S224 (FIG. 22) for af fine calculations using user-identified points alone is greater than zero. If it is not, there are insufficient pairs of points in the list of user-identified points to perform an affine calculation, and the processing proceeds to step S328 where the list of points comprising both user-identified points and calculated points is considered. On the other hand, if it is determined at step S310 that the number of iterations to be performed is greater than zero, at step S312 CPU 4 increments the value of a counter (the value of the counter being set to one the first time step S312 is performed).

At step S314, CPU 4 selects at random four pairs of matched points from the list of points containing user-identified points alone. At step S316, CPU 4 uses the selected four pairs of points and the measurement matrix set at step S222 to calculate four independent components of the fundamental matrix (giving the "affine" fundamental matrix) using a technique such as that described in "Affine Analysis of Image Sequences" by L. S. Shapiro, Section 5, Cambridge University Press 1995, ISBN 0-521-55063-7. It is possible to select more than four pairs of points at step S314 and to use these to calculate the affine fundamental matrix at step S316. However, in the present embodiment, only four pairs are selected since this has been shown empirically to produce satisfactory results, and also represents the minimum number required to calculate the components of the affine fundamental matrix, reducing processing requirements.

At step S318, CPU 4 tests the affine fundamental matrix against each pair of points in the list comprising both user-identified points and calculated points (even though the affine fundamental matrix has been derived using points from the list containing only user-identified points), using a technique such as that described in "Affine Analysis of Image Sequences" by L. S. Shapiro, Section 5, Cambridge University Press, 1995, ISBN 0-521-55063-7. The affine fundamental matrix represents a flat surface (hyperplane) in four-dimensional, concatenated image space, and this test comprises determining the distance between a point in the four-dimensional space defined by the co-ordinates of a pair of matched points and the flat surface representing the affine fundamental matrix. As with the tests performed during the perspective calculations at steps S255 and S275 (FIGS. 25A–C), the test performed at step S318 generates a value for the number of pairs of points in the list of user-identified and calculated points for which the affine fundamental matrix represents a sufficiently accurate solution to the camera transformations and a total error value for these points.

At step S320, CPU 4 determines whether the affine fundamental matrix calculated at step S316 and tested at step S318 is more accurate than any previously calculated using the user-identified points alone. This is done by comparing the number of points for which the matrix represents an accurate solution with the number of points for the most accurate affine fundamental matrix previously calculated. The matrix with the highest number of points is the most accurate. If the number of points is the same, the matrix with the lowest error is the most accurate. If the affine fundamental matrix is more accurate than any previously calculated, at step S322 it is stored together with the points for which it represents a sufficiently accurate solution, the total number of these points and the matrix total error.

At step S324, CPU 4 determines whether the value of the counter incremented at step S312 is less than the number of iterations, "na", set for affine calculations on user-identified points alone at step S224 (FIG. 22), and hence whether the set number of iterations has been performed. If the value of the counter is not less than the set number of iterations, then the required number of iterations have been performed, and processing proceeds to step S328. If the value of the counter is less than the set number of iterations, CPU 4 performs a further test at step S326 to determine whether the accuracy of the affine fundamental matrix has increased at all in the last na/2 iterations. If the accuracy has not increased, then processing is stopped even though the set number of iterations, "na", has not yet been performed. In this way, iterations which would not produce any increase in the accuracy of the affine fundamental matrix are not performed, and hence processing time is saved. On the other hand, if the accuracy has increased, steps S312 to S326 are repeated until either it is determined at step S324 that the set number of iterations has been performed or it is determined at step S326 that there has been no increase in accuracy of the affine fundamental matrix in the previous na/2 iterations.

At step S327, CPU 4 converts the stored affine fundamental matrix (that is, the most accurate calculated using the user-identified points alone) into three physical variables describing the camera transformation, namely the magnification, "m", of the object between the two images, the axis, $\phi$, of rotation of the camera, and the cyclotorsion rotation, $\theta$, of the camera. (The variables $\phi$ and $\theta$ will be described in greater detail later.) The conversion of the affine fundamental matrix into these physical variables is performed in a conventional manner, for example as described in "Affine Analysis of Image Sequences" by L. S. Shapiro, Section 7, Cambridge University Press, 1995, ISBN 0-521-55063-7.

In steps S328 to S345, CPU 4 carries out the affine calculation using pairs of points selected at random from the list containing both user-identified points and calculated points. The steps are the same as those performed by CPU 4 for user-identified points alone in steps S310 to S327 described above, with the exception that the number of iterations, "na", may have been set to a different value at step S224 in FIG. 22, and the four pairs of points selected at random at step S332 are selected from the list comprising both user-identified and calculated points. These steps will therefore not be described again.

Having performed the affine calculation using pairs of points from the list containing user-identified points alone (steps S310 to S327) and using pairs of points from the list comprising both user-identified and calculated points (steps S328 to S345) producing an affine fundamental matrix and which is the most accurate for each calculation, at step S346, CPU 4 compares these two affine fundamental matrices and selects the most accurate, this being the one having the highest number of points (stored at steps S322 and S340), and if the number of points is the same, the one having the lowest matrix total error.

Referring again to FIG. 21, having calculated at step S208 the camera transformation for the first pair of images in the triple using the perspective and affine techniques described above, and having calculated at step S210 the camera transformation for the second pair of images in the triple using the same perspective and affine techniques, at step S212 CPU 4 uses the results to calculate the camera transformations for all three images in the triple together.

FIG. 28 shows the operations performed by CPU 4 in calculating the camera transformations for all three images in the triple together at step S212.

When considering all three images in the triple, there are two camera transformations—one from the position at which the first image in the triple was taken to the position at which the second image was taken, and one from the position at which the second image was taken to the position at which the third image in the triple was taken. Each of these transformations can be either an affine transformation or a perspective transformation, giving four possible combinations between the images (namely affine-affine, affine-perspective, perspective-affine and perspective-perspective). Accordingly, at steps S350, S352, S354 and S356, CPU 4 considers a respective one of the four possible combinations, and at step S358 selects the most accurate solution from the four. This processing will now be described in greater detail.

At step S350, CPU 4 considers the case in which the transformation between the first pair of images in the triple is affine, and the transformation between the second pair of images is also affine. Previously, at step S208 (FIG. 21) CPU 4 has already calculated the affine fundamental matrix and associated three physical variables defining the affine transformation between the first pair of images in the triple. Similarly, at step S210 (FIG. 21) CPU 4 has calculated the affine fundamental matrix and associated three physical defining the affine transformation between the second pair of images in the triple. As noted previously, the three physical variables derived from an affine fundamental matrix do not fully define the movement of the camera between a pair of images. At step S350, CPU 4 uses the previously calculated three physical variables to calculate the parameters necessary to define fully the camera movement between each pair of images.

Figure 29A:
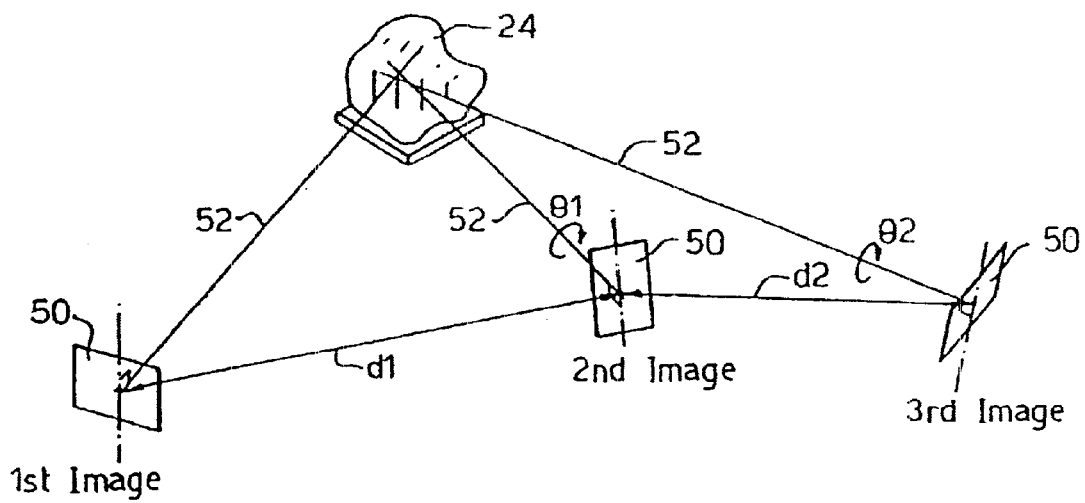
Figure 29B:
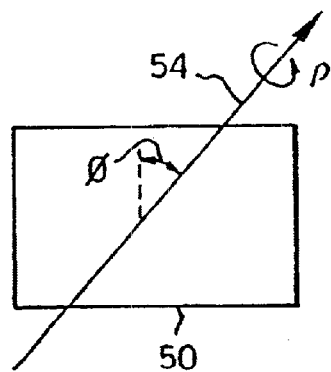

FIGS. 29a and 29b illustrate the parameters which it is necessary to calculate at step S350 to define fully the camera movements. FIG. 29a shows a CCD imaging device, or film, 50 on which the images are formed in three different locations and orientations, representing the locations and orientations at which the first, second and third images in a triple were taken. Lines 52 represent the optical axis of the camera 12. The optical axis 52 moves a distance d1 in moving from the first position to the second position, and a distance d2 in moving from the second position to the third position.

The rotation of CCD 50 between the imaging positions is decomposed into a rotation about the optical axis 52 and a rotation about an axis parallel to the image plane. This is known as the, "KvD decomposition" and is described in "Affine Analysis of Image Sequences" by L. S. Shapiro, Appendix D, Cambridge University Press, 1995, ISBN 0-521-55063-7. The rotation about the optical axis is known as the "cyclotorsion angle" and is represented by "$\theta$" in FIG. 29a. In the example shown in FIG. 29a, CCD 50 rotates by an angle $\theta1=90°$ from a "landscape" orientation for the first image to a "portrait" orientation for the second image, and then by a further angle $\theta2=-90°$ back to a "landscape" orientation for the third image.

The rotation about the axis parallel to the image plane is decomposed in an axis-angle formulation into two angles, $\phi$ and $\rho$, as shown in FIG. 29b. $\phi$ defines the axis 54 within the image plane about which rotation occurs, $\phi$ being known as the "axis angle". $\rho$ defines the angle the camera is rotated through about the axis 54, $\rho$ being known as the "turn angle".

The decomposition of the camera rotation into three angles is applied to the transformation of the camera between the first and second images in each triple (these angles being referred to as $\theta1$, $\phi1$, $\rho1$) and between the second and third images (these angles being referred to as $\theta2$, $\phi2$, $\rho2$).

In the case where the two transformations of the camera are both considered to be affine, the scale, s, defined as $s=d2/d1$, and the rotation angles $\rho1$ and $\rho2$ remain undefined by the affine fundamental matrices calculated at steps S208 and S210 (FIG. 21) and must be calculated at step S350.

When the camera transformation between a pair of images is a perspective transformation, the values of ρ, d, θ, φ are already defined in the rotation matrix and translation vector calculated at step S208 or S210 (FIG. 21). However, the scale is not known. Accordingly, at step S352, when CPU 4 considers the affine-perspective case, it is necessary to calculate the scale, s, and ρ1. At step S354, when CPU 4 considers the perspective-affine case, it is necessary to calculate the scale, s, and ρ2. At step S356, when CPU 4 considers the perspective-perspective case, it is necessary to calculate only the scale, s.

FIG. 30 shows the operations performed by CPU 4 in steps S350, S352, S354 and S356 when calculating the values of scale, ρ1 and ρ2.

Referring to FIG. 30, at step S380, CPU 4 takes the next value of ρ1, ρ2. FIGS. 31a–31d show the values of ρ1, ρ2 considered by CPU 4 in the different cases at steps S350 to S356.

Figure 31A:
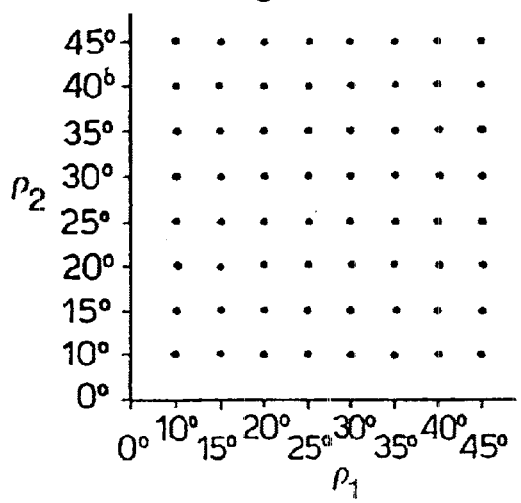

FIG. 31a shows the value of ρ1, ρ2 for the affine-affine case considered at step S350 where both ρ1 and ρ2 are unknown. Sixty-four values of ρ1, ρ2 are considered, comprising eight values of ρ1 varying between 10° and 45° in steps of 5°, and eight values of ρ2 varying between 10° and 45° in steps of 5°. Values of ρ1 and ρ2 between 10° and 45° are considered since it has been found that a user is most likely to move camera 12 in this range between successive images when at least three images of object 24 are taken. A wider (or narrower) range of values can, of course, be considered.

Figure 31B:
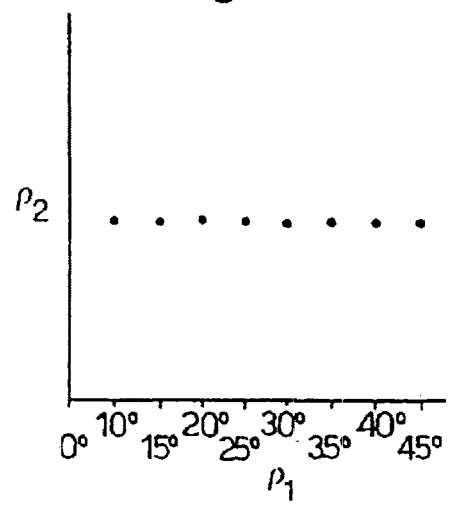

FIG. 31b shows the values of ρ1, ρ2 for the affine-perspective case considered at step S352. In this case, since the second camera transformation is perspective, the value of ρ2 is known, and therefore different values of only ρ1 need to be considered. Again, eight values of ρ1 are considered for the known value of ρ2, varying between 100 and 450 in steps of 5°.

Figure 31C:
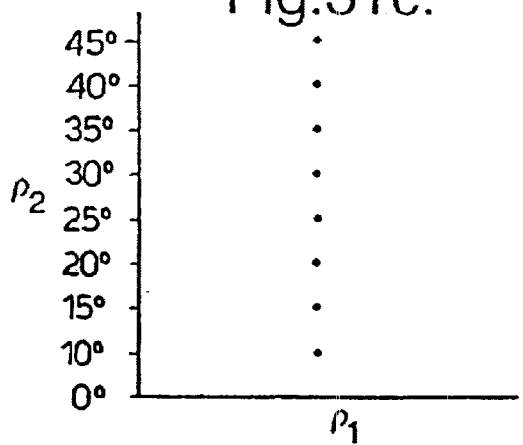

FIG. 31c shows the values of ρ1, ρ2 considered for the perspective-affine case considered at step S354. Since the first camera transformation is perspective, the value of ρ1 is known, and therefore eight values of ρ2 are considered for the known value of ρ1, varying between 10° and 45° in steps of 5°.

Figure 31D:
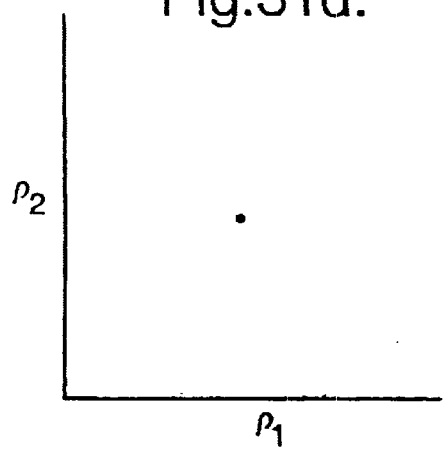

FIG. 31d shows the values of ρ1, ρ2 considered in the perspective-perspective case in step S356. In this case, since both camera transformations are perspective, the values of both ρ1 and ρ2 are known, and hence this single value is considered.

Referring again to FIG. 30, at step S382, CPU 4 calculates the scale which best fits the value of ρ1, ρ2 considered at step S380.

FIG. 32 shows the operations performed by CPU 4 when calculating the best scale in step S382. Referring to FIG. 32, at step S390, CPU 4 sets the value of a counter to zero, and at step S392 the value of the counter is incremented by one. At step S394, CPU 4 reads the co-ordinates of the points in the next triple of matched points, that is, points which are matched in all three of the images being considered, from the list generated at step S218 (FIG. 22). At step S396, CPU 4 uses the appropriate camera transformations (affine or perspective) previously calculated at step S208 or S210 (FIG. 21) to determine the relative configuration of the images in the triple, and then to project a ray (infinite line) from each point in the triple read at step S394 through the optical centre of the camera (this being the point perpendicularly displaced from the centre of the image plane by the focal length of the camera).

FIG. 33 illustrates the rays projected from each point in the triple.

It is unlikely that any of the rays from the points in the triple will intersect due to inaccuracies in the camera transformations calculated at step S208 or S210, and inaccuracies in the matched points themselves. Accordingly, at step S398, CPU 4 calculates the camera transformation between the first and second images which makes the ray from the second image intersect the ray from the first image at a point 60. This calculation is performed by CPU 4 as follows:

a) The sign of ρ1 is flipped (reversed) if sin (ρ1)×sin (φ1)>0. This is done because of prior knowledge of the ordering of the images.

b) The rotation matrix, R, is defined from the angles (θ1, φ1, ρ1) using the equations:

$$R = [I + M \sin \rho + M^2(1-\cos \rho)]R_\theta \qquad (13)$$

$$M = \begin{pmatrix} 0 & 0 & \sin\phi \\ 0 & 0 & -\cos\phi \\ -\sin\phi & \cos\phi & 0 \end{pmatrix} \qquad (14)$$

$$X = \begin{pmatrix} 0 & -1 & 0 \\ 1 & 0 & 0 \\ 0 & 0 & 0 \end{pmatrix} \qquad (16)$$

where I is the identity matrix.

c) The translation vector, $\underline{t}$, from the point position in the two images ξ, ξ', the rotation matrix, R, and the change in magnification between the two images, "m", are defined using the equations:

$$\underline{t} = \underline{v}/\sqrt{(\underline{v}^T \underline{v})} \qquad (17)$$

$$\underline{v} = (\underline{t}_{top}^T, 1 - m(R_{33} + \xi^T \underline{R}_{bot}))^T \qquad (18)$$

$$\underline{t}_{top} = \xi' - mR_{top}\xi - m\underline{R}_{right} \qquad (19)$$

$$\xi = (h(x-c_x)/f, v(y-c_y)/f)^T \qquad (20)$$

$$R = \begin{pmatrix} R_{top} & R_{right} \\ R_{bot}^T & R_{33} \end{pmatrix} \qquad (21)$$

Similarly, at step S400, CPU 4 varies the translation of the camera between the second and third images to make the ray from the third image intersect the ray from the second image at a point 62.

At step S402, CPU 4 uses the ratio of the distance $d_{62}$ of the point 62 from the optical centre of the camera at its position for the second image, to the distance $d_{60}$ of the point 60 from this optical centre, to adjust the length $d1_{initial}$ of the translation vector between the first and second camera positions and the length $d2_{initial}$ of the translation vector between the second and third camera positions, as follows:

$$d1_{final} = d1_{initial} \times \left(\frac{d_{62}}{d_{60}}\right)^{1/2} \qquad (22)$$

$$d2_{final} = d2_{initial} \times \left(\frac{d_{62}}{d_{60}}\right)^{1/2} \qquad (23)$$

Referring to FIG. 33, the lengths $d1_{final}$ and $d2_{final}$ calculated as above are the lengths of the translation vectors which cause the rays from all three images to cross at the same point 64. CPU 4 then uses the resulting values to calculate the scale, s:

$$s = \frac{d2_{final}}{d1_{final}} \tag{24}$$

At step S404, CPU 4 tests the scale calculated at step S402 against all triple points in the list produced at step S218 (FIG. 22).

FIG. 34 shows the operations performed by CPU 4 when testing the scale against all triple points. Referring to FIG. 34, at step S420, CPU 4 adjusts the relative positions of the cameras (defined by the appropriate transformations from those determined at step S208 or S210 in FIG. 21, depending upon whether an affine-affine, affine-perspective, perspective-affine or perspective-perspective case is being considered) for all three images to take into account the scale calculated at step S402 (FIG. 32). This is performed in conventional manner, for example by fixing the origin of the coordinate system to be at the optical centre of the camera in its second position (image 2) with alignment of the x, y, z axes given by the orientation of the camera in this position (the z axis being perpendicular to the image plane), and using the equations:

Centre of camera for third image=$\underline{t}_{23}$ (25)

Rotation of camera for third image=$R_{23}$ (26)

Centre of camera for first image=$-R_{12}^T \times \underline{t}_{12}$ (27)

Rotation of camera for first image=$R_{12}^T$ (28)

where $\underline{t}$ is the translation vector between the images indicated by the subscripts, and is given by Equation 17 above, and R is the rotation matrix defining the rotation between the images indicated by the subscripts, and is given by Equation 13 above.

At step S422, CPU 4 sets the value of a variable, P, to zero, and at step S424, reads the next triple of matched points from the list produced at step S218 (FIG. 22). At step S426, CPU 4 projects a ray from the point in the triple which lies in the first image of the triple through the optical centre of the camera in the first position, and from the point in the triple which lies in the third image of the triple through the optical centre of the camera in the third position.

FIG. 35 illustrates the projection of the rays at step S426.

At step S428, CPU 4 calculates the mid-point 68 (FIG. 35) along the line of closest approach of the rays projected from the first and third images, this line of closest approach being the line which is perpendicular to both the ray from the first image and the ray from the third image, as shown in FIG. 35. At step S430, CPU 4 projects the mid-point calculated at step S428 into the second image of the triple. That is, CPU 4 connects the mid-point 68 to the second image with a ray which passes through the optical centre of the camera for the second image. This produces a projected point 70 in the second image (FIG. 35).

At step S432, CPU 4 calculates the distance, "t", between the projected point 70 in the second image and the actual point 72 in the second image from the triple of points read at step S424. At step S434, CPU 4 determines whether the distance calculated at step S432 is less than a threshold, set at 3 pixels in this embodiment. The closer together the projected point 70 and the actual point 72 in the second image, the more closely this triple of points supports this value for the scale calculated at step S402 (FIG. 32). Accordingly, if the distance is below the threshold, the calculated scale is considered to be sufficiently accurate, and at step S436, CPU 4 increments the variable P representing the number of triple points for which the scale is accurate, notes the points in the triple under consideration as being accurate for the scale under consideration, and updates the total distance error (that is, the error for all the points so far for which the distance calculated at step S432 was deemed to be below the threshold at step S434) with the new distance calculated at step S432. The total error is calculated using the following equation:

$$\text{Total error} = \frac{\sqrt{\sum \frac{e_i^2}{P}}}{e_{th}} \tag{29}$$

where $e_i$ is the distance between the projected point 70 and the actual point 72 in the second image for the "i"th triple of points, this value being squared so that it is unsigned (thereby ensuring that only the magnitude of the distance between the projected point and the actual point is considered, rather than its direction, too), P being the total number of points, and $e_{th}$ being the distance threshold used for the comparison at step S434.

On the other hand, if it is determined at step S434 that the distance is not below the threshold, step S436 is omitted so that the variable P is not incremented.

At step S438, CPU 4 determines whether there is another triple of points in the list generated at step S218 (FIG. 22). Steps S424 to S438 are repeated until the processing described above has been carried out for all the triple points in the list. At this point, the value of the variable P then indicates the total number of triple points for which the calculated scale is sufficiently accurate.

Referring again to FIG. 32, after testing the scale at step S404 using the method just described, CPU 4 determines at step S406 whether the calculated scale is more accurate than any currently stored. This is done by comparing the number of points, P, and the total error stored at step S436 (FIG. 34) with the number of points and total error for the previously stored best scale so far. The most accurate scale is the one with the largest number of points or, if the number of points is the same, the one with the smallest total error. If the newly calculated scale is more accurate, then it, the number of points, P, and the total error are stored at step S408 to replace the previous most accurate scale, number of points, and total error. If it is not, then the previous most accurate scale, number of points, and total error are retained.

At step S410, CPU 4 determines whether the value of the counter incremented at step S392 is less than 20. If it is, at step S412, CPU 4 determines whether there is another triple of points in the list stored at step S218 (FIG. 22). Steps S392 to S412 are repeated until twenty triples of points have been used to calculate the scale (determined at step S410) or until all the triples of points in the list stored at step S218 (FIG. 22) have been used to calculate the scale (determined at step S412) if the number of triple points is less than 20. The value 20 has been found empirically to produce acceptable results for the scale calculation in a reasonable time.

Referring again to FIG. 30, after calculating at step S382 the best value of the scale for the value of $\rho 1$, $\rho 2$ under consideration, at step S384, CPU 4 determines whether the solution, that is, the values of $\rho 1$, $\rho 2$, s are more accurate than the solution currently stored. Thus, CPU 4 tests whether the latest values $\rho 1$, $\rho 2$, s calculated at steps S380 and S382 have produced more accurate camera transformations than values which were previously calculated at steps S380 and S382. This is done by comparing the number of points, P, stored for the current most accurate solution and stored for the latest solution at step S408 (FIG. 32) and step S436 (FIG. 34). The most accurate solution is the one with the highest number of points, or the one with the smallest total error if the number of points is the same. If the new solution is more accurate than the currently stored solution, then at step S386, CPU 4 replaces the currently stored solution with the new one. On the other hand, if the currently stored solution is more accurate, it is retained.

At step S388, CPU 4 determines whether there is a further value of ρ1, ρ2 to consider, and steps S380 to S388 are repeated until all values of ρ1, ρ2 have been processed as described above. Referring to FIG. 31 again, it will be seen from FIG. 31a that steps S380 to S388 will be performed sixty four times for the affine-affine case calculation at step S350 (FIG. 28). It would also be appreciated from FIG. 31b and FIG. 31c that steps S380 to S388 will be performed eight times for the affine-perspective case calculation at step S352 (FIG. 28) and eight times for the perspective-affine case calculation at step S354 (FIG. 28). Steps S380 to S388 will be performed only once for the perspective-perspective case calculation at step S356 (FIG. 28) since, as shown in FIG. 31d, only one value of ρ1, ρ2 is available for consideration at step S380.

Referring again to FIG. 28, having calculated respective solutions for the camera transformations for the affine-affine case at step S350, for the affine-perspective case at step S352, for the perspective-affine case at step S354, and for the perspective-perspective case at step S356, at step S358 CPU 4 selects the most accurate of these four solutions. This is again done by considering the total number of points, P, stored for each solution (step S386 in FIG. 30, step S408 in FIG. 32 and step S436 in FIG. 34). The most accurate solution is the one with the largest number of points (since this is the number of triples of points for which the solution is accurate). If solutions have the same number of points, then the total error for each solution is considered, and the solution with the smallest error is selected as the most accurate.

At step S360, CPU 4 determines whether the number of points, P, for the most accurate solution is less than four. This is the way in which CPU 4 performs steps S58 and S68 in FIG. 7 in which it determines whether the calculated camera transformations are sufficiently accurate. If the number of points, P, is less than four, then at step S362 CPU 4 determines that the calculated camera transformations are not sufficiently accurate. On the other hand, if the number of points, P, is equal to or greater than four, CPU 4 determines that the calculated camera transformations are sufficiently accurate and processing proceeds to step S364. In step S364, CPU 4 determines whether the number of points P for the most accurate solution is greater than 80% of all the triple points in the list stored at step S218 (FIG. 22). If the number of points is greater than 80%, then CPU 4 determines that there is no need to process the calculated camera transformations further to make them more accurate since they are already sufficiently accurate. Processing therefore proceeds to step S370, in which CPU 4 converts the solution to full camera rotation and translation matrices, defining the relative positions of the three images in the triple of images (including scale and ρ values).

If it is determined at step S364 that the number of points, P, is not greater than 80%, at step S366 CPU 4 determines whether the most accurate solution is that calculated for the perspective-perspective case. If it is, CPU 4 determines that the solution should not be optimised further and processing proceeds to step S370 where the solution is converted to full camera rotation and translation matrices. The solution for the perspective-perspective case is not optimised because the ρ values are considered accurate enough already (having being defined in the fundamental matrix calculated by CPU 4 at step S240 in FIG. 24). On the other hand, if the most accurate solution does not correspond to the perspective-perspective case, then, at step S368, CPU 4 minimises the following function, f(ρ), using a conventional optimisation method, such as Powell's method for optimisation described in "Numerical Recipes in "C" " by W. H. Press, S. A. Teukolsky, W. T. Vetterling and B. P. Flannery, 1992, pages 412–420, ISBN 0-521-43108-5:

$$f(\rho) = -P + \text{error} \tag{30}$$

where the function is evaluated using the same steps as steps S380, S382 and S386 in FIG. 30, P is the number of points stored for the solution (steps S386 in FIG. 30, S408 in FIG. 32 and S436 in FIG. 34) and the minus sign indicates that P is to be maximised, and "error" is the total error for the solution stored at step S436 (FIG. 34) and the positive sign indicates that this is to be minimised.

At step S370, CPU 4 converts the optimised solution calculated at step S368 (or the unmodified solution if the number of points is greater than 80% or if the solution corresponds to the perspective-perspective case) to full a camera rotation matrix and translation vector.

As described above with respect to FIG. 20, CPU 4 performs a different routine (step S204 in FIG. 20) to calculate the camera transformations for a triple of images if the first image in the triple is not the first image in the sequence of images.

FIG. 36 shows, at a top level, the operations performed by CPU 4 in step S204 (FIG. 20) when calculating the camera transformations in such a case.

When the first image in the triple is not the first image in the sequence, it is not necessary to calculate the camera transformation for the first pair of images in the triple since this will already have been calculated when that pair of images was considered previously in connection with the preceding triple of images (the pair forming the second pair of images for the preceding triple).

Referring to FIG. 36, at step S450, CPU 4 reads existing parameters for the first pair of images in the triple, and sets up new parameters for the new pair of images in the triple (the second pair).

FIG. 37 shows the operations performed by CPU 4 in step S450. Referring to FIG. 37, at step S460, CPU 4 reads the camera solution for the first pair of images in the triple previously calculated at step S212 in FIG. 21. At step S462, CPU 4 reads the pairs of matched points for the second pair of images in the triple which were identified at step S54, S60, S64 or S72 in FIG. 7. At step S464, CPU 4 generates a list of pairs of points which were matched in the second pair of images by a user at step S60 or step S72 in FIG. 7 ("user-identified" points), a list of pairs of points comprising the user-identified points together with pairs of points calculated to be matching in the first and second images at steps S54 or S64 in FIG. 7 (CPU 4 removing duplicate points from this list in the manner described above with respect to step S218 in FIG. 22), and a list of triple points, that is, points which are matched across all three images in the triple of images. (Note that step S54 or S64 may match a point in the third image of the triple with a point in second image of the triple which was previously matched with a point in the first image of the triple by constrained feature matching at step S74 in FIG. 7. In this case, the points identified by constrained feature matching will form part of a triple of points, which will be used in calculating the camera positions at step S404, and possibly step S394, if selected). As noted above with respect to step S218 in FIG. 22, the number of user-identified points may be zero if affine initial feature matching has not been performed.

At step S466, CPU 4 normalises the points in the lists created at step S464, and at step S468, sets up two measurement matrices; one for the list of user-identified points and one for the list of user-identified and calculated points. These steps are carried out in the same way as steps S220 and S222 in FIG. 22 described above, and accordingly will not be described again. At step S470, CPU 4 determines the number of iterations to be performed when carrying out the perspective and affine calculations for the second pair of images in the triple. This is performed in the same way as step S224 in FIG. 22 described above, and accordingly will not be described again.

Referring again to FIG. 36, having set up the necessary parameters at step S450, at step S452, CPU 4 calculates the camera transformation for the second pair of images in the triple and stores the results. This is carried out in the same way as step S208 or S210 in FIG. 21 described above, and accordingly will not be described again.

At step S454, CPU 4 uses the camera solutions for the first pair of images read at step S460 (FIG. 37) together with the camera transformation calculated at step S452 for the second pair of images in the triple to calculate camera transformations between all three images in the triple.

FIG. 38 shows the operations performed by CPU 4 when calculating the camera transformations between the three images in the triple at step S454 in FIG. 36. These operations are very similar to those performed in step S212 (FIG. 21), and described above with respect to FIG. 28, when calculating the camera transformations between the first three images in the positional sequence. As noted above, the relationship between the cameras for the first pair of images in the triple is already known from calculations on the preceding triple. It is therefore necessary to consider the transformation between only the second pair of images. Accordingly, at step S472, CPU 4 considers the case where the transformation between the second pair of images is affine. This is done by considering the camera solution for the first pair of images (read at step S450 in FIG. 36) together with the most accurate affine fundamental matrix calculated for the second pair of images in step S452 (FIG. 36), and calculating the scale, s, and ρ2 using the same operations described above with respect to step S354 in FIG. 28.

At step S474, CPU 4 considers the case where the transformation between the second pair of images is perspective. CPU 4 uses the calculation for the first pair of cameras read at step S460 (FIG. 37) together with the most accurate rotation matrix and translation vector for the cameras for the second pair of images obtained in step S452 (FIG. 36) to calculate the scale using the same operations as in step S356 (FIG. 28). In steps S476 to S488, CPU 4 carries out processing which is the same as that carried out at steps S358 to S370 in FIG. 28, described above. That is, CPU 4 selects the most accurate solution from the one calculated at step S472 and the one calculated at step S474, and determines whether this is sufficiently accurate or not, optimising it if necessary at step S486 (which corresponds to step S368 in FIG. 28) (it being noted that the solution is not optimised if it is determined at step S484 that the solution corresponds to the *-perspective case since the values of ρ are optimised and, in the perspective transformation for the second pair of images, ρ is already sufficiently accurate since it is defined in the calculated fundamental matrix, and the value of ρ for the first pair of images will either be defined in a fundamental matrix if the transformation is perspective or will already have been optimised at step S368 in FIG. 28 if the transformation is affine).

Referring again to FIG. 7, a description will now be given of the way in which CPU 4 performs constrained feature matching for a triple of images at step S74.

FIG. 39 shows, at a top level, the operations performed by CPU 4 when carrying out constrained feature matching.

Referring to FIG. 39, at step S500, CPU 4 considers "double" points in the first pair of images in the triple, that is points which have been matched between the first pair of images at step S52, S54, S60, S62, S64, S72 or S74 (steps S54, S64 and S74 being applicable if performed for a previous triple of images) in FIG. 7, but which have not been matched between the second and third images in the triple. For each pair of such "double" points, CPU 4 tries to identify the corresponding point in the third image. If it is successful, a triple of points, (that is, points matched across all three images) is created.

Similarly, at step S502, CPU 4 considers "double" points in the second and third images of a current triple (that is, points which have been matched across the second pair of images at step S54, S60, S64 or S72 in FIG. 7, but which have not been matched across the first pair of images in the triple) and tries to identify a corresponding point in the first image to create new triples of points.

FIG. 40 shows the operations performed by CPU 4 at step S500 and at step S502 in FIG. 39. Referring to FIG. 40, at step S504, CPU 4 considers the next point in the second (centre) image of the triple which forms a "double" point with the other image of the pair (the first image when performing step S500 or the third image when performing step S502) and uses the camera transformation calculated at step S56 or step S66 in FIG. 7 to identify a point in a corresponding location in the remaining image of the triple (the third image when performing step S500 or the first image when performing step S502).

At step S506, CPU 4 calculates a similarity measure between the point in the second image and points lying within a set number of pixels (in this embodiment, two pixels) on either side of the identified point in the remaining image in the x direction and within a set number of pixels (in this embodiment, two pixels) on either side of the identified point in the y direction. Thus, points within a square of five by five pixels are considered in the remaining image of the triple. CPU 4 calculates the similarity measure using an adaptive least squares correlation technique, for example such as that described in the paper "Adaptive Least Squares Correlation: A Powerful Image Matching Technique" by A. W. Gruen, Photogrammetry Remote Sensing and Cartography, 1985, pages 175–187 to identify a "best match" point.

At step S510, CPU 4 determines whether the similarity measure of the "best match" point identified at step S506 is greater than a threshold (in this embodiment 0.7). If the similarity measure is greater than the threshold, CPU 4 determines that the similarity between the point in the second image and the point in the remaining image of the triple is sufficiently high to consider the points to be matching points, and at step S512, forms a triple of points from the "double" points and the new point identified in the remaining image of the triple of images. On the other hand, if CPU 4 determines at step S510 that the similarity measure is not greater than the threshold, step S512 is omitted so that no triple of points is formed for the double of points under consideration.

At step S514, CPU 4 determines whether there is another double of points in the pair of images being considered. Steps S504 to S514 are repeated until all the double points for the pair of images being considered have been processed in the manner described above.

It will be appreciated from the above description that in carrying out constrained feature matching at step S74 in FIG. 7, CPU 4 generates new matches between points in the second and third images of a triple of images (step S500 in FIG. 39) and new matches between points in the first pair of images of the triple (step S502 in FIG. 39). These new matches are used by CPU 4 to generate the three-dimensional data at step S10 in FIG. 3, as will be described below. In addition, however, referring to FIG. 7, the new matches generated between points in the second pair of images in a triple are taken into account during subsequent initial feature matching for the next triple of images. This is because, as explained previously, when constrained feature matching is carried out at step S74 to identify new matches for the second pair of images in a triple, this pair of images becomes the first pair of images in the next triple of images considered, and both the automatic initial feature matching performed at step S54 and the affine initial feature matching performed at step S64 attempt to match points across the second pair of images in the triple which have previously been matched across the first pair of images. Although the new matches between points in the first pair of images calculated during constrained feature matching (step S502 in FIG. 39) are not taken into consideration when performing initial feature matching for the next triple of images, these new matches are taken into account when CPU 4 generates the three-dimensional data at step S10 in FIG. 3, as will be described below. When constrained feature matching is carried out at step S74 in FIG. 7 for the final three images in the sequence, there is no subsequent triple of images to be considered, and accordingly the new matches generated across the second pair of images in the triple are not taken into consideration during initial feature matching (since this operations is not performed again). However, these new matches are taken into consideration when generating the 3D data at step S10 in FIG. 3.

Referring again to FIG. 3, after performing initial feature matching (step S4), calculating the camera transformations (step S6), and performing constrained feature matching (step S8) in the manner described above, CPU 4 uses the results to generate 3D data at step S10. The aim of this process is to generate a single set of points in a three-dimensional space correctly positioned to represent points on the surface of the object 24.

FIG. 41 shows the operations performed by CPU 4 when generating the 3D data at step S10 in FIG. 3. Referring to FIG. 41 at step S520, CPU 4 considers each pair of images in the sequence in turn (in the example of FIGS. 2 and 5, the pairs comprising L1L3, L3L2, L2L4 and L4L5), and projects points within the pair which form either a user-identified "double" of points (that is, a pair of points matched between the pair of images by the user at step S60 or S72 in FIG. 7 but not matched with a point in the image immediately preceding or immediately following the pair of images) or part of a triple of points with a subsequent image (that is, points which are matched, either by a user or by CPU 4, between the images in the pair and between the second image in the pair and the subsequent image in the positional sequence) to calculate a single point in 3D space from each such pair of points. In step S520, CPU 4 considers only pairs of matched points which (i) were considered to be sufficiently accurate with the calculated camera transformation when this transformation was calculated at step S6 in FIG. 3, (ii) were identified as new matching points when constrained feature matching was performed at step S8, or (iii) formed an original pair of points extended from a pair to a triple during constrained feature matching at step S6 in FIG. 3. Thus, points matched during initial feature matching which were not considered to be sufficiently accurate with the calculated camera transformation are not considered by CPU 4 in step S520 (unless they were subsequently extended to a triple by constrained feature matching).

FIG. 42 shows the operations performed by CPU 4 when calculating the 3D points at step S520. Referring to FIG. 42, at step S530, CPU 4 considers the next pair of images in the sequence (the first pair when step S530 is performed for the first time). At step S532, CPU 4 projects from each point in the next pair of points in the pair of images considered at step S530 which is either a point from a user-identified "double" or a point from a triple of points, a line in three-dimensional space through the optical centre of the camera for that point. This produces rays similar to those shown in FIG. 35, with the exception that the rays are projected from adjacent images in FIG. 35 since the images are considered in pairs.

At step S534, CPU 4 calculates the mid-point of the line segment which connects, and is perpendicular to, both the lines projected in step S532 (this mid-point corresponding to the point 68 shown in FIG. 35, and representing a physical point on the surface of object 24). At step S536, CPU 4 determines whether a corresponding point has been matched in the next image of the sequence, that is, whether the points from which rays were projected in step S532 form part of the triple of points with the subsequent image. If it is determined that a corresponding point has been matched in the next image, CPU 4 projects a line from the matched point in the next image in the same way that it did from the points in step S532. At step S540, CPU 4 calculates the mid-point of the line segment which connects, and is perpendicular to the new line projected at step S538 and the line projected from the point in the previous image at step S532, in the same way that the mid-point is calculated in step S540.

At step S542, CPU 4 determines whether a corresponding point has been matched in the next image of the sequence. Steps S538 to S542 are repeated until the next image in the sequence does not contain a corresponding matched point or until all the images in the sequence have been processed.

By way of example, referring to a sequence of images containing five images, such as the example shown in FIG. 2 and FIG. 5, steps S532 and S534 will project a ray from a point in the first image and a matched point in the second image and calculate a single three-dimensional point (the mid-point in step S534) which represents the projection of the point in the first image and the point in the second image. Thus, a single point in three-dimensional space representing a physical point on the surface of object 24 is obtained from a pair of points between adjacent images in the sequence. If the third image in the sequence contains a point which is matched to those in the first and second images (determined at step S536), steps S538 and S540 project a line from the point in the third image and calculate the mid-point of the line segment which connects, and is perpendicular to, the line from the point in the second image and the line from the point in the third image, this mid-point representing the 3D point resulting from the projection of the points in the second image and third image. Similarly, if the fourth image in the sequence has a point matched to that in the third image (determined at step S542), steps S538 and S540 are repeated to project a line from the point in the fourth image and calculate the mid-point of a line segment which connects, and is perpendicular to, the line from the fourth image and the line from the third image. A further 3D point representing the projection of points from the fourth and fifth images in the sequence will be obtained by step S538 and S540 if it is determined at step S542 that a corresponding point has been matched in the fifth image of the sequence. Thus, if the point is matched in all five images of the sequence, four 3D points are produced (representing the same physical point on the surface of object 24), although it is unlikely that the 3D position of these will be exactly coincident due to errors in the calculated camera transformations and the matches themselves. Instead, the points form a cluster 80 in 3D space, as shown in FIG. 43.

Referring again to FIG. 42, at step S544, CPU 4 determines whether there is another pair of points not previously considered in the current pair of images which form a user-identified "double" of points across the pair of images or form part of a triple of points with a subsequent image. Steps S532 to S544 are repeated until all such points have been considered. Each such pair of points produces either a single point 82 in 3D space (FIG. 43) if it is determined at step S536 that a corresponding point has not been matched in the next image or a cluster of points if the corresponding point has been matched in at least the next image. If the point is matched across three successive images in the sequence, the cluster contains two points, if it is matched across four successive images in the sequence it contains three points, and, as described above, if it is matched across five images in the sequence, the cluster comprises four points as shown in cluster 80 of FIG. 43.

At step S546, CPU 4 considers whether there is another pair of images in the sequence. Steps S532 to S546 are repeated until all pairs of images in the sequence have been processed as described above. The result is a plurality of clusters of points in three-dimensional space as shown in FIG. 43, with the points within each cluster corresponding to what should be a single 3D point (this representing a point on the surface of object 24).

Referring again to FIG. 41, at step S522, CPU 4 uses the 3D points calculated at step S520 to calculate the error in the transformation previously calculated for each camera, and to identify and discard inaccurate ones of the 3D points.

FIGS. 44(A,B) shows the operations performed by CPU 4 at step S522 in FIG. 41. Referring to FIG. 44, at step S550, CPU 4 considers all of the points in three-dimensional space calculated at step S520 (FIG. 41) and calculates the standard deviation of the x co-ordinates, $\Delta x$, the standard deviation of the y co-ordinates, $\Delta y$, and the standard deviation of the z co-ordinates, $\Delta z$. At step S552, CPU 4 calculates the "size" of the object made up of the points in the three-dimensional space using the formula:

$$\text{Size} = (\Delta x^2 + \Delta y^2 + \Delta z^2)^{1/2} \tag{31}$$

At steps S554 to S562, CPU 4 identifies, and discards, inaccurate points in the three-dimensional space produced from a given pair of images. At steps S564 to S568, CPU 4 uses the remaining points, that is, the points remaining after inaccurate points have been discarded, to calculate the camera error for the subsequent pair of camera positions. These operations will now be described in more detail.

At step S554, CPU 4 considers the next pair of camera positions (this being the first pair of camera positions the first time the step is performed), considers the next point in the 3D co-ordinate system calculated at step S520 which originated from part of a triple of points with a subsequent image, and calculates the vector shift between this 3D point and the corresponding point in the 3D space which was previously calculated for the subsequent pair of camera positions at step S520 (FIG. 41). This is illustrated in FIG. 45a. Referring to FIG. 45a, the cluster of points 90 in the three-dimensional space comprises four points calculated at step S520 (FIG. 41), the points corresponding to a single point on the surface of the actual object 24 as described above. Point 92, labelled #1, is the point generated from the first pair of camera positions (images) at step S534 (FIG. 42), and point 96, labelled #2, is the point generated from the second pair of camera positions (images) at step S540 (FIG. 42). Similarly, the point #3 is the point generated from the third pair of camera positions at step S540 and the point #4 is the point generated from the fourth pair of camera positions at step S540. Each of these points is represented by a dot in FIG. 45a. The shift calculated at step S554 between the point 92 for the first pair of camera positions and the corresponding point 96 previously calculated for the subsequent (second) pair of camera positions is shown in FIG. 45a. This shift represents the error in the second pair of camera positions for this pair of points and is therefore labelled "SHIFT 2". the errors for the third pair of camera positions (SHIFT 3) and for the fourth pair of camera positions (SHIFT 4), which will be calculated when subsequent pairs of camera positions are considered at step S554, are also shown in FIG. 45a for the illustrated cluster of points.

Referring again to FIG. 44, at step S558, CPU 4 determines whether the magnitude of the shift calculated at step S554 is greater than 10% of the object size calculated at step S552. If it is, the point under consideration for the current pair of camera positions and the corresponding point for the subsequent pair of camera positions are considered to be inaccurate, and are therefore discarded at step S560. Referrin again to FIG. 45a, if it is determined at step S558 FIGS. 44(A–B) that the magnitude of the SHIFT 2 is greater than 10% of the object size, then points 92 and 96 would be discarded. On the other hand, if it is determined at step S558 that the magnitude of the shift is not greater than 10% of the object size, the points are considered to be sufficiently accurate, and are therefore retained. Although, as noted above, 3D points are not generated at step S520 (FIG. 41) from pairs of points which were not considered to be accurate with the calculated camera transformation, 3D points are generated at step S520 from new matches identified during constrained feature matching. Accordingly, the processing performed by CPU 4 in steps S554 to S560 in FIG. 44 ensures that the accuracy of the 3D points generated from the new matches identified during constrained feature matching is tested (and hence that the new matches themselves are tested).

Referring again to FIGS. 44(A–B) at step S562, CPU 4 determines whether there is another point in the three-dimensional space calculated at step S520 (FIG. 41) for the current pair of camera positions which originated from points which formed part of a triple with a subsequent image. Steps S554 to S562 are repeated until all such points have been processed as described above. FIG. 45b illustrates the situation when this processing is complete for the first pair of camera positions. For each cluster of points, the shift between the 3D point produced from points in the first pair of images and the corresponding point produced using points in the subsequent pair of images will have been calculated. If any shift is greater than 10% of the object size, then the point for the current (first) pair of camera positions and the point for the subsequent (second) pair of camera positions will have been discarded. It will be seen from FIG.

45b that no shift is calculated for single points in the three-dimensional space, that is, points which do not form part of a cluster. This is because these points were derived at step S520 (FIG. 41) from pairs of points matched across only two successive images, and hence it is not possible to calculate a shift since no point exists in the three-dimensional space which was derived from the corresponding point matched in the successive image of the sequence.

Referring again to FIGS. 44(A,B) at step S564, CPU 4 calculates the net of all the shifts between the points for the current pair of camera positions and the points for the subsequent pair of camera positions (although any shift greater than 10% of the object size (determined at step S558) is not considered). This gives an error rotation matrix and an error translation vector for the subsequent pair of camera positions. The net of the shifts is calculated in a conventional manner, for example using Horn's method of quaternions, described in "Closed-Form Solution of Absolute Orientation using Unit Quaternions" by B. K. P. Horn in Journal of the Optical Society of America, 4(4): 629–649, April 1987. In summary, the rotation matrix, R, and translation vector, $\underline{t}$, which most accurately maps the points for the subsequent pair of camera positions to the corresponding points for the current pair of camera positions is calculated. If $P_c$ is a point for the current pair of camera positions, $P_n$ is the corresponding point for the next pair of camera positions, and $P_n'$ is the re-mapped version of $P_n$, then:

$$P'_n = RP_n + \underline{t} \tag{32}$$

The sum is minimised over all common points of the modules of the dot product $(P_n'-P_c)^T \cdot (P_n'-P_c)$.

At step S566, CPU 4 applies the error rotation matrix and the error translation vector calculated at step S564 to each point previously calculated for the subsequent pair of camera positions (#2 in FIG. 45b). For each previously calculated point, this gives a corrected point ($P_n'$ given by Equation 32 above) which is now positioned closer to the point for the current pair of camera positions, as shown in FIG. 46, in which the points for the current pair of camera positions are represented by dots as before, and the corrected points for the subsequent pair of camera positions are represented by crosses.

At step S568, CPU 4 calculates the difference between the co-ordinates of each corrected 3D point calculated at step S566 and its corresponding point, and calculates the co-variance matrix of the resulting differences, this being performed using conventional mathematical techniques. The resulting co-variance matrix comprises a Gaussian distribution in three dimensions, which represents a three-dimensional error ellipsoid for the error transform calculated at step S564. Thus, in steps S564 to S568, CPU 4 has calculated an error transform for the subsequent pair of camera positions and the error (the error ellipsoid) associated with the error transform.

At step S570, CPU 4 determines whether there is another pair of camera positions which has not yet been considered. Steps S554 to S570 are repeated until the data for all pairs of camera positions has been processed in the manner described above.

It will be appreciated that an error transform is not calculated at step S564 for the first pair of camera positions in the sequence. This pair of camera positions is assumed to have zero error. It will also be appreciated that the error transform for a given pair of camera positions is calculated relative to the previous pair of camera positions. Thus, the error transform for the second pair of camera positions (that is, producing the second and third images in a sequence) includes no cumulative error since the error for the first pair of camera positions is assumed to be zero. On the other hand, the error transform for each subsequent pair of camera positions will include cumulative error. For example, the error transform for the third pair of camera positions (that is, the positions producing the third and fourth images in the sequence) is calculated relative to the error transform for the second pair of camera positions. Accordingly, the calculated error transform and co-variance matrix for the third pair of camera positions needs to be adjusted by the error transform and co-variance matrix for the second pair of camera positions to give a total, cumulative error for the third pair of camera positions. Similarly, the calculated error transform and co-variance matrix for the fourth pair of camera positions (producing the fourth and fifth images in the sequence) needs to be adjusted by the error transform and co-variance matrix for both the second pair of camera positions and the third pair of camera positions (that is, the cumulative error for the third pair of camera positions) to give a total, cumulative error for the fourth pair of camera positions.

This is carried out by CPU 4 at step S572 as follows:

$$R'_i = R'_{i-1} R_i \tag{33}$$

$$t'_i = R_i t'_{i-1} + t_i \tag{34}$$

$$C'_i = \sum_{n=1-i} C_n \tag{35}$$

where $R_i'$ is the rotation matrix for the ith cumulative error transform, $R_i$ is the rotation matrix for the ith individual error transform, $t_i'$ is the translation vector for the ith cumulative error transform, $t_i$ is the translation vector for the ith individual error transform, $C_i'$ is the covariance matrix for the ith cumulative error transform, and $C_n$ is the covariance matrix for the nth individual error transform.

Referring again to FIG. 41, after calculating the error for each pair of camera positions at step S522, at step S524, CPU 4 adjusts the co-ordinates of each remaining point in the three-dimensional space (that is, the points calculated at step S520 less those discarded at step S560 in FIGS. 44(A,B)) by the appropriate camera position error. This is done by applying the cumulative error transform (calculated previously at step S572 in FIGS. 44(A,B)) to the point position and adding the appropriate error ellipsoid (also previously calculated at step S572 in FIGS. 44(A,B) to the point. For example, points produced at step S520 from the first pair of images in the sequence are not adjusted at step S524 since, as described above, it is assumed that the camera position error is zero for this pair of images. The points produced at steps S520 using the second and third images in the sequence are moved by the error transform calculated for the second pair of camera positions, and the co-variance matrix calculated for the second pair of camera positions is added to the moved points. The points produced at step S520 from the third and fourth images in the sequence are moved by the cumulative error transform calculated at step S572 in FIG. 44 for the third pair of camera positions, and the cumulative co-variance matrix calculated at step S572 for the third pair of camera positions is added to the moved points. The points calculated at step S520 using the fourth and fifth images in the sequence are moved by the cumulative error transform calculated at step S572 for the fourth pair of camera positions, and the cumulative co-variance matrix calculated at step S572 for the fourth pair of camera positions is added to the moved points.

At step S526, CPU 4 combines points in the three-dimensional space which relate to a common point on the actual object 24. That is, the points within each individual cluster are combined to produce a combined point, whose position is dependent on the positions of the points in the cluster, with an error ellipsoid dependent upon the error ellipsoids of the points in the cluster. The error ellipsoids are Gaussian probability density functions in 3D space, representing independent measurements of the same 3D point's position. Since they are independent, the individual measurements are combined in this step by multiplying the Gaussian probability density functions together in a conventional manner, to give a combined Gaussian probability density function or error ellipsoid.

It may be the case that the points created at step S526 do not actually relate to unique points on object 24. For example, as shown in FIG. 47, the error ellipsoids for points 100, 102 and 104 actually overlap, and accordingly these points may relate to the same point on object 24. Consequently, at step S528, CPU 4 checks whether the combined points produced at step S526 correspond to unique image points on object 24, and merges ones that do not.

FIG. 48 shows the operations performed by CPU 4 in step S528. Referring to FIG. 48, at step S580, CPU 4 sorts the points produced at step S526 (FIG. 41) in terms of the volume of their error ellipsoids (that is, the combined error ellipsoids produced at step S526), the point with the smallest error ellipsoid being placed at the top of the list.

At step S582, CPU 4 compares the next highest point in the list (this being the highest point the first time step S582 is performed) with all subsequent points in the list by identifying all subsequent points for which the current point lies within the 3D equivalent (the Mahalanobis distance) of one standard deviation from the subsequent point (as determined from the error ellipsoid of the subsequent point).

At step S584, the highest point under consideration is combined with every point lower in the list for which the distance between the points is less than the Mahalanobis distance of the error ellipsoid of the lower point. This is carried out by combining all of the points to produce a single, combined point, in the same way that the points were combined in step S526, using conventional mathematical techniques. The highest point under consideration is then replaced in the list produced at step S580 with the combined point, and all of the lower points in the list which were used to create the combined point are removed from the list.

At step S586, CPU 4 determines whether there is another point in the list not yet considered. Steps S582 to S586 are repeated until all of the points in the list have been processed in the way described above.

Referring again to FIG. 41, after performing steps S520 to S528, CPU 4 has produced a plurality of points in three-dimensional space, each of which relates to a point on the surface of the object 24.

Referring again to FIG. 3, at step S12, CPU 4 processes the points to generate surfaces, representing the surfaces of object 24.

FIG. 49 shows the operations performed by CPU 4 when generating the surfaces at step S12 in FIG. 3. Referring to FIG. 49, at step S590, CPU 4 performs a Delaunay triangulation of the points in the three-dimensional space in a conventional manner, for example as described in "Three-Dimensional Computer Vision", by Faugeras, Chapter 10, MIT Press, ISBN 0-262-06158-9. This operation interconnects the points to form a plurality of flat, triangular surfaces. However, many of the inter-connections between the points are made through the inside of the object 24, generating surfaces in the interior of the object 24 which cannot be seen from the exterior. In addition, it may also generate spurious surfaces across concave regions of the object 24, thereby obscuring the actual concave surfaces. Accordingly, at steps S592 to S600, CPU 4 processes the data to remove these "hidden" and "spurious" surfaces.

At step S592, CPU 4 considers the next camera in the sequence (this being the first camera the first time step S592 is performed), and at step S594 projects a ray from the camera to the next 3D point (the first 3D point the first time step S594 is performed) which can be seen by that camera, that is, the next point in the three-dimensional space which originated from a point matched in the image data for that camera. When projecting the ray between the camera and the 3D point, CPU 4 stops the ray at the nearest point at which it intersects the error ellipsoid of the point. At step S596, CPU 4 determines whether the ray intersects any of the surfaces produced at step S590, using a conventional technique, for example such as that described in Chapter 7 of "Graphics Gems" by A. Glassner, Academic Press Professional, 1990, ISBN 0-12-286166-3. Clearly, there should be no surface between the point and the camera, otherwise the camera would not be able to see the point. Accordingly, any surface intersected by the ray is removed at step S596. At step S598, CPU 4 determines whether there is another point in the three-dimensional space which can be seen by the camera. Steps S594 to S598 are repeated until all the points have been processed in the manner described above. At step S600, CPU 4 determines whether there is another camera in the sequence. Steps S592 to S600 are repeated until all of cameras have been considered to remove surfaces as described above.

In the processing described above, at step S594, CPU 4 projects the ray from a camera to the edge of the error ellipsoid for a point (rather than to the point itself) and considers whether the ray intersects any surface. This provides the advantage that the positional error for a point is taken into account. For example, if the ray was projected all the way to a point, a surface lying between the point and the edge of its error ellipsoid nearest to the camera would be intersected by the ray and hence removed. However this may produce an inaccurate result since the 3D point could actually lie anywhere in its error ellipsoid and could therefore be in front of the surface. The processing in the present embodiment takes account of this.

At step S602, CPU 4 considers the remaining triangular surfaces, and removes any which does not have a surface touching free space (this corresponding to a surface which is enclosed within the interior of the object). This is performed using a conventional technique, for example as described in "Three-Dimensional Computer Vision" by Faugeras at Chapter 10, MIT Press, ISBN 0-262-06158-9.

After performing steps S590 to S602, CPU 4 has produced a plurality of surfaces in a three-dimensional space representing the object 24. At steps S604 to S610, CPU 4 determines the texture to be displayed on each triangular surface.

At step S604, CPU 4 calculates the normal to the next remaining triangle (this being the first remaining triangle the first time step S604 is performed). At step S606, CPU 4 calculates the dot product between the normal calculated at step S604 and the optical axis of each camera to identify the camera which viewed the triangle closest to normal (this being the camera having the smallest angle between its optical axis and the normal to the surface). At step S608, CPU 4 reads the data for the camera identified in step S606 (previously stored at step S18 in FIG. 4) and reads the image data lying between the vertices of the triangle to determine the texture for the triangle. At step S610, CPU 4 determines whether there is another remaining triangle for which the texture is to be determined. Steps S604 to S610 are repeated until the texture has been determined for all triangles.

Referring again to FIG. 3, in this embodiment, after generating the surfaces representing the object at step S12, CPU 4 displays the surfaces at step S14. This is performed in a conventional manner, for example as described in "Computer Graphics Principle and Practice" by Foley, van Dam, Feiner & Hughes, Second Edition, Addison-Wesley Publishing Company Inc., ISBN 0-201-12110-7. This process is summarised below.

FIG. 50 shows the operations performed by CPU 4 is displaying the surface data at step S14. Referring to FIG. 50, at step S620, CPU 4 calculates the lighting parameters for the object, that is the data defining how the object is to be lit. This data may be input by a user using the input device 14, or, alternatively, default lighting parameters may be used. At step S622, the direction from which the object is to be viewed is defined by the user using input device 14.

At step S624, the vertices defining the planar triangular surfaces of the object are transformed from the object space in which they are defined into a modelling space in which the light sources are defined. At step S626, the triangular surfaces are lit by processing the data relating to the position of the light sources and the texture data for each triangular surface (previously determined at step S608). Thereafter, at step S628, the modelling space is transformed into a viewing space in dependence upon the viewing directed selected at step S622. This transformation identifies a particular field of view, which will usually cover less than the whole modelling space. Accordingly, at step S630, CPU 4 performs a clipping process to remove surfaces, or parts thereof, which fall outside the field of view.

Up to this stage, the object data processed by the CPU 4 defines three-dimensional co-ordinate locations. At step S632, the vertices of the triangular surfaces are projected to define a two-dimensional image.

After projecting the image into two dimensions, it is necessary to identify the triangular surfaces which are "front-facing", that is facing the viewer, and those which are "back-facing", that is cannot be seen by the viewer. Therefore, at step S634, back-facing surfaces are identified and culled. Thus, after step S634, vertices are defined in two dimensions identifying the triangular surfaces of visible polygons.

At step S636, the two-dimensional data defining the surfaces is scan-converted by CPU 4 to produce pixel values, taking into account the data defining the texture of each surface previously determined at step S608 in FIG. 49.

At step S638, the pixel values generated at step S636 are written to the frame buffer on a surface-by-surface basis, thereby generating data for a complete two-dimensional image.

At step S640, CPU 4 generates a signal defining the pixel values. The signal is used to generate an image of the object on display unit 18 and/or is recorded, for example on a video tape in video tape recorder 20. The signal may also be transmitted to a remote receiver for display or recording.

Various modifications are possible to the embodiment described so far.

In the embodiment above, as described with reference to FIG. 2, camera 12 is moved to different positions about object 24 in order to record the images of the object. Instead, camera 12 may be maintained in a fixed position and object 24 moved relative thereto. Of course, the positions of the camera 12 and the object 24 may both be moved to record the images.

Camera 12 may be a video camera recording a continuous sequence of images of the object 24. Image data for processing by CPU 4 may be obtained by selecting frames of image data from the video sequence.

In the embodiment above, when arranging the positional sequence of the images at steps S22 and S24 in FIG. 4, the user moves the images on the display to the correct positions in the sequence (as described with respect to FIG. 5), and CPU 4 calculates the distance between the images to determine their positions in the sequence. Instead, the user may assign a number to each image defining its position in the sequence. For convenience, CPU 4 may redisplay the images to the user in accordance with the allocated numbering.

When describing the embodiment above, an example was used in which five images of object 24 were processed to produce the 3D model. Of course, other numbers of images may be processed.

Different initial feature matching techniques may be used to the ones described above which are performed at steps S52, S54, S62 and S64 in FIG. 7. For example, the initial feature matching technique performed at steps S52 and S54, which is based on detecting corners in the images, may be replaced by a technique in which minimum, maximum, or saddle points in the colour or intensity values of the image data are detected. For example, techniques described in "Computer and Robot Vision Volume 1" by Haralick & Shapiro, Chapter 8, Addison-Wesley Publishing Company, ISBN 0-201-10877-1 (V.1) for detecting such points may be employed. The detected points may be matched using an adaptive least square correlation as described previously. An initial feature matching technique may also be employed which detects and matches all of the types of points referred to above, that is, corner points, minimum points, maximum points and saddle points.

The embodiment above identifies edges in an image at step S106 and step S108 using edge magnitude and edge direction values of pixels. Instead, edges could be identified using only pixel edge magnitude values or pixel edge direction values.

In the embodiment above, when performing affine initial feature matching at steps S62 and S64 in FIG. 7, CPU 4 calculates the relationship between parts of a pair of images by triangulating user-identified points in each image of the pair and using the coordinates of each vertex of corresponding triangles to calculate the relationship between the parts of the images contained within the triangles. As a modification, instead of using just user-identified points, CPU 4 can be arranged to connect both user-identified and CPU-identified points to create the triangles, or to use CPU-identified points (e.g. corner points) alone.

In the embodiment above, when performing af fine initial feature matching, at step S162 CPU 4 uses a grid of horizontal and vertical lines to divide the image into squares. However, the image may be uniformly divided into smaller regions in other ways. For example a grid which divides the image into rectangles may be used. Also, a grid having non-horizontal and non-vertical lines may be used.

When calculating the camera transformations at steps S56 and S66 in the embodiment above, CPU 4 carries out the perspective calculation twice (FIG. 25)—once using user-identified points alone (steps S246 to S262) and one using both user-identified and CPU-calculated points (steps S266 to S282). Similarly, CPU 4 carries out the affine calculation twice (FIG. 27) twice—once using user-identified points alone (steps S312 to S327) and once using both user-identified and CPU-calculated points (steps S330 to S345).

As a modification, CPU 4 can be arranged to perform each perspective calculation and each affine calculation twice as follows:

once using user-identified points alone and once using CPU-calculated points alone; or once using CPU-calculated points alone, and once using both user-identified and CPU-calculated points.

Each perspective and each affine calculation could also be performed three times; once with user-identified points, once with CPU-calculated points, and once with both user-identified and CPU-calculated points.

In the embodiment described, when calculating the perspective camera transformation at step S240, CPU 4 tests the physical fundamental matrix (steps S253, S255, S273 and S275 in FIG. 25). Instead, another physically realisable matrix (such as the physical essential matrix $E_{phys}$) may be tested.

When performing constrained feature matching in the embodiment above (step S74 in FIG. 7) in steps S500 and S502 (FIG. 39) "double" points (that is, points matched across a pair of images in the triple) are considered and processing is carried out to try to identify a corresponding point in the other image of the triple so that a "triple" of points (that is, points matched across three images) can be formed. It is also possible to consider "single" points, that is, points which have been identified in one of the images of the triple, but for which no matching point has previously been found in either of the other images, and to carry out processing to try to identify a corresponding point in each of the other two images of the triple. For example, taking a "single" point from the first image of a triple, a point at the corresponding position in the second image can be identified using the camera transformations previously calculated at step S56 or step S66 in FIG. 7. An adaptive least squares correlation technique, such as the one described in the previously referenced paper "Adaptive Least Squares Correlation: A Powerful Image Matching Technique" by A. W. Gruen, Photogrammetry Remote Sensing and Cartography, 1985, pages 175–187, may be used to determine a similarity measure for pixels in the vicinity of the corresponding point in the second image, and the highest similarity measure can be compared against a threshold to determine whether the pixel having that similarity measure matches the point of the first image. If a match is found, similar processing can be carried out to determine whether a match can be found with a point in the third image, thereby identifying a triple of points.

In the embodiments described above, when performing affine initial feature matching on a pair of images at step S62 or S64 in FIG. 7, CPU 4 considers points in the first image of the pair which have been matched with points in the preceding image in the sequence but which have not yet been matched with a point in the second image of the pair, and performs processing to try to match such points with points in the second image of the pair (steps S166 to S176 in FIG. 18). Thus, CPU 4 performs processing to "propagate" matched points through the sequence of images from a current image to a succeeding image in the sequence. It is also possible to perform such processing to "propagate" points in the opposite direction, that is, from a current image to a preceding image in the sequence. For example, the images in the sequence could be considered in reverse order, that is, starting with the final image in sequence (the image taken at position L5 in the example of FIG. 2), and the data processed in a similar manner to that already described. Processing can also be performed to "propagate" points in both directions, this being likely to provide more matches between points than when processing is performed to "propagate" points in a single direction. This, in turn, may enable more accurate camera transformations to be calculated at step S66 in FIG. 7.

In the embodiment above, when CPU 4 performs constrained feature matching at step S74 in FIG. 7, new matches between points in the second and third images of a triple of images may be identified at step S500 in FIG. 39. As explained previously, these points are considered in subsequent processing since the pair of images across which the new points are matched becomes the first pair of images in the next triple of images considered. Thus, when automatic initial feature matching or affine initial feature matching for the second pair of images in the next triple is performed at step S54 or step S64, the new matched points from the constrained feature matching may be used to identify matching points in the third image of the triple, as described above. On the other hand, in the embodiment above, the new matches generated at step S502 in FIG. 39 between points in the first and second images of a triple when CPU 4 performs constrained feature matching are not considered in any subsequent initial feature matching operations. This is because the new matches are across the first pair of images in the triple, and this pair is not considered further in subsequent initial feature matching processing. The new matches are, however, taken into account when CPU 4 generates the 3D data at step S10 (FIG. 3) since the newly matched points form part of a "triple" points. As a modification, it is possible to perform additional processing to recalculate the camera transformations taking into account any new matches identified during constrained feature matching. This would produce two solutions for the camera transformations for each triple of images: the first being produced in the manner described above with respect to FIG. 7, and the second being produced by the additional processing to take into account the new matches. The most accurate solution between the two may then be selected.

In the embodiment described, in steps S52, S54, S60, S62, S64, S72 and S74 points (corner points, minimum points, maximum points, saddle points etc.) are matched in the images. However, it is possible to identify and match other "features", for example lines etc.

At step S528 in the embodiment above, CPU 4 merges points if they lie within one standard deviation of each other. However, it is possible to delete one of the points instead of combining them.

In the embodiment described, having generated the surfaces at step S12 in FIG. 3, CPU 4 performs processing to display the surface data at step 14. Alternatively, or in addition, instead of displaying the surface data at step S14, CPU 4 may: control manufacturing equipment to manufacture a model of the object 24, for example by controlling cutting apparatus to cut material to the appropriate dimensions; perform processing to recognise the object, for example by comparing it to data stored in a database; carry out processing to measure the object, for example by taking absolute measurements to record the size of the object, or by comparing the model with models of the object previously generated to determine changes therebetween; carry out processing so as to control a robot to navigate around the object; transmit the object data representing the model to a remote processing device for such processing (for example, CPU 4 may transmit the object data in VRML format over the Internet, enabling it to be processed by a WWW browser). Of course, the object data may be utilised in other ways.

The techniques described above can be used in terrain mapping and surveying, with the three-dimensional data being input to a geographic information system (GIS) or other topographic database for example.

Many other embodiments of the invention are possible.

In image data compression, for example, data from regions of an image having the same visual characteristics can be compressed for storage or transmission. Such a technique is described, for example, in "A Pyramidal Data Structure for Triangle-Based Surface Description" by L. De. Floriani in IEEE Comput. Graphics Appl. March 1989. Suitable regions in an image can be determined on the basis of edges in the image, since edges will often represent the boundaries between regions of different visual characteristics. The edges can be identified and processed to remove cross-overs, and the end-points connected to segment the image, as described above with respect to steps S100 and S102 in the first embodiment.

By way of a further example, in one known object recognition method, an input image is segmented into regions, and a low-dimension image characteristic for each region is determined. Such a low-dimension characteristic may, for example, be the ratio of red-to-green-to-blue for each region. The low-dimension characteristics for all regions in the input image are then combined to give what is known as a "hash-key" for the image. This hash-key is then used to identify images from a database having similar hash-keys. The best-matching image from the similar images identified can then be determined in a conventional manner (for example by considering each similar database image in turn, considering each region in the input image and finding the region in the database image which has the closest low-dimension characteristic to that of the region in the input image, transforming the region in the input image onto the closest region in the database image, using the difference to give a similarity measure for the two regions, and adding the similarity measure for all regions to give an overall match score, the database image with the highest overall match score then being selected as the best-matching image). In such an image recognition technique, regions of the input image can be determined on the basis of edges in the image, since an edge will often represent the boundary between regions of different visual characteristics. The edges can be identified and processed to remove cross-overs, and the end points connected to segment the image, as described above with respect to step S100 and S102 in the first embodiment.

Other embodiments are, of course, possible.

What is claimed is:

1. In an image processing apparatus having a processor for processing first input signals defining an image of an object and second input signals defining a plurality of points in the image, a method of processing the input signals to produce signals defining segments of the image, the method comprising:

determining whether an edge exists between each pair of points, together with an edge strength for each edge identified; and connecting the points in dependence upon the edge strengths to form triangles, with any three points which have therebetween two edges each of which has a strength greater than a predetermined threshold being connected to form a triangle.

2. A method according to claim 1, wherein connections are made between the other points in order of increasing connection length.

3. A method according to claim 1, wherein the points defined by the second input signals comprise points matched with points in another image.

4. A method according to claim 1, wherein the points defined by the second input signals comprise corner points.

5. In an image processing apparatus having a processor for processing input signals defining first and second images of an object, a method of processing the input signals to produce signals defining segments of at least one of the images, the method comprising:

processing the input signals to identify matching points in the images;

determining a strength of any edges between identified points in at least one of the images; and connecting the points in at least one of the images in dependence upon the edge strengths.

6. A method according to claim 5, wherein a strength of any edges between identified points in the first image is determined, a strength of any edges between identified points in the second image is determined, a combined strength measure is calculated for corresponding edges in the first and second images and the points in the at least one image are connected in dependence upon the combined strength measure.

7. A method according to claim 6, wherein the combined strength measure for corresponding edges is determined by calculating a mean of the strength of the edge in the first image and the strength of the corresponding edge in the second image.

8. In an image processing apparatus having a processor for processing first input signals defining an image of an object and second input signals defining a plurality of points in the image, a method of processing the input signals comprising:

determining whether an edge exists between each pair of points, together with an edge strength for each edge identified;

connecting the points in dependence upon the edge strengths to define segments of the image;

processing the segments to generate image data; and displaying an image using the generated image data.

9. A method according to claim 8, wherein the generated image data comprises compressed image data.

10. An image processing apparatus for processing first input signals defining an image of an object and second input signals defining a plurality of points in the image, to produce signals defining segments of the image, comprising:

an edge processor for determining whether an edge exists between each pair of points, together with an edge strength for each edge identified; and an image segmenter for connecting the points in dependence upon the edge strengths to form triangles, with any three points which have therebetween two edges each of which has a strength greater than a predetermined threshold being connected to form a triangle.

11. Apparatus according to claim 10, wherein the image segmenter is arranged to make connections between other points in order of increasing connection length.

12. Apparatus according to claim 10, wherein the points defined by the second input signals comprise points matched with points in another image.

13. Apparatus according to claim 10, wherein the points defined by the second input signals comprise corner points.

14. An image processing apparatus for processing input signals defining first and second images of an object to produce signals defining segments of at least one of the images, the apparatus comprising:

a point matcher for processing the input signals to identify matching points in the images;

a strength calculator for determining a strength of any edges between identified points in at least one of the images; and an image segmenter for connecting the points in at least one of the images in dependence upon the edge strengths.

15. Apparatus according to claim 14, wherein the apparatus is arranged to determine a strength of any edges between identified points in the first image, to determine a strength of any edges between identified points in the second image, to calculate a combined strength measure for corresponding edges in the first and second images and to connect the points in the at least one image in dependence upon the combined strength measure.

16. Apparatus according to claim 15, wherein the apparatus is arranged to determine the combined strength measure for corresponding edges by calculating a mean of the strength of the edge in the first image and the strength of the corresponding edge in the second image.

17. An image processing apparatus for processing first input signals defining an image of an object and second input signals defining a plurality of points in the image, the apparatus comprising:

an edge processor for determining whether an edge exists between each pair of points, together with an edge strength for each edge identified;

an image segmenter for connecting the points in dependence upon the edge strengths to define segments of the image;

an image data generator to generate image data by processing the segments; and a display to display an image using the generated image data.

18. Apparatus according to claim 17, wherein the generated image data comprises compressed image data.

19. An image processing apparatus for processing first input signals defining an image of an object and second input signals defining a plurality of points in the image, to produce signals defining segments of the image, comprising:

means for determining whether an edge exists between each pair of points, together with an edge strength for each edge identified; and means for connecting the points in dependence upon the edge strengths to form triangles, with any three points which have therebetween two edges each of which has a strength greater than a predetermined threshold being connected to form a triangle.

20. An image processing apparatus for processing input signals defining first and second images of an object to produce signals defining segments of at least one of the images, the apparatus comprising:

means for processing the input signals to identify matching points in the images;

means for determining a strength of any edges between identified points in at least one of the images; and means for connecting the points in at least one of the images in dependence upon the edge strengths.

21. An image processing apparatus for processing first input signals defining an image of an object and second input signals defining a plurality of points in the image, the apparatus comprising:

means for determining whether an edge exists between each pair of points, together with an edge strength for each edge identified;

means for connecting the points in dependence upon the edge strengths to define segments of the image;

means for generating image data by processing the segments; and means for displaying an image using the generated image data.

22. A storage medium storing computer program instructions for programming a programmable processing apparatus to become operable to process first input signals defining an image of an object and second input signals defining a plurality of points in the image, to produce signals defining segments of the image, the instructions comprising instructions for programming the programmable processing apparatus to become operable to:

determine whether an edge exists between each pair of points, together with an edge strength for each edge identified; and connect the points in dependence upon the edge strengths to form triangles, with any three points which have therebetween two edges each of which has a strength greater than a predetermined threshold being connected to form a triangle.

23. A storage medium storing computer program instructions for programming a programmable processing apparatus to become operable to process input signals defining first and second images of an object, to produce signals defining segments of at least one of the images, the instructions comprising instructions for programming the programmable processing apparatus to become operable to:

process the input signals to identify matching points in the images;

determine a strength of any edges between identified points in at least one of the images; and connect the points in at least one of the images in dependence upon the edge strengths.

24. A storage medium storing computer program instructions for programming a programmable processing apparatus to become operable to process first input signals defining an image of an object and second input signals defining a plurality of points in the image, the instructions comprising instructions for programming the programmable processing apparatus to become operable to:

determine whether an edge exists between each pair of points, together with an edge strength for each edge identified;

connect the points in dependence upon the edge strengths to define segments of the image;

process the segments to generate image data; and display an image using the generated image data.

25. A signal carrying computer program instructions for programming a programmable processing apparatus to become operable to process first input signals defining an image of an object and second input signals defining a plurality of points in the image, to produce signals defining segments of the image, the instructions comprising instructions for programming the programmable processing apparatus to become operable to:

determine whether an edge exists between each pair of points, together with an edge strength for each edge identified; and connect the points in dependence upon the edge strengths to form triangles, with any three points which have therebetween two edges each of which has a strength greater than a predetermined threshold being connected to form a triangle.

26. A storage medium storing computer program instructions for programming a programmable processing apparatus to become operable to process input signals defining first and second images of an object, to produce signals defining segments of at least one of the images, the instructions comprising instructions for programming the programmable processing apparatus to become operable to:

process the input signals to identify matching points in the images;

determine a strength of any edges between identified points in at least one of the images; and connect the points in at least one of the images in dependence upon the edge strengths.

27. A storage medium storing computer program instructions for programming a programmable processing apparatus to become operable to process first input signals defining an image of an object and second input signals defining a plurality of points in the image, the instructions comprising instructions for programming the programmable processing apparatus to become operable to:

determine whether an edge exists between each pair of points, together with an edge strength for each edge identified;

connect the points in dependence upon the edge strengths to define segments of the image;

process the segments to generate image data; and display an image using the generated image data.

* * * * *

UNITED STATES PATENT AND TRADEMARK OFFICE
CERTIFICATE OF CORRECTION

PATENT NO. : 6,647,146 B1
DATED : November 11, 2003
INVENTOR(S) : Allan Joseph Davison et al.

It is certified that error appears in the above-identified patent and that said Letters Patent is hereby corrected as shown below:

Title page,
Item [56], References Cited, OTHER PUBLICATIONS,
after "A Multistage Stereo …": "conference" should read -- Conference --; and
after "Robust Detection …": "whilist" should read -- while --.
FOREIGN PATENT DOCUMENTS,
"0814769" should read -- 8-147469 --;
"09245166" should read -- 9-245166 --; and
"EP 2328127 B" should read -- GB 232127 B --.
Insert -- Item [30] Foreign Application Priority Data

Aug. 5, 1997  (GB) ………… 9716510.4
   Aug. 5, 1997  (GB) ………… 9716503.9
   Aug. 5, 1997  (GB) ………….. 9716511.2
   Aug. 5, 1997  (GB) ………….. 9716509.6 --

Column 11,
Line 57, CPU 4" should read -- ¶ CPU 4 --.

Column 21,
Line 23, "-- $y\ _2y'_2$" should read -- $y_2y'_2$ --.

Column 23,
Line 4, "was" should read -- were --.

Column 24,
Line 16, ""$C_y$"" should read -- "$c_y$" --.

Column 27,
Line 66, "af fine" should read -- affine --.

UNITED STATES PATENT AND TRADEMARK OFFICE
CERTIFICATE OF CORRECTION

PATENT NO. : 6,647,146 B1
DATED : November 11, 2003
INVENTOR(S) : Allan Joseph Davison et al.

It is certified that error appears in the above-identified patent and that said Letters Patent is hereby corrected as shown below:

Column 32,
Lines 23-25 "$X = \begin{pmatrix} 0 & -1 & 0 \\ 1 & 0 & 0 \\ 0 & 0 & 0 \end{pmatrix}$   (16)" should read -- $R_\theta = I + X sin\theta + X^2 (1 - cos\theta)$   (15)

$X = \begin{pmatrix} 0 & -1 & 0 \\ 1 & 0 & 0 \\ 0 & 0 & 0 \end{pmatrix}$   (16) --; and Line 38, "$\underline{t}_{top} = \xi' \bar{} mR_{top} \in -m\underline{R}_{right}$" should read -- $\underline{t}_{top} = \xi' - mR_{top} \xi - m\underline{R}_{right}$ --.

Column 36,
Line 24, "to full a" should read -- to a full --.

Column 37,
Line 13, "af fine" should read -- affine --.

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,647,146 B1
DATED : November 11, 2003
INVENTOR(S) : Allan Joseph Davison et al.

It is certified that error appears in the above-identified patent and that said Letters Patent is hereby corrected as shown below:

Title page,
Item [56], References Cited, OTHER PUBLICATIONS,
after "A Multistage Stereo ...": "conference" should read -- Conference --; and
after "Robust Detection ...": "whilist" should read -- while --.
FOREIGN PATENT DOCUMENTS,
"08147469" should read -- 8-147469 --;
"09245166" should read -- 9-245166 --; and
"EP 2328127 B" should read -- GB 2328127 B --.
Insert -- Item [30] Foreign Application Priority Data

Aug. 5, 1997 (GB) ............ 9716510.4
        Aug. 5, 1997 (GB) ............ 9716503.9
        Aug. 5, 1997 (GB) ............. 9716511.2
        Aug. 5, 1997 (GB) ............. 9716509.6 --

Column 11,
Line 57, CPU 4" should read -- ¶ CPU 4 --.

Column 21,
Line 23, "– $y_2y'_2$" should read -- $y_2y'_2$ --.

Column 23,
Line 4, "was" should read -- were --.

Column 24,
Line 16, ""$C_y$"" should read -- "$c_y$" --.

Column 27,
Line 66, "af fine" should read -- affine --.

UNITED STATES PATENT AND TRADEMARK OFFICE
CERTIFICATE OF CORRECTION

PATENT NO. : 6,647,146 B1
DATED : November 11, 2003
INVENTOR(S) : Allan Joseph Davison et al.

It is certified that error appears in the above-identified patent and that said Letters Patent is hereby corrected as shown below:

Column 32,
Lines 23-25 "$X = \begin{pmatrix} 0 & -1 & 0 \\ 1 & 0 & 0 \\ 0 & 0 & 0 \end{pmatrix}$  (16)" should read -- $R_\theta = I + X sin\theta + X^2 (1 - cos\theta)$  (15)

$$X = \begin{pmatrix} 0 & -1 & 0 \\ 1 & 0 & 0 \\ 0 & 0 & 0 \end{pmatrix} \quad (16)$$ --; and Line 38, "$\underline{t}_{top} = \xi' - mR_{top} \in -m\underline{R}_{right}$" should read -- $\underline{t}_{top} = \xi' - mR_{top}\xi - m\underline{R}_{right}$ --.

Column 36,
Line 24, "to full a" should read -- to a full --.

Column 37,
Line 13, "af fine" should read -- affine --.

This certificate supersedes Certificate of Correction issued May 10, 2005.

Signed and Sealed this

Thirty-first Day of January, 2006

JON W. DUDAS
*Director of the United States Patent and Trademark Office*